(12) United States Patent
Ouchi et al.

(10) Patent No.: US 10,630,447 B2
(45) Date of Patent: Apr. 21, 2020

(54) TERMINAL DEVICE, BASE STATION DEVICE, AND COMMUNICATION METHOD

(71) Applicant: SHARP KABUSHIKI KAISHA, Sakai, Osaka (JP)

(72) Inventors: Wataru Ouchi, Sakai (JP); Naoki Kusashima, Sakai (JP); Takashi Hayashi, Sakai (JP); Shoichi Suzuki, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/778,096

(22) PCT Filed: Nov. 25, 2016

(86) PCT No.: PCT/JP2016/084917
§ 371 (c)(1),
(2) Date: May 22, 2018

(87) PCT Pub. No.: WO2017/090710
PCT Pub. Date: Jun. 1, 2017

(65) Prior Publication Data
US 2018/0351720 A1 Dec. 6, 2018

(30) Foreign Application Priority Data
Nov. 27, 2015 (JP) ................... 2015-231359

(51) Int. Cl.
| | |
|---|---|
| *H04L 5/00* | (2006.01) |
| *H04W 16/14* | (2009.01) |
| *H04L 27/26* | (2006.01) |
| *H04B 7/06* | (2006.01) |
| *H04B 7/04* | (2017.01) |
| *H04W 72/04* | (2009.01) |

(52) U.S. Cl.
CPC ............. *H04L 5/0053* (2013.01); *H04B 7/04* (2013.01); *H04B 7/0608* (2013.01);
(Continued)

(58) Field of Classification Search
CPC . H04L 5/0053; H04L 27/2605; H04L 5/0007; H04L 27/26; H04B 7/04; H04W 72/04; H04W 16/14; H04W 72/0453
See application file for complete search history.

(56) References Cited

U.S. PATENT DOCUMENTS

2015/0282134 A1* 10/2015 Suzuki ................. H04L 5/0044
370/329
2015/0296513 A1 10/2015 Nogami et al.
(Continued)

FOREIGN PATENT DOCUMENTS

| EP | 3297363 A1 | 3/2018 |
|---|---|---|
| WO | 2013/164026 A1 | 11/2013 |

(Continued)

OTHER PUBLICATIONS

3GPP "Partial subframe for LAA", R1-155474, Oct. 9, 2015.*
(Continued)

*Primary Examiner* — Jae Y Lee
(74) *Attorney, Agent, or Firm* — ScienBiziP, P.C.

(57) ABSTRACT

To efficiently control a cell using an allocated frequency band, a non-allocated frequency band, or a shared frequency band. A terminal device for communicating with a base station device includes: a higher layer processing unit configured to configure a set for monitoring an EPDCCH for a LAA cell, based on higher layer signaling; and a reception unit configured to monitor the EPDCCH based on the set. The reception unit determines an antenna port number of an antenna port to be used for localized EPDCCH transmission in a subframe, based on a start position of an OFDM symbol in the subframe.

3 Claims, 10 Drawing Sheets

(52) U.S. Cl.
CPC ........ *H04L 5/0007* (2013.01); *H04L 27/2602* (2013.01); *H04L 27/2605* (2013.01); *H04L 27/2607* (2013.01); *H04W 16/14* (2013.01); H04B 7/068 (2013.01); H04L 5/001 (2013.01); H04L 5/005 (2013.01); H04L 5/0048 (2013.01); H04L 5/0051 (2013.01); H04L 5/0055 (2013.01); H04L 5/0091 (2013.01); H04L 5/0098 (2013.01); H04W 72/0453 (2013.01)

(56) References Cited

U.S. PATENT DOCUMENTS

| | | | |
|---|---|---|---|
| 2018/0242283 A1* | 8/2018 | Feng | H04L 5/001 |
| 2018/0242284 A1* | 8/2018 | Beale | H04L 1/0061 |

FOREIGN PATENT DOCUMENTS

| | | |
|---|---|---|
| WO | 2014/073671 A1 | 5/2014 |
| WO | 2016/186052 A1 | 11/2016 |

OTHER PUBLICATIONS

Source: Samsung, Title: Partial subframe for LAA, R1-155474, 3GPP TSG RAN WG1 #82bis, Malmo, Sweden, Oct. 5-9, 2015.
Source: Ericsson, Qualcomm, Huawei, Alcatel-Lucent, Title: Study on Licensed-Assisted Access using LTE, RP-141664, 3GPP TSG RAN Meeting #65, Edinburgh, Scotland, Sep. 9-12, 2014.
3rd Generation Partnership Project; Technical Specification Group Radio Access Network; Evolved Universal Terrestrial Radio Access (E-UTRA); Physical layer procedures (Release 12), 3GPP TS 36.213 V12.4.0 (Dec. 2014).

* cited by examiner

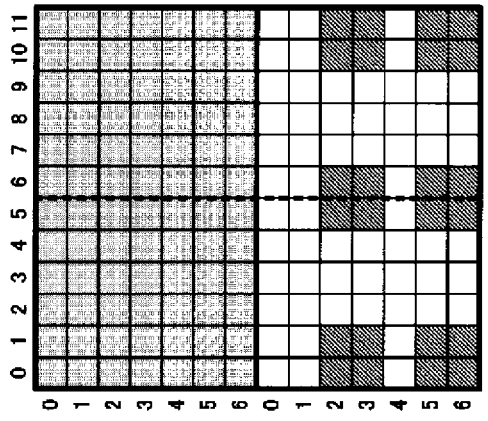
FIG. 9C
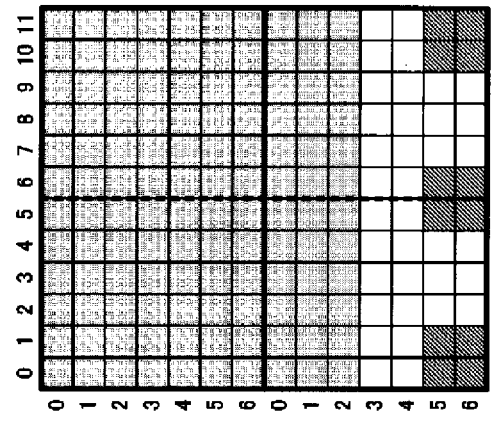
FIG. 9E
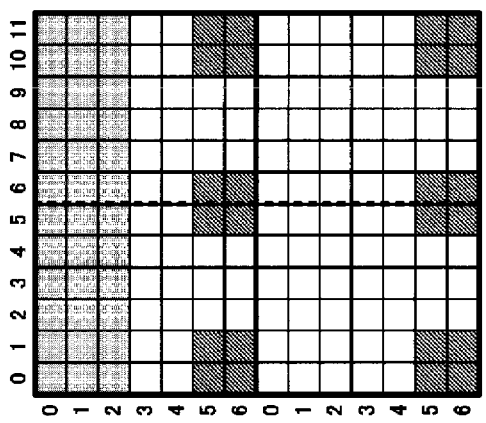
FIG. 9B
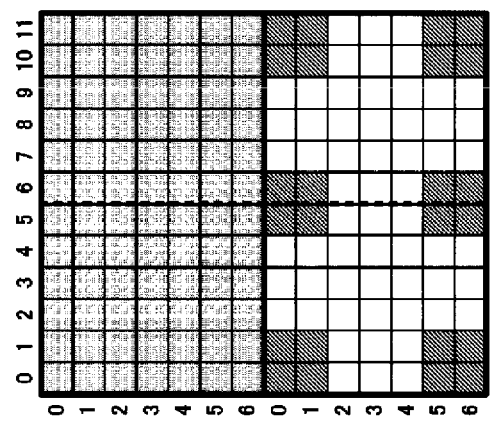
FIG. 9D
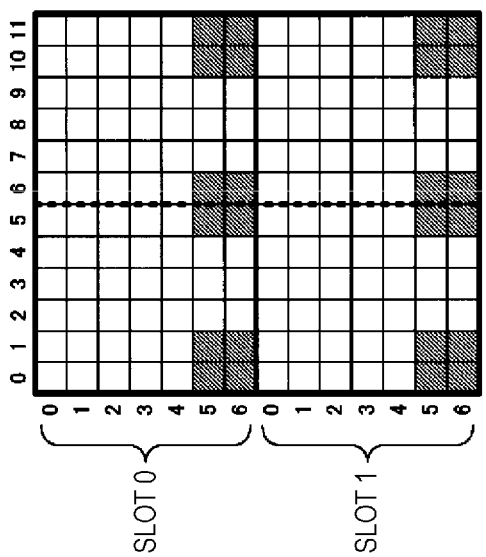
FIG. 9A
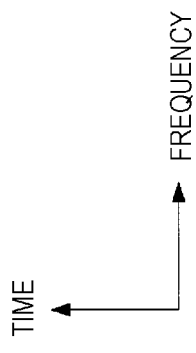

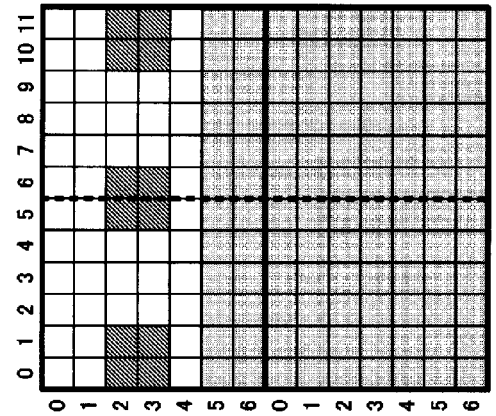
FIG. 10C
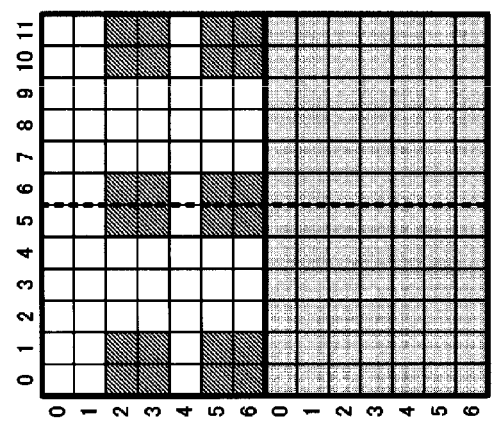
FIG. 10B
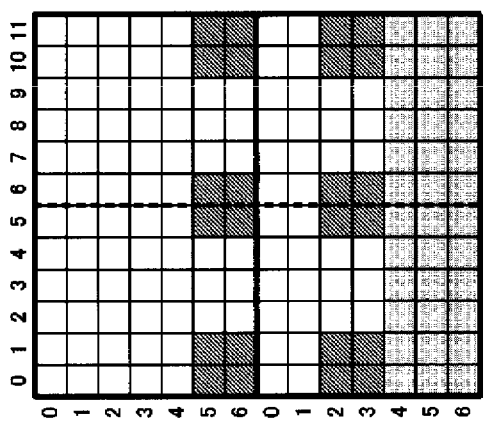
FIG. 10E
FIG. 10D
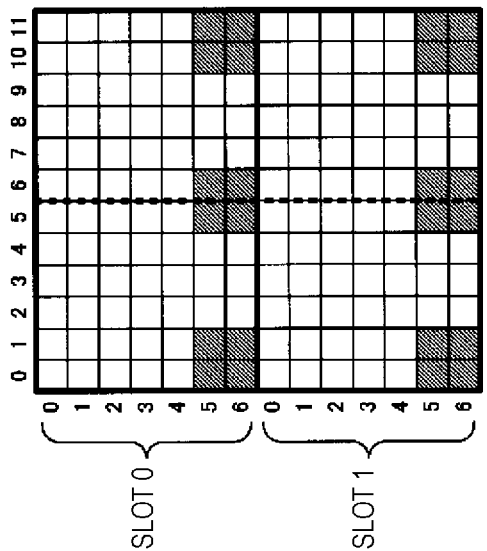
FIG. 10A
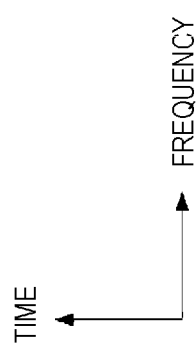

TERMINAL DEVICE, BASE STATION DEVICE, AND COMMUNICATION METHOD

TECHNICAL FIELD

Embodiments of the present invention relate to a technique of a terminal device, a base station device, and a communication method that enable efficient communication.

This application claims priority based on JP 2015-231359 filed in Japan on Nov. 27, 2015, the contents of which are incorporated herein by reference.

BACKGROUND ART

The 3rd Generation Partnership Project (3GPP), which is a standardization project, standardized the Evolved Universal Terrestrial Radio Access (hereinafter, referred to as E-UTRA), in which high-speed communication is realized by adopting an Orthogonal Frequency-Division Multiplexing (OFDM) communication scheme and flexible scheduling using a unit of prescribed frequency and time called resource block.

Moreover, the 3GPP discusses Advanced E-UTRA, which realizes higher-speed data transmission and has upper compatibility with E-UTRA. E-UTRA relates to a communication system based on a network in which base station devices have substantially the same cell configuration (cell size); however, regarding Advanced E-UTRA, discussion is made on a communication system based on a network (different-type radio network, Heterogeneous Network) in which base station devices (cells) having different configurations coexist in the same area. In this regard, E-UTRA is also referred to as "LTE (Long Term Evolution)", and Advanced E-UTRA is also referred to as "LTE-Advanced". Furthermore, LTE may be a collective name including LTE-Advanced.

A Carrier Aggregation (CA) technique and a Dual Connectivity (DC) technique are specified, in which, in a communication system where cells (macro cells) having large cell radii and cells (small cells) having smaller cell radii than those of the macro cells coexist as in a heterogeneous network, a terminal device performs communication by connecting to a macro cell and a small cell simultaneously (NPL 1).

Meanwhile, NPL 2 studies Licensed-Assisted Access (LAA). According to LAA, a non-allocated frequency band (Unlicensed spectrum) used by a wireless Local Area Network (LAN) is used as UTE. More specifically, the non-allocated frequency band is configured as a secondary cell (secondary component carrier). Connection, communication, and/or a configuration of the secondary cell(s) used as LAA are assisted by a primary cell (primary component carrier) configured to an allocated frequency band (Licensed spectrum). LAA widens a frequency band that is available for LTE, and thus wide band transmission is enabled. In this regard, LAA is used in a shared frequency band (shared spectrum) shared between predetermined operators.

Moreover, latency in radio communication is one of critical factors in a system aiming at ensuring security and reliability. For the LTEs including the LTE using the LAA and the LTE of the related art using a Licensed spectrum, it is important to further reduce latency.

CITATION LIST

Non Patent Literature

NPL 1: 3rd Generation Partnership Project; Technical Specification Group Radio Access Network; Evolved Universal Terrestrial Radio Access (E-UTRA); Physical layer procedures (Release 12), 3GPP TS 36.213 V12.4.0 (2014-12).

NPL 2: RP-141664, Ericsson, Qualcomm, Huawei, Alcatel-Lucent, "Study on Licensed-Assisted Access using LTE," 3GPP TSG RAN Meeting #65, September 2014.

SUMMARY OF INVENTION

Technical Problem

According to LAA, in a case that the non-allocated frequency band or the shared frequency band is used, the frequency band is shared between other systems and/or other operators. However, LTE is designed assuming use in an allocated frequency band or a non-shared frequency band. Therefore, the LTE in the related art may not be used in the non-allocated frequency band or the shared frequency band. In addition, reduction in latency in radio communication is desired for the LTEs including the LTE using the LAA and the LTE of the related art using a Licensed spectrum.

The present invention has been made in light of the foregoing, and an object of the present invention is to provide a terminal device, a base station device, and a communication method that enable efficient control of a cell that uses a Licensed spectrum, an Unlicensed spectrum, or a shared spectrum.

Solution to Problem (1) To accomplish the object described above, the present invention is contrived to provide the following means. Specifically, a terminal device according to an aspect of the present invention is a terminal device for communicating with a base station device. The terminal device includes: a higher layer processing unit configured to configure a set for monitoring an Enhanced Physical Downlink Channel (EPDCCH) for a Licensed Assisted Access (LAA) cell, based on higher layer signaling; and a reception unit configured to monitor the EPDCCH based on the set. The reception unit determines an antenna port number of an antenna port to be used for localized EPDCCH transmission in a subframe, based on a start position of an Orthogonal Frequency Division Multiplex (OFDM) symbol in the subframe.

(2) A base station device according to an aspect of the present invention is a base station device for communicating with a terminal device. The base station device includes: a transmission unit configured to transmit a set for monitoring an Enhanced Physical Downlink Channel (EPDCCH) for a Licensed Assisted Access (LAA) cell, by using higher layer signaling. The transmission unit determines an antenna port number of an antenna port to be used for localized EPDCCH transmission in a subframe, based on a start position of an Orthogonal Frequency Division Multiplex (OFDM) symbol in the subframe.

(3) A communication method according to an aspect of the present invention is a communication method for a terminal device for communicating with a base station device. The communication method includes the steps of: configuring a set for monitoring an Enhanced Physical Downlink Channel (EPDCCH) for a Licensed Assisted Access (LAA) cell, based on higher layer signaling; receiving monitoring the EPDCCH based on the set; and determining an antenna port number of an antenna port to be used for localized EPDCCH transmission in a subframe, based on a start position of an Orthogonal Frequency Division Multiplex (OFDM) symbol in the subframe.

(4) A communication method according to an aspect of the present invention is a communication method for a base station device for communicating with a terminal device. The communication method includes the steps of: transmitting a set for monitoring an Enhanced Physical Downlink Channel (EPDCCH) for a Licensed Assisted Access (LAA) cell, by using higher layer signaling; and determining an antenna port number of an antenna port to be used for localized EPDCCH transmission in a subframe, based on a start position of an Orthogonal Frequency Division Multiplex (OFDM) symbol in the subframe.

Advantageous Effects of Invention

The present invention can provide improved transmission efficiency in a radio communication system in which a base station device and a terminal device communicate.

BRIEF DESCRIPTION OF DRAWINGS

FIGS. 9A to 9E are diagrams illustrating examples of a configuration of DMRSs associated with a second EPDCCH to be used for a first partial subframe.

FIGS. 10A to 10E are diagrams illustrating examples of a configuration of DMRSs associated with a second EPDCCH to be used for a second partial subframe.

DESCRIPTION OF EMBODIMENTS

First Embodiment

A first embodiment of the present invention will be described below. A description will be given by using a communication system (cellular system) in which a base station device (base station, NodeB, or eNodeB (eNB)) and a terminal device (terminal, mobile station, a user device, or User equipment (UE)) communicate in a cell.

Note that, in the description of the present embodiment, the description of downlink covers downlink in a normal cell and downlink in a LAA cell. For example, the description of a downlink subframe includes a downlink subframe in a normal cell, a full subframe in a LAA cell, and a partial subframe in a LAA cell.

A physical channel and a physical signal substantially used in EUTRA and Advanced EUTRA will be described. The "channel" refers to a medium used to transmit a signal, and the "physical channel" refers to a physical medium used to transmit a signal. In the present embodiment, the physical channel may be used synonymously with "signal." In the future EUTRA and Advanced EUTRA, the physical channel may be added or its constitution and format type may be changed or added; however, the description of the present embodiment will not be affected even if the channel is changed or added.

In EUTRA and Advanced EUTRA, scheduling of a physical channel or a physical signal is managed by using a radio frame. One radio frame is 10 ms in length, and one radio frame is constituted of 10 subframes. In addition, one subframe is constituted of two slots one subframe is 1 ms in length, and one slot is 0.5 ms in length). Moreover, scheduling is managed by using a resource block as a minimum unit of scheduling for allocating a physical channel. The "resource block" is defined by a given frequency domain constituted of a set of multiple subcarriers (e.g., 12 subcarriers) on a frequency axis and a domain constituted of a specific transmission time slot (one slot).

Figure 1:
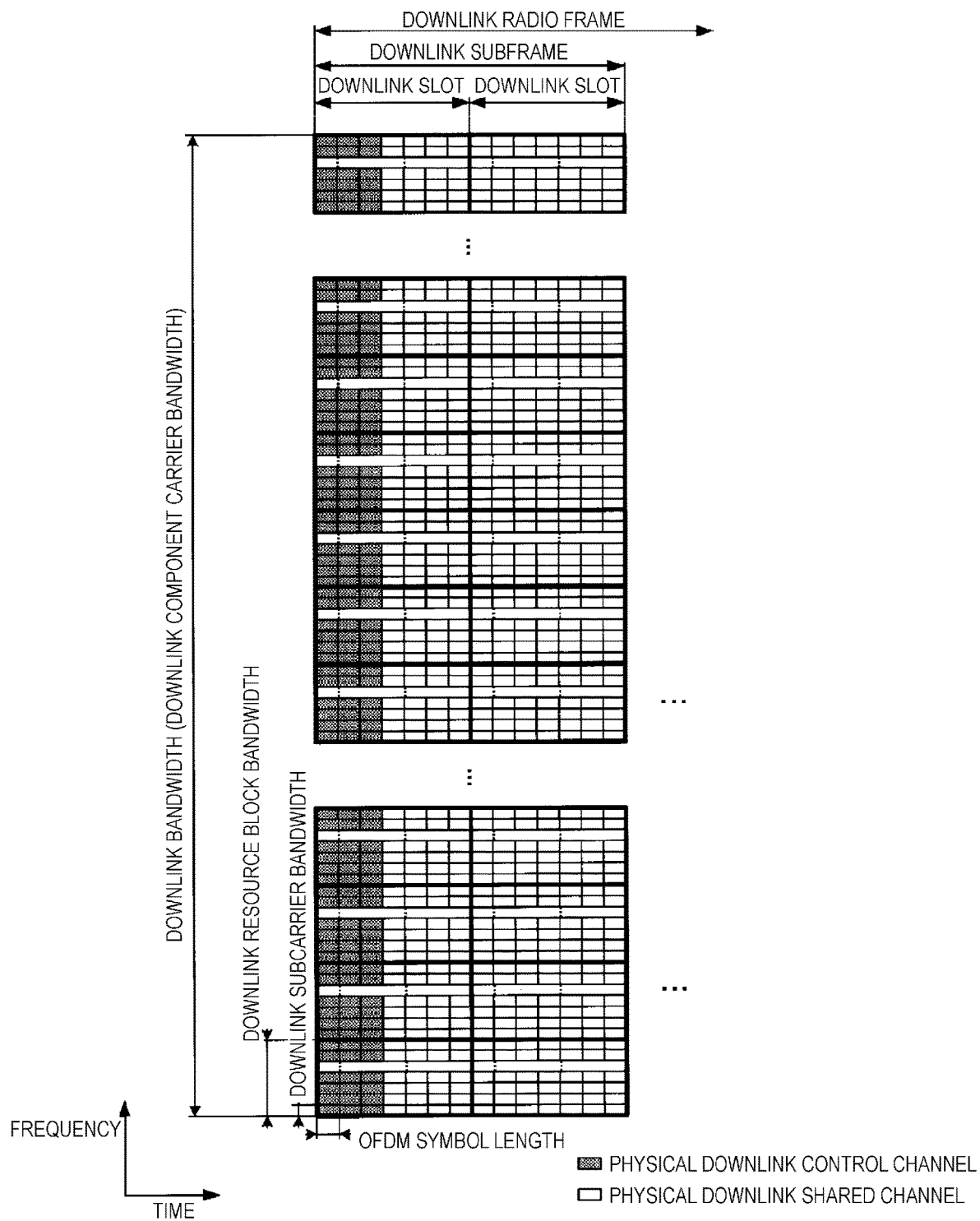
FIG. 1 is a diagram illustrating an example of a downlink radio frame configuration according to a present embodiment.

FIG. 1 is a diagram illustrating an example of a downlink radio frame configuration according to the present embodiment. In the downlink, an OFDM access scheme is used. In the downlink, a PDCCH, an EPDCCH, a Physical Downlink Shared CHannel (PDSCH), and the like are allocated. A downlink radio frame is constituted by a downlink Resource Block (RB) pair. This downlink RB pair is a unit for allocation of a downlink radio resource and the like and is based on the frequency band of a predefined width (RB bandwidth) and a time duration (two slots=1 subframe). Each of the downlink RB pairs is constituted of two downlink RBs (RB bandwidth×slot) that are contiguous in time domain. Each of the downlink RBs is constituted of 12 subcarriers in frequency domain. In the time domain, the downlink RB is constituted of seven OFDM symbols in a case that a normal cyclic prefix is added, while the downlink RB is constituted of six OFDM symbols in a case that a cyclic prefix that is longer than the normal cyclic prefix is added. A region defined by a single subcarrier in the frequency domain and a single OFDM symbol in the time domain is referred to as "Resource Element (RE)". A physical downlink control channel is a physical channel on which downlink control information such as a terminal device identifier, physical downlink shared channel scheduling information, physical uplink shared channel scheduling information, a modulation scheme, coding rate, and retransmission parameter is transmitted. Note that although a downlink subframe in a single Component Carrier (CC) is described here, a downlink subframe is defined for each CC and downlink subframes are approximately synchronized between the CCs.

Although not illustrated here, Synchronization Signals, a Physical Broadcast Channel, and a downlink Reference Signal (RS) may be assigned, to a downlink subframe. Examples of a downlink Reference Signal include a Cell-specific Reference Signal (CRS: Cell-specific RS), which is transmitted through the same transmission port as that for a PDCCH, a Channel State Information Reference Signal (CSI-RS), which is used to measure Channel State Information (CSI), a terminal-specific Reference Signal (URS: UE-specific RS), which is transmitted through the same transmission port as that of one or some PDSCHs, and a Demodulation Reference Signal (DMRS: Demodulation RS), which is transmitted through the same transmission port as that for an EPDCCH. Moreover, carriers on which no CRS is mapped may be used. In this case, a similar signal (referred to as "enhanced synchronization signal") to a signal corresponding to one or some transmission ports only transmission port 0) or all the transmission ports for the CRSs can be inserted into one or some subframes (e.g., the first and sixth subframes in the radio frame) as time and/or frequency tracking signals. The terminal-specific reference signals transmitted at the same transmission port as part of PDSCHs are also referred to as terminal-specific reference signals or DMRSs associated with PDSCHs. The demodulation reference signals transmitted at the same transmission port as the EPDCCHs are also referred to as DMRSs associated with the EPDCCHs.

Although not illustrated, Discovery Signals (DSs) may be arranged in downlink subframes. For the terminal, a Discovery signals measurement timing configuration (DMTC) is set up (configured) based on a parameter configured via RRC signaling. A DMTC Occasion is 6 ms in length and is constituted of six contiguous subframes. Moreover, the terminal assumes that no DS is transmitted in any subframes outside the DMTC Occasion.

In a certain cell, a DS (DS Occasion) is constituted of a time period (DS period) of a predetermined number of contiguous subframes. The prescribed number is one to five according to FDD (Frame structure type 1) and two to five according to TDD (Frame structure type 2). The predetermined number is configured by the RRC signalling. The DS period or its configuration is also referred to as a "Discovery signals measurement timing configuration (DMTC)". The terminal assumes that the DS is transmitted (is mapped or occurs) per subframe configured by a parameter dmtc-Periodicity configured by the RRC signaling. The terminal assumes a presence of the DS configured to include following signals in downlink subframes.

(1) A CRS of antenna port 0 in a DwPTS of all downlink subframes and all special subframes in the DS period.

(2) A PSS in a first subframe of the DS period according to FDD. A PSS in a second subframe of the DS period according to TDD.

(3) A SSS in the first subframe of the DS period.

(4) A non-zero power CSI-RS in a zero or more subframes of the DS period. The non-zero-power CSI-RS is configured by RRS signalling.

The terminal performs measurements based on the configured DS. The measurements are performed by using the CRS of the DS or the non-zero power CSI-RS of the DS. The configuration related to the DS can configure multiple non-zero power CSI-RSs.

The DS and DMTC in the LAA cell can be the same as a DS and DMTC in FDD. For example, in the LAA cell, the DS period is any of 1 to 5 as in FDD, and the PSS exists in the first subframe in the DS period. Note that the DS in the LAA cell may be configured differently from a DS in a normal cell. For example, the DS in the LAA cell does not include any CRS. Moreover, the DS in the LAA cell includes a PSS and SSS that can shift in the frequency direction.

Moreover, in the LAA cell, a control signal and/or a control channel including control information can be transmitted at a subframe in the DS Occasion or a subframe in the DMTC Occasion. The control information can include information on the LAA cell. For example, the control information is information on the frequency, the load, the congestion degree, the interference, the transmit power, the channel occupation time, and/or the buffer state relating to transmission data, in the LAA cell.

Moreover, the control signal and/or the control channel can be demodulated or detected through the DMRS in the DS Occasion. In other words, the control signal and/or the control channel is transmitted via an antenna port used for DMRS transmission in the DS Occasion. Specifically, the DMRS in the DS Occasion is a Demodulation Reference Signal (DMRS) associated with the control signal and/or the control channel and can be configured similarly to the DMRS associated with the PDSCH or the EPDCCH.

Moreover, the scramble sequence used for the DMRS associated with the control signal and/or the control channel may be generated differently from the scramble sequence used for the DMRS associated with the PDSCH or the EPDCCH. Here, the scramble sequence used for the DMRS is generated with a value calculated based on the slot number (subframe number), the first parameter, and the second parameter, which are used as initial values. For example, in the scramble sequence used for the DMRS associated with the PDSCH, the first parameter is a Cell Identifier (Cell ID) or a value configured by a higher layer, and the second parameter is 0 or 1 given by the DCI. In a case that the second parameter is not given by the DCI, the second parameter is fixed at 0. In the scramble sequence used for the DMRS associated with the EPDCCH, the first parameter is a value configured by a higher layer for each EPDCCH set, and the second parameter is fixed at 2.

In the scramble sequence used for the DMRS associated with the control signal and/or the control channel, the first parameter is a value configured by a higher layer, and is the Cell Identifier of the LAA cell or the Cell Identifier corresponding to the non-zero-power CSI-RS in the DS Occasion. In the scramble sequence used for the DMRS associated with the control signal and/or the control channel, the second parameter is a value fixed at a predetermined value or a value configured by a higher layer. In a case that the second parameter is fixed at the predetermined value, the second parameter takes a value of any of 0, 1, and 2 similarly to the second parameter used in the scramble sequence used for the DMRS associated with the PDSCH or the EPDCCH, or a value (for example, 3) different from the second parameter used in the scramble sequence used for the DMRS associated with the PDSCH or the EPDCCH. In a case that the second parameter is configured by a higher layer, the second parameter can be configured at any value and can be configured, for example, at an operator-specific value.

Moreover, the control signal and/or the control channel can be demodulated or detected through use of a CRS in the DS Occasion. In other words, the control signal and/or the control channel is transmitted via an antenna port used for CRS transmission in the DS Occasion. Note that a scramble sequence used for the CRS in the DS Occasion can be generated based on the first parameter and/or the second parameter described with respect to the scramble sequence used for the DMRS associated with the control signal and/or the control channel.

Figure 2:
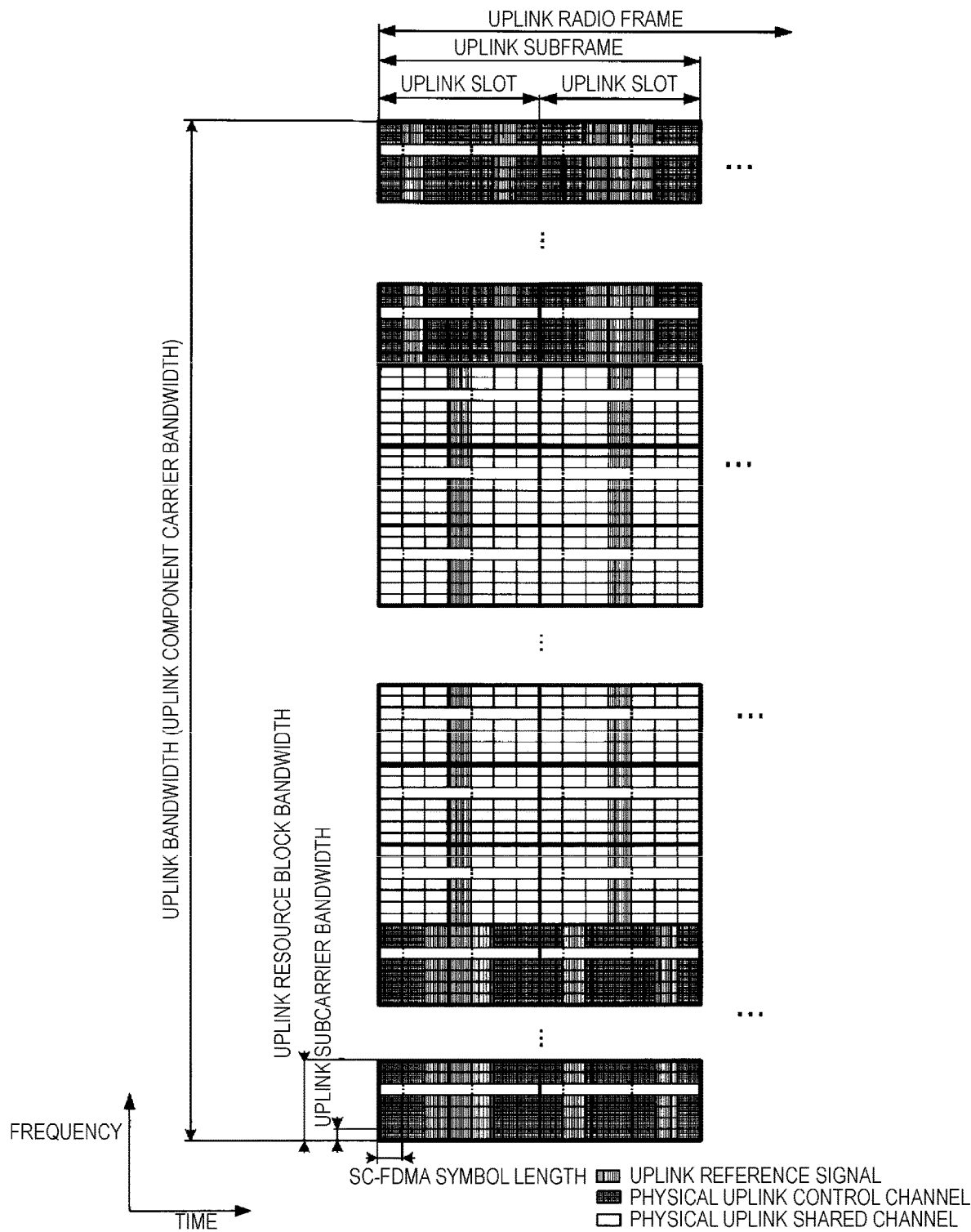
FIG. 2 is a diagram illustrating an example of an uplink radio frame configuration according to the present embodiment.

FIG. 2 is a diagram illustrating an example of an uplink radio frame configuration according to the present embodiment. An SC-FDMA scheme is used in the uplink. In the uplink, a Physical Uplink Shared CHannel (PDSCH), a PUCCH, and the like are allocated. An uplink reference signal is assigned to one or some of PUSCHs and PUCCHs. An uplink radio frame is constituted of uplink RB pairs. This uplink RB pair is a unit for allocation of uplink radio resources and the like and is constituted by the frequency band of a predefined width (RB bandwidth) and a predetermined time duration (two slots=1 subframe). Each of the uplink RB pairs is constituted of two uplink RBs (RB bandwidth×slot) that are contiguous in the time domain. Each of the uplink RB is constituted of 12 subcarriers in the frequency domain. In the time domain, the uplink RB is constituted of seven SC-FDMA symbols in a case that a normal cyclic prefix is added, while the uplink RB is constituted of six SC-FDMA symbols in a case that a cyclic prefix that is longer than the normal cyclic prefix is added. Note that although an uplink subframe in a single CC is described here, an uplink subframe is defined for each CC.

Synchronization signals include three kinds of primary synchronization signals and secondary synchronization signals each of which is constituted by 31 kinds of codes that are interleaved in the frequency domain 504 patterns of cell identifiers (Physical Cell Identities; PCIs) for identifying base station devices, and frame timing for radio synchronization are indicated by combinations of the primary synchronization signals and the secondary synchronization signals. The terminal device identifies the physical cell ID of a received synchronization signal by cell search.

The Physical Broadcast Channel (PBCH) is transmitted for the notification (configuration) of a control parameter (broadcast information i.e., system information) commonly used among the terminal devices within the cell. The radio resource in which broadcast information is transmitted is announced on the physical downlink control channel to the terminal devices in the cell. Broadcast information not announced on the physical broadcast channel is transmitted, as a layer-3 message (system information) for announcing the broadcast information of the physical downlink shared channel, by the announced radio resource.

Broadcast information to be notified includes, for example, a Cell Global identifier (CGI), which indicates a cell-specific identifier, a Tracking Area Identifier (TAI) for managing standby areas in paging, random access configuration information (such as a transmission timing timer), and shared radio resource configuration information, neighboring cell information and uplink access control information of the cell.

A downlink reference signal is classified into multiple types according to its use. For example, cell-specific RSs (Cell-specific reference signals) are pilot signals transmitted with predetermined power from each cell and are downlink reference signals periodically repeated in the frequency domain and the time domain under a predetermined rule. The terminal device receives the cell-specific RS and thus measures the reception quality of each cell. The terminal device also uses a cell-specific RS as a reference signal for demodulation of a physical downlink control channel or a physical downlink shared channel transmitted at the same time as a cell-specific RS. A sequence distinguishable among the cells can be used for a sequence for a cell-specific RS.

The downlink reference signal is also used for estimation of downlink channel fluctuation. A downlink reference signal used for estimation of downlink channel fluctuations is referred to as "Channel State Information Reference Signal (CSI-RS)". A downlink reference signal individually configured for the terminal device is referred to as UE-specific Reference signal (URS), a Demodulation Reference Signal (DMRS), or a Dedicated RS (DRS), and is referred to for a channel compensation process for demodulating an enhanced physical downlink control channel or a physical downlink shared channel.

The Physical Downlink Control CHannel (PDCCH) occupying one or several OFDM symbols (e.g., 1 to 4 OFDM symbols) from the start of each subframe is transmitted. The Enhanced Physical Downlink Control CHannel (EPDCCH) is a physical downlink control channel allocated to the OFDM symbols to which the Physical Downlink Shared CHannel (PDSCH) is allocated. The PDCCH or EPDCCH is used for notifying each terminal device of radio resource allocation information according to scheduling determined by the base station device and information indicating an adjustment amount for an increase or decrease in transmit power. The information such as the radio resource allocation information is referred to as Downlink Control Information (DCI). A certain DCI combination based on use is referred to as a DCI format. Examples of the DCI format include a DCI format to be used for PDSCH scheduling and a DCI format to be used for PUSCH scheduling. In the following, even in a case that the Physical Downlink Control CHannel (PDCCH) alone is described, both physical channels that is, the PDCCH and the EPDCCH, are included unless otherwise noted.

The PDCCH or a DCI/DCI format transmitted on the PDCCH detected by the terminal device is mapped to certain resource. A region in which the terminal device detects the resource is referred to as a search space. Examples of the search space include a Common Search Space (CSS) and a UE-specific Search Space (USS). The CSS is a detection region in a case that there is no information from the base station device or that a certain condition is satisfied, and is shared by multiple terminal devices in a cell. The USS is a detection region based on information (RNTI value) from the base station device and is a region allocated to each of terminal devices.

The terminal device needs to monitor a physical downlink control channel addressed to the terminal device itself, and receive the physical downlink control channel addressed to the terminal device itself, before transmitting and/or receiving downlink data or a layer-2 message or layer-3 message, which is higher-layer control information (such as a paging or handover command), and thus acquire, from the physical downlink control channel, radio resource allocation information called uplink grant in a case of transmission and downlink grant (downlink assignment) in a case of reception. Note that it is also possible to constitute the physical downlink control channel so that the physical downlink control channel is to be transmitted in the dedicated resource block domain allocated to each terminal device by the base station device, instead of transmission through OFDM symbols described above.

A Physical Control Format indicator Channel (PCFICH) is used to indicate the number of OFDM symbols used for a PDCCH in a certain subframe. This information may be referred to as CFI. A set of OFDM symbols that can be used for the PDCCH in the certain subframe (that is, CFI) may be managed using a table. For the CFI, the number of available OFDM symbols may be limited in association with a system bandwidth of the downlink. For the CFI, the number of available OFDM symbols may be limited based on the type of subframes. To be more precise, the number of OFDM symbols corresponding to the value of bits constituting the CFI may be interpreted differently depending on the condition for the subframes or the system bandwidth. For example, in a case that the CFI has a bit value of "01", the number of OFDM symbols corresponding to the bit value may be 1 in a case that the system bandwidth is a first bandwidth and may be 2 in a case that the system bandwidth is a first bandwidth. Also for the subframes, similar association may be applied.

The Physical Hybrid-ARQ (HARQ) Indicator Channel (PHICH) is used to transmit HARQ ACK/NACK. In other words, the PHICH is used to indicate PUSCH ACK/NACK.

The PHICH is mapped to the same set of resource elements constituting a PHICH group. The PHICHs in the same group can be separated from each other by using different orthogonal sequences.

The Physical Uplink Control CHannel (PUCCH) is used for an acknowledgment in response to reception of downlink data transmitted on the physical downlink shared channel (HARQ-ACK; Hybrid Automatic Repeat reQuest-Acknowledgment or ACK/NACK; Acknowledgment/Negative Acknowledgment), downlink channel (Channel State) Information (CSI), and uplink radio resource allocation request (radio resource request, Scheduling Request (SR)).

CSI includes a Channel Quality indicator (CQI), a Preceding Matrix Indicator (PMI), a Preceding Type indicator (PTI), and a Rank Indication (RI), which can be used respectively for specifying (representing) a preferable modulation scheme and coding rate, a preferable preceding matrix, a preferable PMI type, and a preferable rank. Indication may be used as a notation for each indicator. Moreover, the CQI and the PMI are classified into wideband CQI and PMI assuming transmission using all the resource blocks in a single cell, and subband CQI and PMI assuming transmission using some contiguous resource blocks (subbands) in a single cell. Moreover, PMI may include a type of PMI, which represents a single preferable preceding matrix using two types of PMIs, which are a first PMI and a second PMI, in addition to a normal type of PMI, which represents a single preferable preceding matrix using a single PMI.

The Physical Downlink Shared Channel (PDSCH) is also used to notify the terminal device of Broadcast information (System information) that is not notified by paging or on the physical broadcast information channel, in addition to downlink data, as a layer-3 message. Radio resource allocation information of the physical downlink shared channel is indicated by a physical downlink control channel. The physical downlink shared channel is allocated to OFDM symbols other than the OFDM symbols used to transmit a physical downlink control channel and is transmitted. In other words, the physical downlink shared channel and the physical downlink control channel are time division multiplexed in a single subframe.

The Physical Uplink Shared CHannel (PUSCH) is mainly able to transmit uplink data and uplink control information which may also include uplink control information such as CSI and ACK/NACK. Moreover, the physical uplink shared channel is also used such that the terminal device notifies the base station device of uplink data as well as a layer-2 message and a layer-3 message, which are higher-layer control information. Radio resource allocation information of the physical uplink shared channel is provided by a physical downlink control channel, as in a case of downlink.

Uplink reference signals (also referred to as "uplink pilot signal" or "uplink pilot channel") include a Demodulation Reference Signal (DMRS) to be used by the base station device to demodulate the physical uplink control CHannel PUCCH and/or physical uplink shared CHannel PUSCH, and a Sounding Reference Signal (SRS) to be mainly used by the base station device to estimate an uplink channel state. Moreover, sounding reference signals are categorized into a periodic Sounding Reference Signal (Periodic SRS), which is transmitted periodically, or an Aperiodic Sounding Reference Signal (Aperiodic SRS), which is transmitted in a case that transmission is instructed by the base station device.

A Physical Random Access CHannel (PRACH) is a channel used for the notification (configuration) of a preamble sequence and includes a guard time. The preamble sequence is configured such that multiple sequences are used for notifying information to the base station device. For example, in a case that 64 sequences are available, 6-bit information can be provided to the base station device. A physical random access channel is used by the terminal device as a means for accessing the base station device.

The terminal device uses the physical random access channel to request an uplink radio resource in a case that no physical uplink control channel is configured for an SR or to request the base station device for a transmission timing adjustment information (also referred to as Timing Advance (TA) command) necessary for matching uplink transmission timing to a reception timing window of the base station device, for example. Moreover, the base station device can request the terminal device to start a random access procedure, by using a physical downlink control channel.

A layer-3 message is a message exchanged between the Radio Resource Control (RRC) layers of the terminal device and the base station device and handled in a protocol for a Control-plane (CP (C-Plane)), and may be used synonymously with RRC signalling or RRC message. A protocol handling user data (uplink data and downlink data) is referred to as "User-plane (UP (U-Plane))" in contrast to "control plane". Here, a transport block that is transmission data in the physical layer includes C-Plane messages and U-Plane data in higher layers. Detailed descriptions of other physical channels are omitted.

A communicable range (communication area) at each frequency controlled by a base station device is regarded as a cell. Here, the communication area covered by the base station device may be different in size and shape for each frequency. Moreover, the covered area may be different for each frequency. A radio network, in Which cells having different types of base station devices or different cell radii are located in a mixed manner in the area with the same frequency and/or different frequencies to form a single communication system, is referred to as a heterogeneous network.

The terminal device operates by regarding the inside of a cell as a communication area. In a case that the terminal device moves from a cell to a different cell, the terminal device moves to an appropriate different cell through a cell reselection procedure at the time of having no radio connection (during no communication) and through a handover procedure at the time of having radio connection (during communication). A suitable cell in general indicates a cell that is determined that access from the terminal device is not prohibited based on information specified by the base station device, and that has a downlink reception quality satisfying a predefined condition.

Moreover, the terminal device and the base station device may employ a technique for aggregating the frequencies (component carriers or frequency band) of a plurality of different frequency bands through Carrier Aggregation and treating the resultant as a single frequency (frequency band). A component carrier is categorized as an uplink component carrier corresponding to the uplink and a downlink component carrier corresponding to the downlink. In this specification, "frequency" and "frequency band" may be used synonymously.

For example, in a case that each of five component carriers having frequency bandwidths of 20 MHz are aggregated through Carrier Aggregation, a terminal device capable of performing Carrier Aggregation performs transmission and/or reception by assuming that the aggregated carriers have a frequency bandwidth of 100 MHz. Note that component carriers to be aggregated may have contiguous frequencies or frequencies some or all of which are discontiguous. For example, assuming that available frequency bands include an 800 MHz band, a 2 GHz band, and a 3.5 GHz band, a component carrier may be transmitted in the 800 MHz band, another component carrier may be transmitted in the 2 GHz band, and yet another component carrier may be transmitted in the 3.5 GHz band.

It is also possible to aggregate multiple contiguous or discontiguous component carriers of the same frequency bands. The frequency bandwidth of each component carrier may be narrower (e.g., 5 MHz or 10 MHz) than the receivable frequency bandwidth (e.g., 20 MHz) of the terminal device, and the frequency bandwidth of component carriers to be aggregated may be different from each other. Each frequency bandwidth may be equal to any of the frequency bandwidth of known cells in consideration of backward compatibility, but may be a frequency bandwidth different from any of the frequency bands of the known cells.

Moreover, component carriers (carrier types) without backward compatibility may be aggregated. Note that the number of uplink component carriers to be allocated to (configured for or added for) the terminal device by the base station device may be the same as or may be fewer than the number of downlink component carriers.

A cell constituted of an uplink component carrier in Which an uplink control channel is configured for a radio resource request and a downlink component carrier having a cell-specific connection with the uplink component carrier is referred to as "Primary cell (PCell)." A cell constituted of component carriers other than those of the primary cell is referred to as "Secondary cell (SCell)." The terminal device receives a paging message, detects update of broadcast information, carries out an initial access procedure, configures security information, and the like in a primary cell, and need not perform these operations in secondary cells.

Although a primary cell is not a target of activation and deactivation controls (in other words, considered as being activated at any time), a secondary cell has activated and deactivated states, the change of which is explicitly specified by the base station device or is made based on a timer configured for the terminal device for each component carrier. The primary cell and secondary cell are collectively referred to as "serving cell".

Carrier Aggregation achieves communication using multiple component carriers (frequency bands) using multiple cells, and is also referred to as cell aggregation. The terminal device may have radio connection with the base station device via a relay station device (or repeater) for each frequency. In other words, the base station device of the present embodiment may be replaced with a relay station device.

The base station device manages a cell, which corresponds to an area where terminal devices can communicate with the base station device, for each frequency. A single base station device may manage multiple cells. Cells are classified into multiple types of cells depending on the size of the area (cell size) that allows for communication with terminal devices. For example, cells are classified into macro cells and small cells. Moreover, small cells are classified into femto cells, pica cells, and nano cells depending on the size of the area. In a case that a terminal device can communicate with a certain base station device, the cell configured so as to be used for the communication with the terminal device is referred to as "Serving cell" while the other cells not used for the communication are referred to as "Neighboring cell", among the cells of the base station device.

In other words, in Carrier Aggregation, multiple serving cells thus configured include one primary cell and one or multiple secondary cells.

A primary cell is a serving cell in which an initial connection establishment procedure has been carried out, a serving cell in which a connection re-establishment procedure has been started, or a cell indicated as a primary cell during a handover procedure. Operation at a primary frequency is performed in the Primary cell. At the point of time when a connection is (re)established, or later, a secondary cell may be configured. Operation at a secondary frequency is performed in each Secondary cell. The connection may be referred to as an RRC connection. For the terminal device supporting CA, a single primary cell and one or more secondary cells are aggregated.

In the present embodiment, Licensed-Assisted Access (LAA) is used. According to LAA, an allocated frequency is configured to (used for) the primary cell, and a non-allocated frequency is configured to at least one of secondary cells. The secondary cell(s) to which the non-allocated frequency is configured is assisted by the primary cell or the secondary cell(s) to which the allocated frequency is configured. For example, the primary cell or the secondary cell(s) to which the allocated frequency is configured performs the configuration and/or announces control information by the RRC signalling, MAC signalling and/or PDCCH signalling to the secondary cell(s) to which the non-allocated frequency is configured. In the present embodiment, a cell assisted by the primary cell or the secondary cells) is also referred to as "LAA cell". The LAA cell can be aggregated (assisted) with the primary cell and/or the secondary cell(s) by carrier aggregation. The primary cell or the secondary cell(s) which assists the LAA cell is also referred to as "assist cell". In addition, a cell for which a Licensed spectrum is configured is also referred to as a "normal cell" (cell of the related art), and a subframe in the normal cell is also referred to as a normal subframe (subframe of the related art). The normal subframe includes a downlink subframe, an uplink subframe, and a special subframe. In the present embodiment, description will be given of the normal subframe as distinguished from the subframe used in the LAA cell.

The LAA cell may be aggregated (assisted) by the primary cell and/or the secondary cells) by dual connectivity.

A basic configuration (architecture) of dual connectivity will be described below. For example, the description will be given in a case that a terminal device 1 connects to multiple base stations 2 (for example, a base station device 2-1 and a base station device 2-2) at the same time. The base station device 2-1 is a base station device constituting a macro cell, and the base station device 2-2 is a base station device constituting a small cell. The terminal device 1 connecting to the base station devices 2 at the same time by using the multiple cells belonging to the multiple base station devices 2 as described above is referred to as "dual connectivity". The cells belonging to the respective base station devices 2 may be operated at the same frequency or different frequencies.

Note that Carrier Aggregation is different from dual connectivity in that a single one of the base station devices 2 manages multiple cells and the frequencies of the respective cells are different from each other. In other words, Carrier Aggregation is a technique for connecting the single terminal device 1 and a single one of the base station device 2 via multiple cells having different frequencies, while dual connectivity is a technique for connecting the single terminal device 1 and the multiple base station devices 2 via multiple cells having the same frequency or different frequencies.

The terminal device 1 and base station devices 2 can apply a technique used for Carrier Aggregation, to dual connectivity. For example, the terminal device 1 and base station devices 2 may apply a technique of allocation of a primary cell and secondary cells or activation/deactivation, to cells connected through dual connectivity.

In dual connectivity, the base station device 2-1 or base station device 2-2 is connected to MME and SGW via a backbone network. The MME is a host control station device corresponding to a Mobility Management Entity (MME) and has the functions of managing mobility and performing authentication control (security control) for the terminal device 1, and configuring routes for user data to the base station devices 2. The SGW is a host control station device corresponding to a Serving Gateway (S-GW) and has the functions of transmitting user data according to the route for user data to the terminal device 1 configured by the MME.

Moreover, in dual connectivity, the connection route between the base station device 2-1 or base station device 2-2 and the SGW is referred to as an "SGW interface", Moreover, the connection route between the base station device 2-1 or base station device 2-2 and the MME is referred to as "MME interface", Moreover, the connection route between the base station device 2-1 and base station device 2-2 is referred to as "base station interface". The SGW interface is also referred to as an S1-U interface in EUTRA. Moreover, the MME interface is also referred to as "S1-MME interface" in EUTRA. Moreover, the base station interface is also referred to as "X2 interface" in EUTRA.

An example of an architecture for enabling dual connectivity will be described. In dual connectivity, the base station device 2-1 and the MME are connected via the MME interface. Moreover, the base station device 2-1 and the SGW are connected via the SGW interface. Moreover, the base station device 2-1 provides, to the base station device 2-2, the communication route to the MME and/or SGW via the base station interface. In other words, the base station device 2-2 is connected to the MME and/or the SGW via the base station device 2-1.

Moreover, another example of another architecture for enabling dual connectivity will be described. In dual connectivity, the base station device 2-1 and the MME are connected via the MME interface. Moreover, the base station device 2-1 and the SGW are connected via the SGW interface. The base station device 2-1 provides, to the base station device 2-2, the communication route to the MME via the base station interface. In other words, the base station device 2-2 is connected to the MME via the base station device 2-1. Moreover, the base station device 2-2 is connected to the SGW via the SGW interface.

Note that a constitution in which the base station device 2-2 and the MME are directly connected via the MME interface may be employed.

On the basis of description from a different point of view, dual connectivity is an operation whereby a predetermined terminal device consumes radio resources provided from at least two different network points (master base station device (MeNB or Master eNB) and secondary base station device (SeNB or Secondary eNB)). In other words, in dual connectivity, a terminal device is configured to establish an RRC connection to at least two network points. In dual connectivity, the terminal device may be connected via a non-ideal backhaul in RRC connected (RRC_CONNECTED) state.

In dual connectivity, a base station device that is connected to at least the S1-MME and that acts as the mobility anchor of the core network is referred to as "master base station device". Additionally, a base station device that is not the master base station device and that provides supplemental radio resources to the terminal device is referred to as "secondary base station device". A group of serving cells that is associated with the master base station device may be referred to as "Master Cell Group" (MCG), and a group of serving cells that is associated with the secondary base station device may be referred to as "Secondary Cell Group" (SCG). Note that the cell groups may be serving cell groups.

In dual connectivity, the primary cell belongs to the MCG. Moreover, in the SCG, the secondary cell corresponding to the primary cell is referred to as "Primary Secondary Cell" (pSCell). Note that the pSCell may be referred to as "special cell" or "Special Secondary Cell" (Special SCell). Some of the functions (for example, functions for transmitting and/or receiving a PDCCH) of the PCell (the base station device constituting the PCell) may be supported by the Special SCell (the base station device constituting the Special SCell). Additionally, some of the functions of the PCell may be supported in the pSCell. For example, the function for transmitting a PDCCH may be supported by the pSCell. Additionally, the function for performing a PDCCH transmission may be supported in the pSCell using a search space different from a CSS or USS. For example, the search space different from a USS is a search space determined based on a value defined in the specification, a search space determined based on an RNTI different from a C-RNTI, a search space determined based on a value configured by a higher layer that is different from the RNTI, or the like. Moreover, the pSCell may constantly be in a starting state. Moreover, the pSCell is a cell capable of receiving the PUCCH.

In dual connectivity, the Data Radio Bearer (DRB) may be individually allocated to the MeNB and the SeNB. On the other hand, the Signalling Radio Bearer (SRB) may be allocated only to the MeNB. In dual connectivity, a duplex mode may be configured individually for the MCG and the SCG or the PCell and the pSCell. In dual connectivity, the MCG and the SCG or the PCell and the pSCell need not necessarily be synchronized with each other. In dual connectivity, multiple parameters for timing adjustment (TAG or Timing Advance Group) may be configured for each of the MCG and the SCG. In other words, the terminal device is capable of performing uplink transmission at multiple different timings in each CG.

In dual connectivity, the terminal device is allowed to transmit UCI corresponding to the cells in the MCG only to the MeNB (the PCell) and to transmit UCI corresponding to the cells in the SCG to SeNB (the pSCell) only. For example, the UCI is an SR, HARQ-ACK, and/or CSI. Additionally, in each UCI transmission, a transmission method using the PUCCH and/or the PUSCH is applied to each cell group.

All signals can be transmitted and/or received in the primary cell, but some signals may not be transmitted and/or received in the secondary cell. For example, a Physical Uplink Control CHannel (PUCCH) is transmitted only in the primary cell. Additionally, unless multiple Timing Advance Groups (TAGs) are configured between the cells, a Physical Random Access CHannel (PRACH) is transmitted only in the primary cell. Additionally, a Physical Broadcast CHannel (PBCH) is transmitted only in the primary cell. Additionally, a Master Information Block (MIB) is transmitted only in the primary cell. Signals that can be transmitted and/or received in the primary cell are transmitted and/or received in the primary secondary cell. For example, the PUCCH may be transmitted in the primary secondary cell. Additionally, the PRACH may be transmitted in the primary secondary cell, regardless of whether multiple TAGs are configured. Additionally, the PBCH and the MIB may be transmitted in the primary secondary cell.

In the primary cell, Radio Link Failure (RLF) is detected. In the secondary cell, even if conditions for the detection of RLF are in place, the detection of the RLF is not recognized. However, in the primary secondary cell, the RLF is detected if the conditions are in place. In a case that an RLF is detected in the primary secondary cell, the higher layer of the primary secondary cell announces, to the higher layer of the primary cell, that the RFL has been detected. Semi-Persistent Scheduling (SPS) or Discontinuous Reception (DRX) may be used in the primary cell. The same DRX as in the primary cell may be used in the secondary cell. Fundamentally, in the secondary cell, the MAC configuration information/parameters are shared with the primary cell/primary secondary cell of the same call group. Some of the parameters (for example, sTAG-Id) may be configured for each secondary cell. Some of the timers or counters may be applied only to the primary cell and/or the primary secondary cell. A timer or counter to be applied may be configured only to the secondary cell.

In an example where dual connectivity is applied to the LAA cell, the MCG (base station device 2-1) is a base station device which constitutes the primary cell. The SCG (base station device 2-2) is a base station device which constitutes the LAA cell. In other words, the LAA cell is configured as pSCell of the SCG.

In another example where dual connectivity is applied to the LAA cell, the MCG is the base station device which constitutes the primary cell, and the SCG is the base station device which constitutes the pSCell and the LAA cell. In other words, the LAA cell is assisted by the pSCell in the SCG. Note that in a case that the secondary cell is further configured to the SCG, the LAA cell may be assisted by the secondary cell.

In still another example where dual connectivity is applied to the LAA cell, the MCG is the base station device which constitutes the primary cell and the LAA cell, and the SCG is the base station device which constitutes the pSCell. In other words, the LAA cell is assisted by the primary cell in the MCG. Note that in a case that the secondary cell is further configured to the MCG, the LAA cell may be assisted by the secondary cell.

Figure 3:
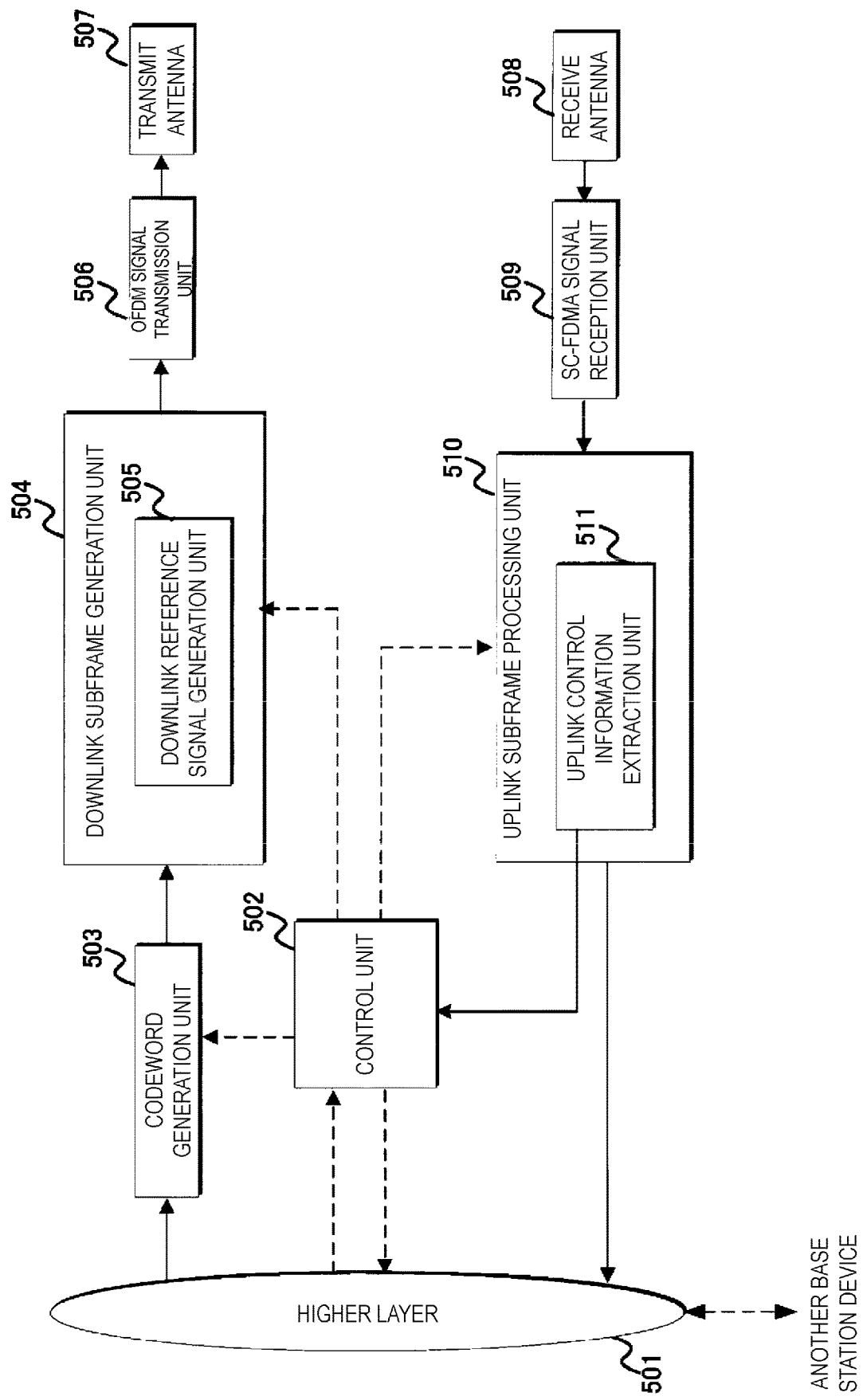
FIG. 3 is a schematic diagram illustrating an example of a block configuration of a base station device 2 according to the present embodiment.

FIG. 3 is a schematic diagram illustrating an example of a block configuration of a base station device 2 according to the present embodiment. The base station device 2 includes a higher layer (higher-layer control information notification unit, higher layer processing unit) 501, a control unit (base station control unit) 502, a codeword generation unit 503, a downlink subframe generation unit 504, an OFDM signal transmission unit (downlink transmission unit) 506, a transmit antenna (base station transmit antenna) 507, a receive antenna (base station receive antenna) 508, an SC-FDMA signal reception unit (CSI reception unit) 509, and an uplink subframe processing unit 510. The downlink subframe generation unit 504 includes a downlink Reference Signal generation unit 505. Moreover, the uplink subframe processing unit 510 includes an uplink control information extraction unit (CSI acquisition unit) 511.

Figure 4:
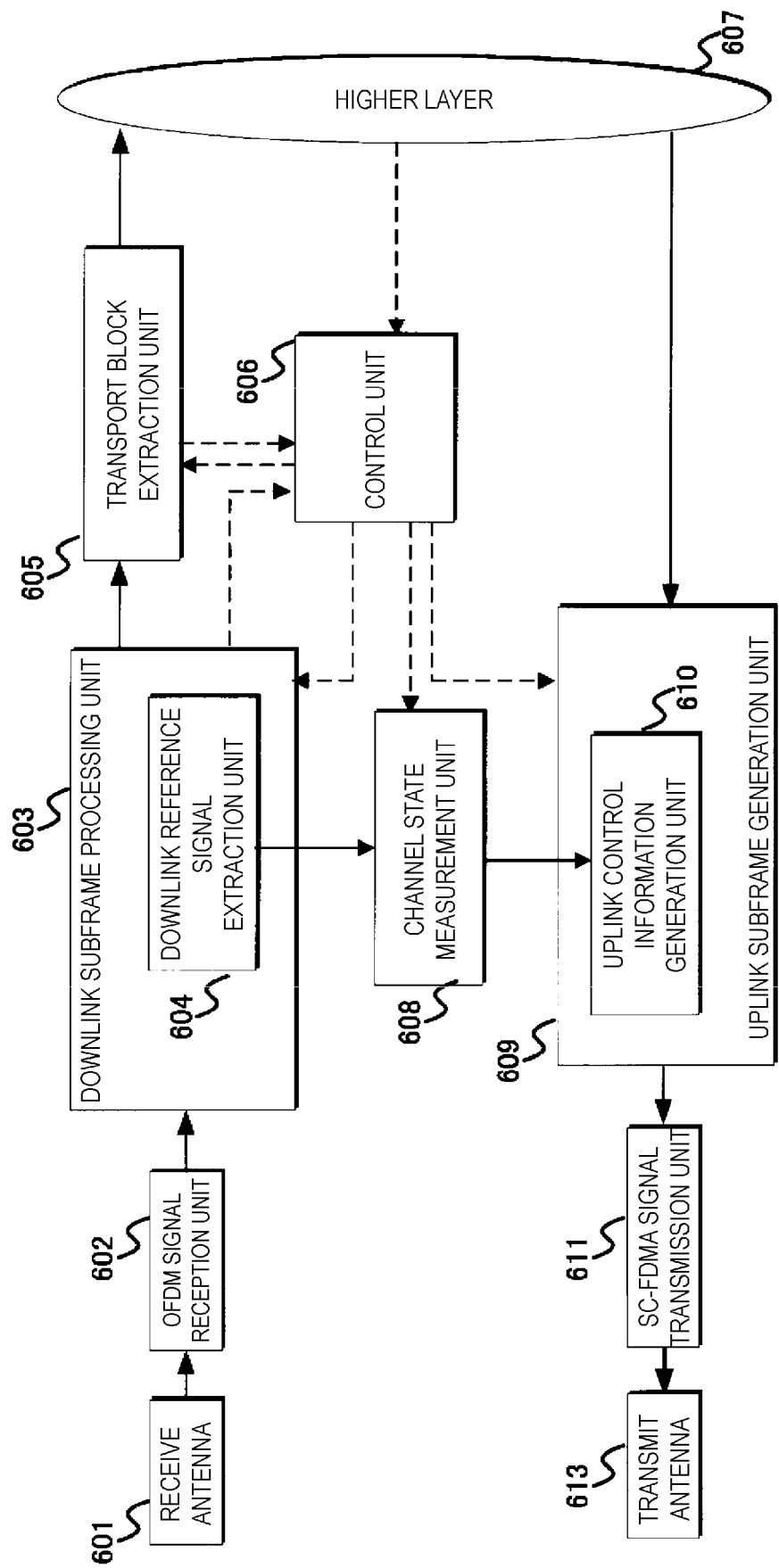
FIG. 4 is a schematic diagram illustrating an example of a block configuration of a terminal device 1 according to the present embodiment.

FIG. 4 is a schematic diagram illustrating an example of a block configuration of a terminal device 1 according to the present embodiment. The terminal device 1 includes a receive antenna (terminal receive antenna) 601, an OFDM signal reception unit (downlink reception unit) 602, a downlink subframe processing unit 603, a transport block extraction unit (data extraction unit) 605, a control unit (terminal control unit) 606, a higher layer (higher-layer control information acquisition unit, higher layer processing unit) 607, a channel state measurement unit (CSI generation unit) 608, an uplink subframe generation unit 609, SC-FDMA signal transmission units (UCI transmission units) 611 and 612, and transmit antennas (terminal transmit antennas) 613 and 614. The downlink subframe processing unit 603 includes a downlink reference signal extraction unit 604. Moreover, the uplink subframe generation unit 609 includes an uplink control information generation unit (UCI generation unit) 610.

First, a flow of downlink data transmission and/or reception will be described with reference to FIG. 3 and FIG. 4. In the base station device 2, the control unit 502 holds a Modulation and Coding Scheme (MCS) indicating a modulation scheme, a coding rate, and the like in the downlink, downlink resource allocation indicating RBs to be used for data transmission, and information to be used for HARQ control (a Redundancy Version, an HARQ process number, and a new data indicator) and controls the codeword generation unit 503 and downlink subframe generation unit 504 based on these elements. The downlink data (also referred to as a downlink transport block) transmitted from the higher layer 501 is processed through error correction coding, rate matching, and the like in the codeword generation unit 503 under the control of the control unit 502 and then, a codeword is generated. Two codewords at maximum are transmitted at the same time in a single subframe of a single cell. In the downlink subframe generation unit 504, a downlink subframe is generated in accordance with an instruction from the control unit 502. First, a codeword generated in the codeword generation unit 503 is converted into a modulation symbol sequence through a modulation process, such as Phase Shift Keying (PSK) modulation or Quadrature Amplitude Modulation (QAM). Moreover, a modulation symbol sequence is mapped onto REs of some RBs, and a downlink subframe for each antenna port is generated through a precoding process. In this operation, a transmission data sequence transmitted from the higher layer 501 includes higher-layer control information, which is control information on the higher layer (e.g., dedicated (individual) Radio Resource Control (RRC) signalling). Moreover, in the downlink Reference Signal generation unit 505, a downlink Reference Signal is generated. The downlink subframe generation unit 504 maps the downlink Reference Signal to the REs in the downlink subframes in accordance with an instruction from the control unit 502. The downlink subframe generated in the downlink subframe generation unit 504 is modulated to an OFDM signal in the OFDM signal transmission unit 506 and then transmitted via the transmit antenna 507. Although a configuration of including one OFDM signal transmission unit 506 and one transmit antenna 507 is provided as an example here, a configuration of including multiple OFDM signal transmission units 506 and transmit antennas 507 may be employed in a case that downlink subframes are transmitted on multiple antenna ports. Moreover, the downlink subframe generation unit 504 may also have the capability of generating physical-layer downlink control channels, such as a PDCCH and an EPDCCH, to map the channels to the REs in downlink subframes. Multiple base station devices (base station device 2-1 and base station device 2-2) transmit separate downlink subframes.

In the terminal device 1, an OFDM signal is received by the OFDM signal reception unit 602 via the receive antenna 601, and an OFDM demodulation process is performed on the signal. The downlink subframe processing unit 603 first detects physical-layer downlink control channels, such as a PDCCH and an EPDCCH. More specifically, the downlink subframe processing unit 603 decodes the signal by assuming that a PDCCH and an EPDCCH have been transmitted in the regions to which the PDCCH and the EPDCCH can be allocated, and checks Cyclic Redundancy Check (CRC) bits added in advance (blind decoding). In other words, the downlink subframe processing unit 603 monitors a PDCCH and an EPDCCH. In a case that the CRC bits match an ID (a single terminal-specific identifier assigned to a single terminal, such as a Cell-Radio Network Temporary Identifier (C-RNTI) or a Semi-Persistent Scheduling-C-RNTI (SPS-C-RNTI), or a Temporary C-RNTI) assigned by the base station device in advance, the downlink subframe processing unit 603 recognizes that a PDCCH or an EPDCCH has been detected and extracts a PDSCH by using control information included in the detected PDCCH or EPDCCH. The control unit 606 holds an MCS indicating a modulation scheme, a coding rate, and the like in the downlink based on the control information, downlink resource allocation indicating RBs to be used for downlink data transmission, and information to be used for HARQ control, and controls the downlink subframe processing unit 603, the transport block extraction unit 605, and the like based on these elements. More specifically, the control unit 606 performs control so as to carry out an RE mapping process in the downlink subframe generation unit 504, an RE demapping process and demodulation process corresponding to the modulation process, and the like. The PDSCH extracted from the received downlink subframe is transmitted to the transport block extraction unit 605. The downlink Reference Signal extraction unit 604 in the downlink subframe processing unit 603 extracts the downlink reference signal from the downlink subframe. In the transport block extraction unit 605, a rate matching process, a rate matching process corresponding to error correction coding, error correction decoding, and the like in the codeword generation unit 503 are carried out, and a transport block is extracted and transmitted to the higher layer 607. The transport block includes the higher-layer control information, and the higher layer 607 notifies the control unit 606 of a necessary physical-layer parameter based on the higher-layer control information. The multiple base station devices 2 (base station device 2-1 and base station device 2-2) transmit separate downlink subframes, and the terminal device 1 receives the downlink subframes. Hence, the above-described processes may be carried out for the downlink subframe of each of the multiple base station devices 2. In this situation, the terminal device 1 may recognize or may not necessarily recognize that multiple downlink subframes have been transmitted from the multiple base station devices 2. In a case that the terminal device 1 does not recognize the subframes, the terminal device 1 may simply recognize that multiple downlinks subframes have been transmitted in multiple cells. Moreover, the transport block extraction unit 605 determines whether the transport block has been detected correctly and transmits the decision result to the control unit 606.

Next, a flow of uplink signal transmission and/or reception will be described. In the terminal device 1, a downlink Reference Signal extracted by the downlink reference signal extraction unit 604 is transmitted to the channel state measurement unit 608 under the instruction from the control unit 606, the channel state and/or interference is measured in the channel state measurement unit 608, and further CSI is calculated based on the measured channel state and/or interference. The control unit 606 instructs the uplink control information generation unit 610 to generate an HARQ-ACK (DTX (not transmitted yet), ACK (detection succeeded), or NACK (detection failed)) and map the resultant to a downlink subframe based on the decision result of whether the transport block is correctly detected. The terminal device 1 performs these processes on the downlink subframe of each of multiple cells. In the uplink control information generation unit 610, a PUCCH including the calculated CSI and/or HARQ-ACK is generated. In the uplink subframe generation unit 609, the PUSCH including the uplink data transmitted from the higher layer 607 and the PUCCH generated by the uplink control information generation unit 610 are mapped to the RBs in an uplink subframe to generate an uplink subframe. The uplink subframe is subjected to the SC-FDMA modulation to generate an SC-FDMA signal, and the SC-FDMA signal is transmitted via the transmit antenna 613 by the SC-FDMA signal transmission unit 611.

Details of the LAA cell will be described below.

The frequency used by the LAA cell is shared with other communication systems and/or other LTE operators. To share the frequency, the LAA cell needs fairness with the other communication systems and/or the other LTE operators. For example, a communication method used by the LAA cell needs a fair frequency sharing technique (method). In other words, the LAA cell is a cell which performs a communication method (communication procedure) to which the fair frequency sharing technique is applicable (used).

An example of the fair frequency sharing technique is Listen-Before-Talk (LBT). In the LBT, before a base station or terminal transmits a signal using a frequency (component carrier, cell), an interference power of the frequency (interference signal, received power, received signal, noise power, or noise signal) or the like is measured (or detected) to identify (detect, assume, or determine) whether the frequency is in an idle state (available state, congested state, Presence, or Occupied), or a busy state (unavailable state, not-congested state, Absence, or Clear). In a case that the frequency being in the idle state is identified based on the LBT, the LAA cell can transmit a signal at a predetermined timing of the frequency. In a case that the frequency is identified as the busy state based on the LBT, the LAA cell does not transmit a signal at the predetermined timing of the frequency. LBT controls and prevents an interference with signals to be transmitted by other communication systems and/or other base stations including other LTE operators and/or terminals.

A procedure of the LBT is defined as a mechanism to which a CCA check is applied before a base station or a terminal uses the frequency (channel). The CCA performs power detection or signal detection for determining presence or absence of another signal in the channel to identify whether the frequency is in the idle state or the busy state. Note that in the present embodiment, a definition of CCA may be equivalent to a definition of LBT.

CCA can use various methods as a method for determining the presence or absence of another signal. For example, CCA makes the determination based on whether the interference power at a certain frequency exceeds a certain threshold. Moreover, for example, CCA makes the determination based on whether the receive power of a predetermined signal or channel at a certain frequency exceeds a certain threshold. The threshold may be defined in advance. The threshold may be configured by a base station or another terminal. The threshold may be determined (configured) based on at least another value (parameter) such as transmit power (maximum transmit power).

Note that CCA in the LAA cell does not need to be recognized by the terminal connected with (configured to) the LAA cell.

The LAA cell may be defined as a cell different from a secondary cell which uses the allocated frequency. For example, the LAA cell is configured differently from the configuration of the secondary cell which uses the allocated frequency. Part of parameters configured to the LAA cell is not configured to the secondary cell which uses the allocated frequency. Part of the parameters configured to the secondary cell which uses the allocated frequency is not configured to the LAA cell. In the present embodiment, the LAA cell is described as a cell different from the primary cell and the secondary cell(s), but the LAA cell may be defined as one of the secondary cells. Secondary cells of the related art are also referred to as "first secondary cells", and the LAA cell is also referred to as "second secondary cell". A primary cell and secondary cell(s) of the related art are also referred to as "first serving cells", and the LAA cell is also referred to as "second serving cell".

The LAA cell may be different from a frame structure type of the related art. For example, a first frame structure type (FS1, FDD) or a second frame structure type (FS2, TDD) are used for (configured to) the known serving cells, while a third frame structure type (FS3) is used for (configured to) the LAA cell.

The FS1 is applicable only to Frequency Division Duplex (FDD). In other words, the FS1 is only applicable to cell operation supporting the FDD. The FS1 is applicable to Full Duplex-FDD (FD-FDD) and Half Duplex-FDD (HD-FDD). In the FDD, 10 subframes can be used for each of downlink transmission and uplink transmission. The downlink transmission and the uplink transmission are separated in the frequency domain. In other words, different carrier frequencies are applied to the downlink transmission and the uplink transmission. In an HD-FDD operation, the terminal device is not able to perform transmission and reception at the same time, but, in an FD-FDD operation, is able to perform transmission and reception at the same time.

Moreover, there are two types of HD-FDD: for a type A HD-FDD operation, a guard period is created by a terminal device by not receiving the last part (last symbol) of a downlink subframe immediately before an uplink subframe from the same terminal device; and for a type B HD-FDD operation, guard periods, each referred to as an HD guard subframe, are created by a terminal device by not receiving a downlink subframe immediately before an uplink subframe from the same terminal device, and by not receiving a downlink subframe immediately after an uplink subframe from the same terminal device. That is, in the HD-FDD operation, a guard period is created by the terminal device controlling a reception process of the downlink subframe. Note that the symbols may include any of an OFDM symbol and an SC-FDMA symbol.

The FS2 is applicable only to Time Division Duplex (TDD). In other words, the FS2 is only applicable to cell operation supporting the TDD. Each radio frame is constituted of two half-frames. Each half-frame is constituted of five subframes. The UL-DL configuration in a certain cell may change among radio frames. The subframe in uplink or downlink transmission may be controlled in the latest radio frame. The UL-DL configuration in the latest radio frame is acquirable via a PDCCH or higher layer signaling. Note that the UL-DL configuration indicates a constitution of an uplink subframe, a downlink subframe, and a special subframe, in TDD. The special subframe is constituted of a DwPTS enabling downlink transmission, a Guard Period (GP), and a UpPTS enabling uplink transmission. The configurations of a DwPTS and a UpPTS in a special subframe are managed in a table, so that the terminal device can acquire the constitution via higher layer signaling. Note that the special subframe serves as a switch point from downlink to uplink.

The FS3 may be applied only to Licensed Assisted Access (LAA) secondary cell operation with a normal CP (NCP). 10 subframes included in the radio frame can be used for downlink transmission. The terminal device performs processing on the subframes by assuming that the subframes are empty instead of assuming that any signal is present in any of the subframes, unless otherwise specified or as long as downlink transmission is not detected in the subframes. Downlink transmission solely uses one or multiple contiguous subframes. The contiguous subframes start from the beginning of the first slot or the second slot of the first subframe and ends at the last subframe solely used as a full subframe or based on one DwPTS period. The contiguous subframes are also referred to as a transmission burst.

Here, the non-allocated frequency (unlicensed band, unlicensed spectrum) is a frequency different from the allocated frequency (licensed band, licensed spectrum) that is allocated as a dedicated frequency to a prescribed operator. For example, the non-allocated frequency is a frequency used by a wireless LAN. For example, the non-allocated frequency is a frequency which is not configured to the LTE in the related art, and the allocated frequency is a frequency which can be configured by the LTE in the related art. In the present embodiment, the frequency configured to the LAA cell is described as the non-allocated frequency, but is not limited to this. In other words, the non-allocated frequency can be replaced with a frequency configured to the LAA cell. For example, the non-allocated frequency is a frequency which cannot be configured to the primary cell, and is a frequency which can be configured only to the secondary cell(s). For example, the non-allocated frequency includes a frequency shared with multiple operators. For example, the non-allocated frequency is a frequency which is configured only to a cell configured, assumed and/or processed differently from the primary cell or secondary cell(s) of the related art.

In a case that, for example, the operating bands are managed by the table, operating bands associated with an index "1" to an index "44" may be preferably licensed bands (bands which are not LAA), and an operating band associated with an index "45" may be preferably an unlicensed band (LAA band). Note that 5150 MHz to 5250 Hz and 5725 MHz to 5850 Hz may be preferably unlicensed bands (LAA bands). In other words, the predetermined frequency described above may be preferably an operating band associated with the index "45".

The LAA cell may be a cell which uses a different method from the method of the related art for structures of radio frames, physical signals and/or physical channels according to LTE, and a communication procedure.

For example, in the LAA cell, predetermined signals and/or channels configured. (transmitted) by the primary cell and/or the secondary cell(s) are not configured (transmitted). The predetermined signals and/or channels include the CRS, the DS, the PDCCH, the EPDCCH, the PDSCH, the PSS, the SSS, the PBCH, a PHICH, a PCFICH, the CSI-RS and/or an SIB, or the like. For example, the signals and/or the channels that are not configured in the LAA cell are as follows. In addition, the signals and/or the channels described below may be used in combination. Note that in the present embodiment, the signals and/or the channels that are not configured in the LAA cell may also be read as signals and/or channels whose the transmissions from the LAA cell are not expected by the terminal.

(1) in the LAA cell, control information of a physical layer is not transmitted on the PDCCH, but is transmitted only on the EPDCCH.

(2) In the LAA cell, the CRS, the DMRS (DL DMRS), the URS, the PDCCH, the EPDCCH and/or the PDSCH are not transmitted in subframes which are activated (on-state) or all subframes, and the terminal does not assume this transmission in all subframes.

(3) In the LAA cell, the terminal assumes that the DRS, PSS, and/or SSS is transmitted at the subframe in the activation state (ON).

(4) In the LAA cell, information of CRS mapping is announced to the terminal for each subframe, and the terminal assumes the CRS mapping based on the information. For example, according to the assumption of the CRS mapping, the CRS is not mapped onto all resource elements of the corresponding subframe, According to the assumption of the CRS mapping, the CRS is not mapped onto part of resource elements (e.g., all resource elements in two head OFDM symbols) of the corresponding subframe. According to the assumption of the CRS mapping, the CRSs are mapped onto all resource elements of the corresponding subframe. For example, the information of the CRS mapping is announced from the corresponding LAA cell or a cell different from the corresponding LAA cell. The information of the CRS mapping is included in the DCI and is announced on the PDCCH or the EPDCCH.

For example, in the LAA cell, the predetermined signals and/or channels which are not configured (transmitted) by the primary cell and/or the secondary cell(s) are configured (transmitted).

For example, in the LAA cell, only downlink component carrier or subframe is defined, and only downlink signal and/or channel are transmitted. In other words, in the LAA cell, any uplink component carrier or subframe may not be defined, and any uplink signal and/or channel may not be transmitted. Moreover, whether or not to perform uplink transmission in the LAA cell may be determined based on capability information on the terminal device.

For example, a Downlink Control Information (DCI) format which can support the LAA cell may be different from a DCI format which can support the primary cell and/or the secondary cell(s). The DCI format which supports only the LAA cell is defined. The DCI format which supports the LAA cell includes control information which is only valid for the LAA cell.

For example, in the LAA cell, the assumption of the signals and/or channels is different from the secondary cells in the related art.

First, the assumption of the signals and/or channels in the secondary cells of the related art will be described. A terminal that satisfies part or all of the following conditions assumes that the PSS, the SSS, the PBCH, the CRS, the PCFICH, the PDSCH, the PDCCH, the EPDCCH, the PHICH, the DMRS and/or the CSI-RS may not be transmitted by the secondary cell except transmission of the DS. The terminal assumes that the DS is always transmitted by the secondary cell. The assumption continues to a subframe in which an activation command (a command for activation) is received by the terminal in the secondary cell at a certain carrier frequency.

(1) The terminal supports a configuration (parameter) associated with the DS.

(2) RRM measurements based on the DS is configured to the terminal in the secondary cell.

(3) The secondary cell is deactivated (deactivated state).

(4) Reception of the MBMS by a higher layer is not configured to the terminal in the secondary cell.

Furthermore, in a case that the secondary cell is activated (activated state), the terminal assumes that the PSS, the SSS, the PBCH, the CRS, the PCFICH, the PDSCH, the PDCCH, the EPDCCH, the PHICH, the DMRS and/or the CSI-RS are transmitted by the secondary cell in a configured predetermined subframe or all subframes.

Next, an example of the assumption of the signals and/or channels in the LAA cell will be described. A terminal that satisfies part or all of the following conditions assumes that the PSS, the SSS, the PBCH, the CRS, the PCFICH, the PDSCH, the PDCCH, the EPDCCH, the PHICH, the DMRS and/or the CSI-RS may not be transmitted together with transmission of the DS by the LAA cell. The assumption continues to a subframe in which an activation command (a command for activation) is received by the terminal in the secondary cell at a certain carrier frequency.

(1) The terminal supports a configuration (parameter) associated with the DS.

(2) RRM measurements based on the DS is configured to the terminal in the LAA cell.

(3) The LAA cell is deactivated (deactivated state).

(4) Reception of the MBMS by a higher layer is not configured to the terminal in the LAA cell.

Furthermore, another example of the assumption of the signals and/or channels in the LAA cell will be described. In a case that the LAA cell is deactivated (deactivated state), the assumption of the signals and/or channels in the LAA cell is the same as the assumption of the signals and/or channels in the secondary cells in the related art. In a case that the LAA cell is activated (activated state), the assumption of the signals and/or channels in the LAA cell is different from the assumption of the signals and/or channels in the secondary cells in the related art. In a case that, for example, the LAA cell is activated (activated state), the terminal assumes that the LAA cell may not transmit the PSS, the SSS, the PBCH, the CRS, the PCFICH, the PDSCH, the PDCCH, the EPDCCH, the PHICH, the DMRS and/or the CSI-RS except a predetermined subframe configured to the LAA cell. Details will be described below.

Next, a communication procedure in the LAA cell is described in detail. In the LAA cell, channel and/or signal transmission can be started based on the LBT at timing independent of a Subframe boundary. Moreover, in the LAA cell, channel and/or signal transmission can be ended based on the LBT and the maximum burst length for which transmission is possible, at timing independent of the Subframe boundary. In other words, the channel and/or the signal can be transmitted at a partial subframe. The partial subframe can be defined, for example, as follows. Here, in the present embodiment, OFDM symbols, at which transmission is possible, indicated by the partial subframe can be defined as a symbol. At the symbol, it is assumed that the terminal transmits each of or all the channels and/or the signals.

(1) In a subframe, transmission is possible at the area from an OFDM symbol in the middle of the subframe to the last OFDM symbol of the subframe (Subframe boundary). In the present embodiment, the area is also referred to as a first partial subframe.

(2) In a subframe, transmission is possible at the area from the first OFDM symbol of the subframe (Subframe boundary) to an OFDM symbol in the middle of the subframe. In the present embodiment, the area is also referred to as a second partial subframe.

(3) In a subframe, transmission is possible at the area from an OFDM symbol in the middle of the subframe to an OFDM symbol in the middle of the subframe. In the present embodiment, the area is also referred to as a third partial subframe.

Moreover, in the partial subframe, the number of OFDM symbols in the middle of the subframe can be limited to a predetermined number. For example, the prescribed number is 2, 3, and/or 4.

In a case that the predetermined number is 2, the partial subframe can be set to one slot or one subframe (two slots), for example. In other words, the time direction unit of the second EPDCCH is one slot or one subframe. In a case that the time direction unit of the second EPDCCH is one slot, the time direction unit of the PDSCH scheduled by the second EPDCCH can also be one slot. In other words, a communication method (scheme) using one subframe as a unit as in the LTE of the related art and a communication method using one slot, which is half of that in the LTE of the related art, are used while being switched appropriately. Using one slot as a unit can reduce latency in radio communication. This allows a communication method capable of reducing latency in radio communication to be achieved in addition to a communication method similar to the LTE of the related art. This can be applied not only to the LAA cell but also the LTE of the related art used in the Licensed spectrum. Hence, all the methods and constitutions described in the present embodiment can be applied not only to the LAA cell but also the LTE of the related art used for the Licensed spectrum.

Here, in the LAA cell, in a case that the channel and/or signal transmission is enabled, the period in which the LAA cell can perform transmission is defined based on the LBT. The period is also referred to as a maximum burst length, and the channel and/or the signal transmitted in the period is also referred to as burst. For example, the maximum burst length is 4 ms (four subframe length). Hence, in each burst, the first subframe of the burst is a first partial subframe, and the last subframe of the burst is a second partial subframe. Note that each partial subframe is also referred to as a floating subframe. Additionally, each partial subframe may be a subframe including a symbol/subframe at which channel and/or signal described in the present embodiment is not transmitted (cannot be transmitted). Note that the partial subframe at the beginning of each burst is referred to also as an initial partial subframe. In addition, the partial subframe at the end of each burst is referred to also as an end partial subframe.

Here, the burst may be constituted of one or more contiguous subframes. Moreover, the burst may be constituted of the initial partial subframe and the end partial subframe. The burst may be referred to as transmission burst.

The partial subframe need not include a prescribed physical channel and physical signal. For example, the partial subframe need not include a CSI-RS, DS, PRS, PSS/SSS, PBCH, PCFICH, and the like. In other words, a specific physical channel and physical signal may be transmitted in the partial subframe.

The start position of the OFDM symbol used in the initial partial subframe is configured at {0} or {0, 7} (i.e., a prescribed value), based on higher layer signaling. For example, in a case that the start position of the OFDM symbol is configured at {0}, the initial partial subframe starts from OFDM symbol #0. In other words, the terminal device performs blind detection of a CRS only in OFDM symbol #0. In a case that the start position of the OFDM symbol is configured at {0, 7}, the initial partial subframe starts from OFDM symbol #0 or #7. In other words, the terminal device performs blind detection of a CRS only in OFDM symbol #0 or #7. The start position in a subframe may be referred to as a start symbol. Note that a reservation signal or an initial signal need not be included at this start position. Stated differently, in a case that the start position of the OFDM symbol is 0, the initial partial subframe may be considered as a full subframe and subjected to processing accordingly. In other words, the start position of the OFDM symbol may be configured at 0, and similar resource mapping, layer mapping, and the like to those of the full subframe may be applied to the initial partial subframe in which a CRS is detected in OFDM symbol #0.

The base station device transmits downlink burst from OFDM symbol #0 or #7, based on the information configured in the terminal device and a result of CCA.

The slot number used in generation of the sequence of a physical channel/physical signal (e.g., CRS or DL DMRS) mapped to the partial subframe in which the start position is 7 may be the second slot number or the slot number of the end of the subframe.

The number of OFDM symbols used in the end partial subframe is indicated by using the PDCCH (DCI format included in the PDCCH) mapped to the CSS included in the end partial subframe or the subframe that is one subframe before the end partial subframe. The number of OFDM symbols used in the end partial subframe may be the symbol number of the end symbol used in the end partial subframe.

A subframe at which transmission is possible in the area from the first OFDM symbol in the subframe (subframe boundary) to the last OFDM symbol in the subframe (subframe boundary), is also referred to as a full subframe or a regular subframe. The full subframe may be a subframe other than partial subframes. In each burst, the full subframe may be a subframe other than the first subframe of the burst or the last subframe of the burst. The full subframe may be a subframe not including any symbol/subframe at which the channel and/or the signal described in the present embodiment is not transmitted (cannot be transmitted). Moreover, the full subframe in the LAA cell may be a subframe having the same configuration and/or a subframe at which the same processing as that of a normal subframe in a normal cell is performed.

Figure 5:
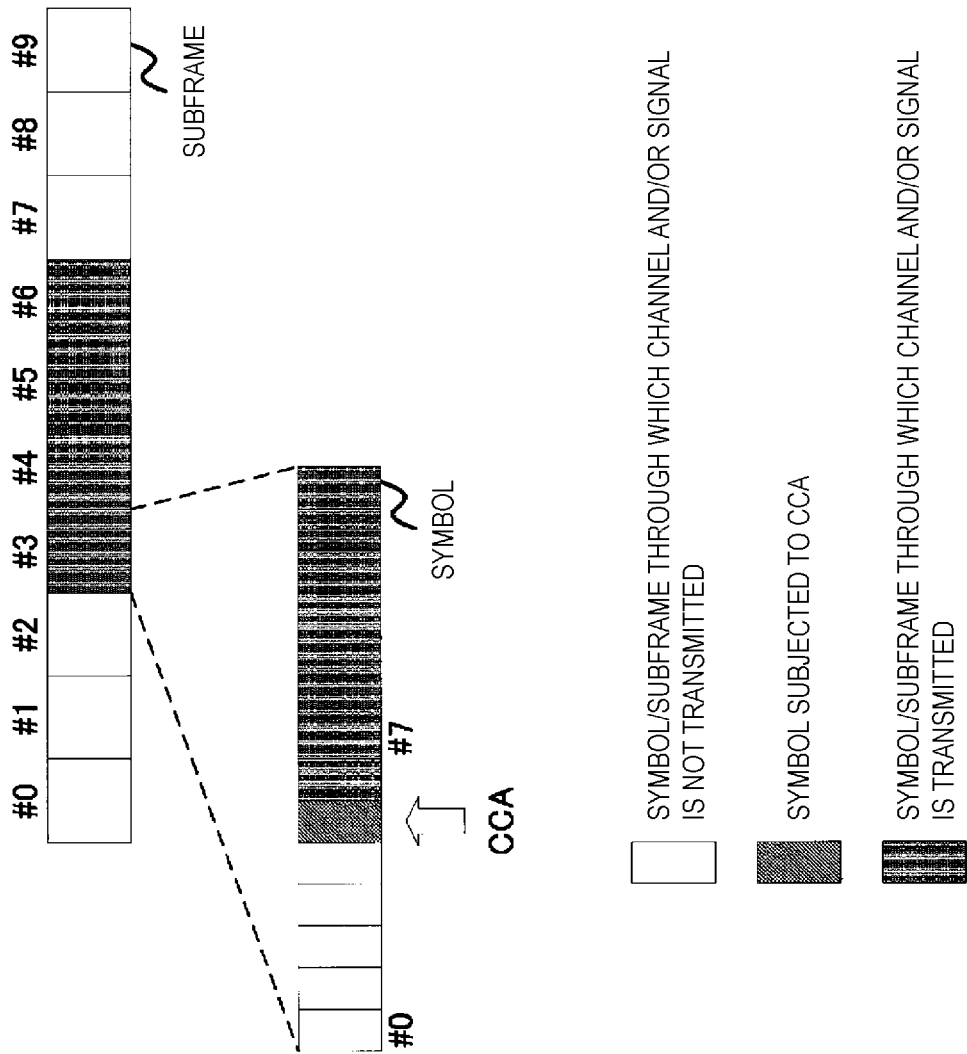
FIG. 5 is a diagram illustrating an example of a communication procedure in a LAA cell according to the present embodiment.

FIG. 5 is a diagram illustrating an example of a communication procedure in an LAA cell. FIG. 5 illustrates 10 subframes designated as subframes #0 to #9, and 14 symbols (OFDM symbols) designated as symbols #0 to #13 in the subframe #3. In this example, the LAA cell can transmit a signal up to 4 ms (corresponding to 4 subframes), and the CCA is performed on the symbol #5 in the subframe #3. Assume that the LAA cell identifies that the frequency is in the idle state through the CCA and a signal can be transmitted at symbols immediately after the identification. In FIG. 5, the LAA cell transmits the signals at the symbols from the symbol #6 in the subframe #3 to a predetermined symbol in the subframe #6.

In FIG. 5, the symbol or subframe represented as the symbol/subframe at which the channel and/or signal is not transmitted (cannot be transmitted) indicates that the LAA transmits nothing. In FIG. 5, the symbol or subframe represented as the symbol/subframe at which the channel and/or signal is transmitted (can be transmitted) indicates that the LAA transmits at least a PDSCH, and a terminal-specific Reference Signal associated with the PDSCH. The PDSCH is mapped (scheduled) to each terminal using a resource block pair as a unit. Information on the mapping (scheduling) is notified via the PDCCH or EPDCCH transmitted at each subframe. The mapping information for a PDSCH at a subframe may be notified at the identical subframe or at another subframe.

In FIG. 5, in a case that the LAA cell transmits a PDSCH using the symbol #6 to #13 in the subframe #3, the terminal receiving the PDSCH needs to recognize that the PDSCH is mapped to the symbol #6 to #13 in the subframe #3.

An example of the recognition uses information for recognizing a symbol at which a channel and/or signal is transmitted in a predetermined subframe subframe #3) in the LAA cell. For example, the information is any or a combination of the following information.

(1) The information is information indicating a start symbol in the symbols at which the channel and/or signal is transmitted in the predetermined subframe. The information indicating the start symbol is any of 0 to 13, each value of which indicates a symbol number of a symbol to be the start symbol.

(2) The information is information indicating a start symbol in the symbols at which the channel and/or signal is transmitted in the predetermined subframe. The information indicating the start symbol is index information in which values predefined from values 0 to 13 are indexed.

(3) The information is bitmap information indicating symbols at which the channel and/or signal is transmitted in the predetermined subframe. The bitmap information is constituted by 14 bits. In the bitmap information, in a case that a bit has one state (e.g., "1"), the bit indicates the symbol at which the channel and/or signal is transmitted, and in a case that a bit has the other state (e.g., "0"), the bit indicates the symbol at which the channel and/or signal is not transmitted.

(4) The information is information indicating an end symbol among the symbols at which any channel and/or signal is not transmitted in the prescribed subframe, or information indicating the number of symbols of the symbols at which the channel and/or signal is not transmitted. For example, the end symbol is any of 0 to 13, and each value of which indicates a symbol number of a symbol to be the end symbol. For example, the information indicating the number of symbols is any of 1 to 14, and each value of which indicates the number of the symbols.

(5) The information is information indicating an end symbol in the symbols at which the channel and/or signal is not transmitted in the predetermined subframe, or information indicating the number of symbols of the symbols at which the channel and/or signal is not transmitted. For example, the end symbol is index information in which values predefined from values 0 to 13 are indexed. For example, the information indicating the number of symbols is index information in which values predefined from values 1 to 14 are indexed.

A method for notifying the information for recognizing the symbol at which the channel and/or signal is transmitted employs any of methods described as below, for example.

(1) The information is notified using the parameter configured (notified) to the LAA cell by way of RRC signalling or MAC signalling. In a case that a Serving cell is an LAA cell, the channel and/or signal is not transmitted at a symbol configured in a subframe, and the channel and/or signal is transmitted at other symbols. For example, the symbols at which the channel and/or signal is not transmitted are configured as the symbols #0 and #1 in a subframe. The symbols at which the channel and/or signal is not transmitted are configured as the symbols #2 and #13 in a subframe. This configuration may be different (independent) depending on the channel and/or signal. For example, the terminal is configured such that the EPDCCH is mapped to the symbols #2 to #13 and the PDSCH is mapped to the symbols #1 to #13 in a subframe. Moreover, for example, a range of the start symbol of the PDSCH (possible values) configured to the LAA cell may be different from a range (1 to 4) of the start symbol of the PDSCH configured to the Secondary cell of the related art. The range of the start symbol of the PDSCH and/or EPDCCH configured to the LAA cell is 0 to 13.

(2) The information is notified using a PDCCH or EPDCCH transmitted from the LAA cell or the Serving cell different from the LAA cell (assist cell, Primary cell, or Secondary cell). The DCI carried (transmitted) by the PDCCH or EPDCCH includes the information.

(3) The information is notified using a channel or signal for notifying the information. The channel or signal for notifying the information is transmitted only to the LAA cell. The channel or signal for notifying the information is transmitted from the LAA cell or the Serving cell different from the LAA cell (assist cell, Primary cell, or Secondary cell).

(4) Candidates for the information are configured (notified) to the LAA cell by way of RRC signalling or MAC signalling. Selection is made from among the candidates for the information based on the information included in the DCI carried (transmitted) by the PDCCH or EPDCCH. For example, the information indicating 4 start symbols is configured by way of RRC signalling or MAC signalling, and 2-bit information indicating one of the information pieces is notified by way of PDCCH or EPDCCH signalling.

(5) The information is notified using a channel or signal mapped to predetermined. Resource Elements in a subframe. For example, the predetermined Resource Elements are multiple Resource Elements in a predetermined symbol. For example, the predetermined symbol is an end symbol in the subframe. The subframe to which the channel or signal for notifying the information is mapped may be all the subframes in the LAA cell, a predefined subframe, or a subframe configured by way of RRC signalling.

(6) The information is predefined. In a case that a Serving cell is an LAA cell, the channel and/or signal is not transmitted at a predetermined symbol, and the channel and/or signal is transmitted at other symbols in a subframe. For example, the symbols at which the channel and/or signal is not transmitted are the symbols #0 and #1 in a subframe. The symbols at which the channel and/or signal is not transmitted are the symbols #2 and #13 in a subframe. This definition may be different (independent) depending on the channel and/or signal. For example, the terminal assumes that the EPDCCH is mapped to the symbols #2 to #13 and the PDSCH is mapped to the symbols #1 to #13 in a subframe.

In another example of the recognition, the terminal detects a symbol at which a channel and/or signal is transmitted in a prescribed subframe (e.g., subframe #3) in the LAA cell. In the terminal, assist information may be configured for performing the detection. For example, a method of the detection employs any of methods described as below.

(1) The detection is performed based on a predetermined signal mapped to the predetermined subframe. The terminal detects the symbol at which the channel and/or signal is transmitted based on whether the predefined signal or the configured signal is detected in the predetermined subframe. In a case that the predefined signal or configured signal is detected at a symbol in the predetermined subframe, the terminal recognizes subsequent symbols of the symbol in the predetermined subframe as the symbols at which the channel and/or signal is transmitted. For example, the predefined signal or the configured signal is the CRS, DMRS, and/or URS.

(2) The detection is performed based on a predetermined channel mapped to the predetermined subframe. The terminal detects the symbol at which the channel and/or signal is transmitted based on whether the predefined channel or the configured channel is detected in the predetermined subframe. In a case that the predefined channel or the configured channel is detected at a symbol in the predetermined subframe, the terminal recognizes subsequent symbols of the symbol in the predetermined subframe as the symbols at which the channel and/or signal is transmitted. For example, the predefined channel or the configured channel is the EPDCCH. Specifically, the terminal assumes that the EPDCCH is mapped to a symbol and subsequent symbols in the predetermined subframe to perform monitoring of the EPDCCH (detection process, blind detection). Here, the terminal may perform the blind detection on the start symbol where the EPDCCH is assumed to be mapped. The start symbol or candidates of the start symbol where the EPDCCH is assumed to be mapped may be predefined or configured.

In FIG. 5, a method for mapping the PDCCH, EPDCCH and/or PDSCH to the Resource Element in the subframe #3 may be different from a mapping method in other subframes. For example, the mapping method may employ any of methods described below. Note that the mapping methods below (mapping procedure) may be applied also to other signals such as the Reference Signal or the synchronization signal.

(1) In the mapping method, the PDCCH, EPDCCH and/or PDSCH are mapped to from the end symbol in the subframe. In other words, mapping the PDCCH, EPDCCH and/or PDSCH to the Resource Element (k, l) is performed on symbols in order from the OFDM symbol having the maximum OFDM symbol number l (i.e., the end symbol in a slot) in the Resource Element capable of mapping and being an allocated physical resource block. The mapping is performed in order from the end slot in the subframe (the second slot). In each OFDM symbol, those channels are mapped in order from a subcarrier having the minimum subcarrier number k.

(2) In the mapping method, the PDCCH, EPDCCH and/or PDSCH are mapped to the Resource Element in the symbol at which the channel and/or signal is transmitted while the symbol at which the channel and/or signal is not transmitted is skipped. In other words, in mapping of the PDCCH, EPDCCH and/or PDSCH, the Resource Element in the symbol at which the channel and/or signal is not transmitted is subjected to the rate matching.

(3) In the mapping method, the PDCCH, EPDCCH and/or PDSCH are mapped to the Resource Element in the symbol at which the channel and/or signal is transmitted while the symbol at which the channel and/or signal is not transmitted is not skipped. In other words, the PDCCH, EPDCCH and/or PDSCH are mapped without distinguishing the symbol at which the channel and/or signal is transmitted from the symbol at which the channel and/or signal is not transmitted, but the channel is not transmitted that is mapped to the symbol at which the channel and/or signal is not transmitted, and the channel is transmitted that is mapped to the symbol at which the channel and/or signal is transmitted. Specifically, in mapping the PDCCH, EPDCCH and/or PDSCH, the Resource Element in the symbol at which the channel and/or signal is not transmitted is subjected to puncturing.

Figure 6:
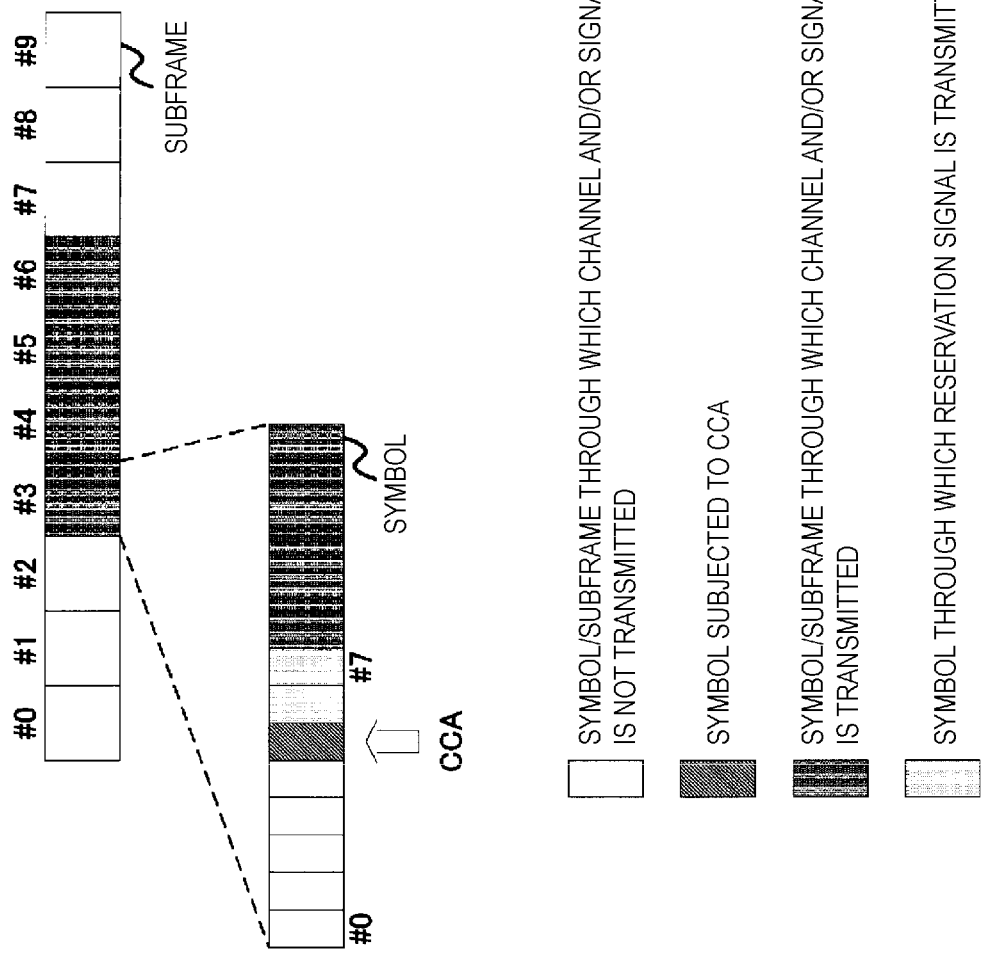
FIG. 6 is a diagram illustrating an example of the communication procedure in the LAA cell according to the present embodiment.

FIG. 6 is a diagram illustrating an example of a communication procedure in an LAA cell. Hereinafter, differences from the contents described with reference to FIG. 5 are described. In this example, the CCA is performed on the symbol #5 in the subframe #3. Assume that the LAA cell identifies that the frequency is in the idle state through the CCA and a signal can be transmitted at symbols immediately after the identification. The LAA cell transmits the signals at the symbols from the symbol #5 in the subframe #3 to a predetermined symbol in the subframe #6.

In the example in FIG. 6, the symbols #6 and #7 in the subframe #3 are symbols at which a reservation signal is transmitted. The reservation signal is transmitted at the symbols from a symbol immediately after the symbol to be subjected to the CCA (i.e., symbol #5) to a symbol immediately before the symbol at which the channel and/or signal is transmitted (i.e., symbol #6). Effects of the reservation signal are as below. As described with reference to FIG. 5, even in the case that the candidates of the symbol at which the channel and/or signal is transmitted are predefined or configured, the LAA cell can flexibly perform the CCA independently from the number of the candidates.

The reservation signal may not be received (recognized) even by the terminal which receives the channel and/or signal transmitted from the LAA cell. In other words, in a case that the channel and/or signal cannot be transmitted after performing the CCA, the reservation signal is transmitted for the LAA cell, which has performed the CCA, to ensure (reserve) the frequency.

To the symbol at which the reservation signal is transmitted, a channel and/or signal may be mapped which is different from the channel and/or signal transmitted at the symbol at which the channel and/or signal is transmitted. In other words, the channel and/or signal mapped to the symbol at which the reservation signal is transmitted is recognized (received) by the terminal. For example, the terminal identifies the symbol at which the channel and/or signal is transmitted, based on the channel and/or signal mapped to the symbol at which the reservation signal is transmitted. Moreover, for example, the terminal uses the channel and/or signal mapped to the symbol at which the reservation signal is transmitted to synchronize with (identify) the LAA cell.

A reservation signal in the present embodiment is also referred to as an initial signal. The initial signal is a signal transmitted at the beginning of a burst and can be distinguished from the PDSCH, the EPDCCH, the PDCCH, and/or a Reference Signal in the burst. In addition, the initial signal can include control information on the burst, control information on a channel and/or a signal in the burst, or control information on the cell transmitting the burst.

Figure 7:
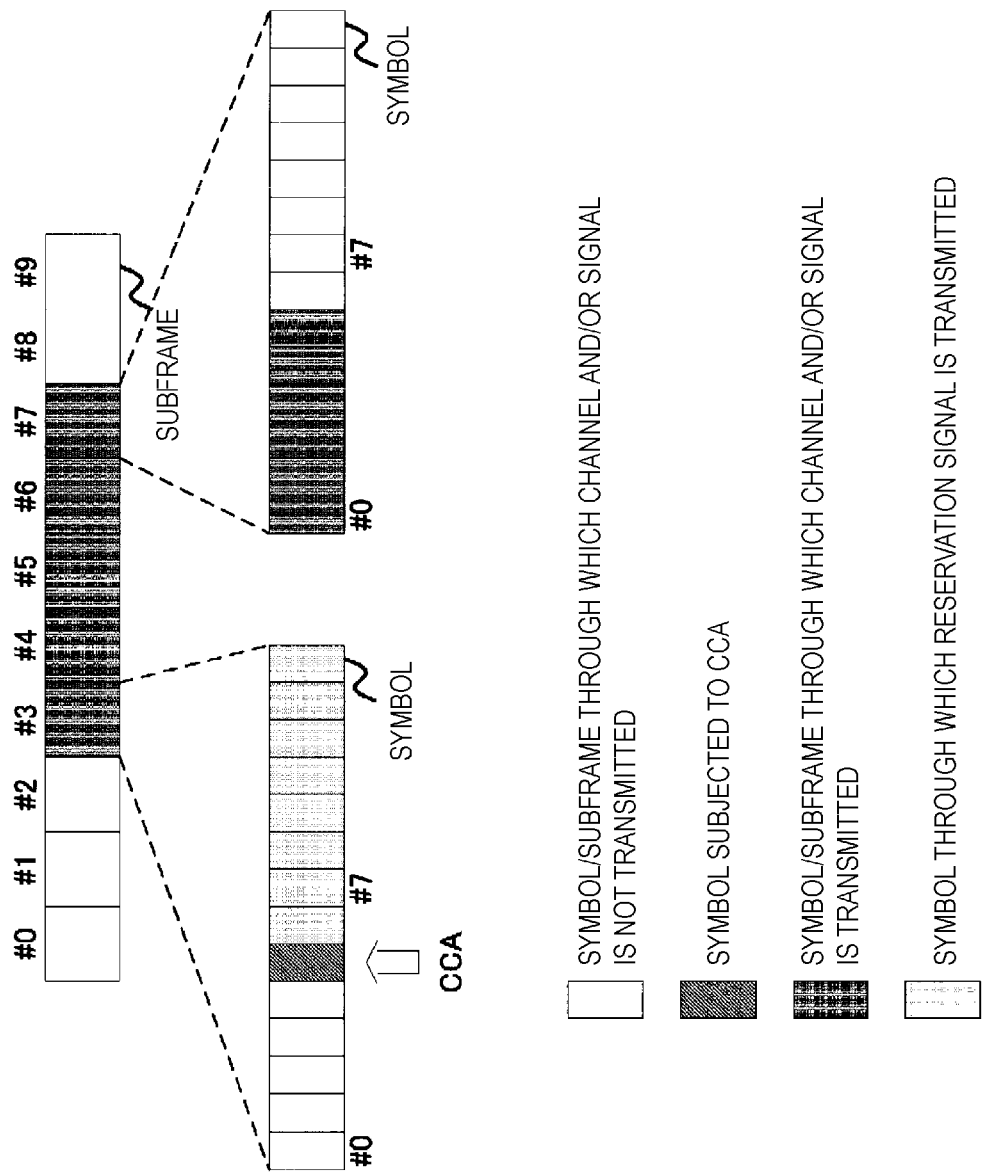
FIG. 7 is a diagram illustrating an example of the communication procedure in the LAA cell according to the present embodiment.

FIG. 7 is a diagram illustrating an example of a communication procedure in an LAA cell. Hereinafter, differences from the contents described with reference to FIG. 5 are described. In this example, the CCA is performed on the symbol #5 in the subframe #3 as is the example in FIG. 5. Assume that the LAA cell identifies that the frequency is in the idle state through the CCA and a signal can be transmitted at symbols immediately after the identification. In FIG. 7, the LAA cell transmits the signals at the symbols from the symbol #6 in the subframe #3 to the symbol #5 in the subframe #7 after 4 ms.

In the example in FIG. 7, the LAA cell transmits the reservation signal at the symbols from a symbol immediately after the symbol to be subjected to the CCA to the end symbol in the subframe including the symbol to be subjected to the CCA. The LAA cell transmits the channel and/or signal at subframes subsequent to the subframe including the symbol to be subjected to the CCA. The reservation signal in FIG. 7 includes the reservation signal described with reference to FIG. 6.

For example, in FIG. 7, the terminal can assume that the channel and/or signal is transmitted at the subframe #4 and subsequent subframes. This causes the terminal to assume that the channel and/or signal is transmitted at the symbols started from the first symbol in the subframe. Therefore, the base stations including LAA cell can use the same method as those of the related art for the terminal with respect to the transmission of the channel and/or signal and notification of the control information for the channel and/or signal.

In FIG. 7, the LAA cell can transmit the channel and/or signal at the symbols from the first symbol to the symbol #5 in the subframe #7. For example, the LAA cell can transmit to the terminal the PDSCH and/or EPDCCH mapped to resources from a predetermined symbol to the symbol #5 in subframe #7. The LAA cell can transmit to the terminal the PDCCH mapped to resources from the first symbol to a predetermined symbol in the subframe #7. For example, a predetermined symbol is determined based on information transmitted on the PCFICH and on the number of OFDM symbols used to transmit the PDCCH. Moreover, for example, a predetermined symbol is determined based on information which is the control information configured by way of RRC signalling and indicates an OFDM start symbol which is for the EPDCCH, the PDSCH scheduled by the PDCCH, and the PDSCH scheduled by the EPDCCH.

In FIG. 7, the LAA cell can notify or configure to the terminal the end symbol at which the channel and/or signal is transmitted in the subframe #7. In a subframe in the LAA cell, for the information for the terminal to recognize the end symbol and the method for notifying the information, those described in the example in FIG. 5 can be used. The method described in the example in FIG. 5 relates to the information for recognizing the symbol at which the channel and/or signal is transmitted in FIG. 5 and the method for notifying the information. For example, in the LAA cell, the information on the end symbol is included in the DCI notified by the PDCCH or EPDCCH transmitted at the subframe #7. This allows the LAA cell to efficiently use the resource in the case that the channel and/or signal can be transmitted at the symbols until a symbol in the middle of the subframe as is the subframe #7 in FIG. 7. For example, in the LAA cell, the information on the end symbol is included in information configured by way of RRC signalling or MAC signalling.

In FIG. 7, a method is described to be used as a combination of the transmission method in the subframe #3 and the transmission method in the subframe #7, but is not limited thereto. The transmission method in subframe #3 and the transmission method in the subframe #7 may be used independently from each other. Some or all of the methods described with reference to FIGS. 5 to 7 may be used in combination.

Moreover, in the subframe #7 in FIG. 7, the mapping of the PDCCH, EPDCCH and/or PDSCH to the Resource Element may be different from the mapping in other subframes.

In the LAA cell, a subframe where the channel and/or signal can be transmitted at all the OFDM symbols in the single subframe itself (i.e., the subframes #4 to #6 in FIGS. 5 to 7) may be recognized, configured, or notified as a subframe different from a subframe where the channel and/or signal cannot be transmitted at some OFDM symbols in the single subframe itself (i.e., the subframe #3 in FIGS. 5 to 7, and the subframe #7 in FIG. 7). For example, a subframe where the channel and/or signal can be transmitted at all the OFDM symbols in the single subframe itself is equivalent to a subframe in the Serving cell of the related art.

In the present embodiment, a subframe where the channel and/or signal cannot be transmitted at all the OFDM symbols in the single subframe itself is also referred to as a "first LAA subframe". A subframe where the channel and/or signal cannot be transmitted at some OFDM symbols in the single subframe itself is also referred to as a "second LAA subframe". A subframe where the channel and/or signal can be transmitted at all the OFDM symbols in the single subframe itself is also referred to as a "third LAA subframe". Moreover, the second LAA subframe is also referred to as a partial subframe, and the third LAA subframe is also referred to as a full subframe. Note that the second LAA subframe, includes the first partial subframe, the second partial subframe, and/or the third partial subframe.

The method described in the present embodiment can be used for a method for the terminal to recognize the first LAA subframe, the second LAA subframe, and the third LAA subframe. For example, the method for recognizing the subframes uses the information for recognizing the symbol at which the channel and/or signal is transmitted and the method for notifying the information.

The method for the terminal to recognize the first LAA subframe, the second LAA subframe, and the third LAA subframe may be explicitly notified or configured by way of PDCCH or RRC signalling.

The method for the terminal to recognize the first LAA subframe, the second LAA subframe, and the third LAA subframe may be implicitly notified or configured based on the information (parameter) notified or configured by way of PDCCH or RRC signalling. For example, the terminal recognizes the first LAA subframe, the second LAA subframe, and the third LAA subframe based on the information on the mapping of the CRS.

In a case that the terminal recognizes a subframe as the second LAA subframe, the terminal recognizes a predetermined number of subframes subsequent to the subframe as the third LAA subframes. The terminal recognizes, as the first LAA subframes, subframes subsequent to the end of the subframes which are recognized as the third LAA subframes until the terminal recognizes the second LAA subframes. The predetermined number the number of subframes recognized as the third LAA subframes) may be predefined. The predetermined number may be configured in the LAA cell. The predetermined number may be notified using the channel and/or signal mapped to the second LAA subframe.

In the second LAA subframe and the third LAA subframe, the start symbol of the PDSCH and/or EPDCCH is independently defined or configured.

FIGS. 5 to 7 illustrate that the CCA is performed on a single subframe, but a time (period) for performing the CCA is not limited thereto. The period for performing CCA may vary per LAA cell, per CCA timing, or per execution of CCA. For example, CCA is performed at a time based on a predetermined time slot (a time interval or a time domain). This predetermined time slot may be defined or configured based on a time obtained by dividing one subframe by the predetermined number. The predetermined time slot may be determined or configured by the predetermined number of subframes.

Furthermore, in the present embodiment, a field size in the time domain such as a time (time slot) for performing CCA or a time in which the channel and/or signal are transmitted (can be transmitted) in a certain subframe can be expressed by using a predetermined time unit. For example, the field size in the time domain is expressed by some time units Ts. Ts is 1/(15000×2048) seconds. For example, one subframe time is 30720×Ts (one millisecond).

As is the subframe #3 in the FIGS. 5 to 7, whether the LAA cell can transmit the channel and/or signal (including the reservation signal) at the symbols from the middle of symbols in the subframe may be configured to the terminal or LAA cell. For example, information indicating whether such transmission is possible in the configuration on the cell is configured to the terminal by the RRC signalling. The terminal switches processing associated with reception (monitoring, recognition, and decoding) at the LAA cell based on the information.

Furthermore, subframes in which symbols can be transmitted from an intermediate symbol (also including subframes in which symbols up to the intermediate symbol can be transmitted) may be all subframes in LAA cell. Furthermore, subframes in which symbols can be transmitted from the intermediate symbol may be subframes defined in advance for the LAA cell or configured subframes.

Furthermore, subframes in which symbols can be transmitted from the intermediate symbol (also including subframes in which symbols up to the intermediate symbol can be transmitted) can be configured, announced or determined based on an UpLink/DownLink configuration (UL/DL configuration) according to TDD. For example, such subframes are subframes announced (designated) as special subframes by the UL/DL configuration. Each of the special subframes in the LAA cell is a subframe including at least one of the three fields, a Downlink Pilot Time Slot (DwPTS), a Guard Period (GP), and an Uplink Pilot Time Slot (UpPTS). The configuration on the special subframe in the LAA cell may be configured or announced by the RRC signalling or PDCCH or EPDCCH signalling. This configuration configures a length in time of at least one of the DwPTS, the GP and the UpPTS. Furthermore, this configuration is index information indicating candidates of the predetermined length in time. Furthermore, for this configuration, the same length in time as the DwPTS, the GP and the UpPTS used for the special subframe configuration configured to the TDD cells in the related art can be used. In other words, the length in time in which transmission is possible in a certain subframe is determined based on one of the DwPTS, the GP and the UpPTS.

Further, in the present embodiment, the reservation signal may be a signal that can be received by a LAA cell different from the LAA cell that transmits the reservation signal. For example, the LAA cell different from the LAA cell that transmits the reservation signal is the FAA cell (neighboring FAA cell) neighboring to the FAA cell that transmits the reservation signal. For example, the reservation signal includes information of a transmission state (use state) of a predetermined subframe and/or symbol in the LAA cell. In a case that the FAA cell different from the LAA cell that transmits a certain reservation signal receives the reservation signal, the LAA cell having received the reservation signal recognizes the transmission state of the predetermined subframe and/or symbol, based on the reservation signal, and performs scheduling according to the state.

Furthermore, the LAA cell having received the reservation signal may perform LBT before transmitting a channel and/or signal. This LTB is performed based on the received reservation signal. For example, during this LBT, the channels and/or the signals transmitted (assumed to be transmitted) from the LAA cell having transmitted the reservation signal are taken into consideration, scheduling including resource allocation and MCS selection is performed.

Furthermore, in a case that the LAA cell having received the reservation signal performs scheduling of transmitting the channels and/or signals based on the reservation signal, it is possible to announce information of such scheduling to one or more LAA cells including the LAA cell having transmitted this reservation signal according to a predetermined method. For example, the predetermined method is a method for transmitting the predetermined channel and/or signal including the reservation signal. Furthermore, for example, the predetermined method is a method for performing announcement via a backhaul such as an X2 interface.

Furthermore, according to carrier aggregation and/or dual connectivity, a terminal of the related art can configure up to five serving cells. However, the terminal according to the present embodiment can extend a maximum number of serving cells that can be configured. In other words, the terminal according to the present embodiment can configure more than five serving cells. For example, the terminal according to the present embodiment can configure up to 16 or 32 serving cells. For example, the more than five serving cells configured by the terminal according to the present embodiment include the LAA cell. Furthermore, all of the more than five serving cells configured by the terminal according to the present embodiment may be the LAA cell.

Furthermore, in a case that the more than five serving cells can be configured, a configuration on part of the serving cells may be different from the configuration of the serving cells in the related art (i.e., the secondary cell(s) in the related art). For example, differences of this configuration are as follows. The configurations described below may be used in combination.

(1) To the terminal, up to five serving cells in the related art are configured, and up to 11 or 27 serving cells different from serving cells in the related art are configured. In other words, to the terminal, in addition to a primary cell of the related art, up to four secondary cells of the related art are configured, and up to 11 or 27 secondary cells different from the secondary cells of the related art are configured.

(2) The configuration on the serving cells (secondary cells) different from the serving cells of the related art includes configurations on an LAA cell. For example, to the terminal, in addition to the primary cell in the related art, up to four secondary cells that do not include the configuration on the LAA cell are configured, and up to 11 or 27 secondary cells different from the secondary cells in the related art are configured.

Furthermore, in a case that the more than five serving cells can be configured, the base station (including the LAA cell) and/or the terminal can perform different processing or assumption compared to the case that up to five serving cells are configured. For example, differences of the processing and assumption are as follows. The processing or the assumption described below may be used in combination.

(1) Even in the case that the more than five serving cells are configured, the terminal assumes that the PDCCH, the EPDCCH and/or the PDSCH are simultaneously transmitted (received) from the five serving cells at maximum. Consequently, the terminal can use the same method as the method of the related art, for reception of the PDCCH, the EPDCCH and/or the PDSCH and transmission of HARQ-ACK for the PDSCH.

(2) In the case that the more than five serving cells are configured, a combination (group) of cells for bundling of HARQ-ACKs for the PDSCHs in these serving cells are configured to the terminal. For example, all serving cells, all secondary cells, all LAA cells or all secondary cells different from the secondary cells in the related art include information (configuration) on bundling of HARQ-ACKs between the serving cells. For example, the information of the bundling of HARQ-ACKs between the serving cells is an identifier (an index or an ID) for performing the bundling. For example, the bundling is performed on the HARQ-ACKs over cells having the same identifier to be bundled. This bundling is performed according to a logical AND operation for the target HARQ-ACKs. Furthermore, the maximum number of identifiers to be bundled can be five. Furthermore, the maximum number of identifiers to be bundled can be five including the number of cells that does not perform bundling. In other words, the number of groups to perform bundling over the serving cells can be five at maximum. Consequently, the terminal can use the same method as the method of the related art, for reception of the PDCCH, the EPDCCH and/or the PDSCH and transmission of HARQ-ACK for the PDSCH.

(3) In the case that the more than five serving cells are configured, a combination (group) of cells for multiplexing of HARQ-ACKs for the PDSCHs in these serving cells are configured to the terminal. In the case that the combination (group) of the cells for multiplexing of the HARQ-ACKs for the PDSCHs is configured, the multiplexed HARQ-ACKs are transmitted on the PUCCH or the PUSCH based on the group. The maximum number of serving cells to be multiplexed is defined or configured for each group. The maximum number is defined or configured based on the maximum number of serving cells configured to the terminal. For example, the maximum number is the same as the maximum number of serving cells configured to the terminal, or half the maximum number of serving cells configured to the terminal. Furthermore, the maximum number of PUCCHs to be simultaneously transmitted is defined or configured based on the maximum number of serving cells to be multiplexed in each group and the maximum number of serving cells configured to the terminal.

In other words, the number of configured first serving cells (i.e., the primary cell and/or the secondary cell(s)) is a predetermined number (i.e., five) or less. A total of the configured first serving cells and second serving cell (i.e., LAA cell) exceeds the predetermined number.

Next, terminal capability associated with LAA will be described. The terminal announces (transmits) information (terminal capability) on capability of the terminal to the base station by the RRC signaling, based on a command from the base station. The terminal capability of a certain function (feature) is announced (transmitted) in a case that the function (feature) is supported, and is not announced (transmitted) in a case that the function (feature) is not supported. Furthermore, the terminal capability of the certain function (feature) may be information indicating whether testing and/or mounting this function (feature) has been finished. For example, the terminal capability according to the present embodiment is as follows. The terminal capability described below may be used in combination.

(1) The terminal capability associated with support of the LAA cell, and the terminal capability associated with support of a configuration of more than five serving cells are independently defined. For example, the terminal that supports the LAA cell supports the configuration of the more than five serving cells. In other words, the terminal that does not support the configuration of the more than five serving cells does not support the LAA cell. In this case, the terminal that supports the configuration of the more than five serving cells may or may not support the LAA cell.

(2) The terminal capability associated with support of the LAA cell, and the terminal capability associated with support of a configuration of more than five serving cells are independently defined. For example, the terminal that supports the configuration of the more than five serving cells supports the LAA cell. In other words, the terminal that does not support the LAA cell does not support the configuration of the more than five serving cells. In this case, the terminal that supports the LAA cell may or may not support the configuration of the more than five serving cells.

(3) The terminal capability associated with downlink in the LAA cell, and the terminal capability associated with uplink in the LAA cell are independently defined. For example, the terminal that supports the uplink in the LAA cell supports the downlink in the LAA cell. In other words, the terminal that does not support the downlink in the LAA cell does not support the uplink in the LAA cell. In this case, the terminal that supports the downlink in the LAA cell may or may not support the uplink in the LAA cell.

(4) The terminal capability associated with support of the LAA cell includes support of a transmission mode configured only to the LAA cell.

(5) The terminal capability associated with the downlink according to the configuration of the more than five serving cells, and the terminal capability associated with the uplink according to the configuration of the more than five serving cells are independently defined. For example, the terminal that supports the uplink according to the configuration of the more than five serving cells supports the downlink according to the configuration of the more than five serving cells. In other words, the terminal that does not support the downlink according to the configuration of the more than five serving cells does not support the uplink according to the configuration of the more than five serving cells. In this case, the terminal that supports the downlink according to the configuration of the more than five serving cells may or may not support the uplink according to the configuration of the more than five serving cells.

(6) Regarding the terminal capability according to the configuration of the more than five serving cells, terminal capability that supports a configuration of 16 downlink serving cells (component carriers) at maximum, and terminal capability that supports a configuration of 32 downlink serving cells at maximum are independently defined. Furthermore, the terminal that supports the configuration of 16 downlink serving cells at maximum supports the configuration of at least one uplink serving cell. The terminal that supports the configuration of 32 downlink serving cells at maximum supports the configuration of at least two uplink serving cells. That is, the terminal that supports the configuration of 16 downlink serving cells at maximum may not support the configuration of two or more uplink serving cells.

(7) The terminal capability associated with the support of the LAA cell is announced based on a frequency (band) used by the LAA cell. In a case that, for example, the terminal announces a supported frequency or a frequency combination, and the announced frequency or frequency combination includes at least one frequency used by the LAA cell, the terminal implicitly announces that this terminal supports the LAA cell. In other words, in a case that the announced frequency or frequency combination does not include the frequency used by the LAA cell at all, the terminal implicitly announces that this terminal does not support the LAA cell.

The terminal device may transmit, to the base station device, capability information indicating that the terminal device supports the LAA, in a case of supporting various processing and/or procedures (operations) associated with the LAA.

Next, a terminal capability relating to the second EPDCCH is described. In an example of the terminal capability according to the present embodiment, the field of the terminal capability relating to the second EPDCCH defines whether the terminal is capable of receiving a DCI in the USS and/or the CSS in the second EPDCCH. Specifically, in a case that the terminal is capable of receiving the DCI in the USS and/or the CSS in the second EPDCCH, the terminal makes a notification indicating "Supported" in the field of the terminal capability relating to the second EPDCCH. In contrast, in a case that the terminal is not capable of receiving the DCI in the USS and/or the CSS in the second EPDCCH, the terminal does not make any notification in the field of the terminal capability relating to the second EPDCCH.

In a case that the terminal is capable of receiving the DCI in the USS and/or the CSS in the second EPDCCH, the terminal has the capability of receiving the DCI in the USS in the first EPDCCH. Specifically, in a case that the terminal makes a notification indicating "Supported" in the field of the terminal capability relating to the second EPDCCH, the terminal makes a notification indicating "Supported" in the field of the terminal capability relating to the first EPDCCH. In addition, in a case that the terminal makes a notification indicating "Supported" in the field of the terminal capability relating to the second EPDCCH, the terminal may indicate that the terminal has the capability of receiving the DCI in the USS in the first EPDCCH.

In a case that the terminal is capable of receiving the DCI in the USS and/or the CSS in the second EPDCCH, the terminal also has the capability relating to the LAA (including, for example, those described above). Specifically, in a case that the terminal makes a notification indicating "Supported" in the field of the terminal capability relating to the second EPDCCH, the terminal makes a notification indicating "Supported" in the field of the terminal capability relating to the LAA. In addition, in a case that the terminal makes a notification indicating "Supported" in the field of the terminal capability relating to the second EPDCCH, the terminal may indicate that the terminal has the capability relating to the LAA.

Furthermore, the present embodiment has described a case where the FAA cell transmits the PDCCH or the EPDCCH for announcing the DCI for the PDSCH transmitted from this LAA cell (i.e., a case of self scheduling), but is not limited to this. The method described in the present embodiment is applicable also in a case that, for example, a serving cell different from the LAA cell transmits the PDCCH or the EPDCCH for announcing the DCI for the PDSCH transmitted from the LAA cell (i.e., a case of cross carrier scheduling).

Furthermore, in the present embodiment, the information for recognizing the symbols in which the channels and/or signals are transmitted may be based on the symbols in which the channels and/or signals are not transmitted. For example, this information is information indicating the last symbol of the symbols in which the channels and/or signals are not transmitted. Furthermore, the information for recognizing the symbols in which the channels and/or signals are transmitted may be determined based on other information or parameters.

Furthermore, in the present embodiment, the symbols in which the channels and/or signals are transmitted may be independently configured (announced or defined) to the channels and/or signals. In other words, the information for recognizing the symbols in which the channels and/or signals are transmitted, and the announcement method of the information can be independently configured (announced or defined) to the channels and/or signals. For example, the information for recognizing the symbols in which the channels and/or signals are transmitted, and the announcement method of the information may be independently configured (announced or defined) for the PDSCH and the EPDCCH.

Furthermore, in the present embodiment, symbols/subframes in which the channels and/or signals are not transmitted (cannot be transmitted) may be symbols/subframes in which the channels and/or signals are not assumed to be transmitted (be able to be transmitted) from a viewpoint of the terminal. That is, the terminal can regard that the LAA cell does not transmit the channels and/or signals in the symbols/subframes.

Furthermore, in the present embodiment, the symbols/subframes in which the channels and/or signals are transmitted (can be transmitted) may be symbols/subframes in which the channels and/or signals may be assumed to be transmitted from the viewpoint of the terminal. In other words, the terminal can regard that the LAA cell may or may not transmit the channels and/or signals in the symbols/subframes.

Furthermore, in the present embodiment, the symbols/subframes in which the channels and/or signals are transmitted (can be transmitted) may be symbols/subframes in which the channels and/or signals are assumed to be surely transmitted from the viewpoint of the terminal. That is, the terminal can regard that the LAA cell surely transmits the channels and/or signals in the symbols/subframes.

In the present embodiment, the LAA cell y be a Serving ell using a predetermined frequency band.

Next, an Enhanced Physical Downlink Control Channel (EPDCCH) will be described. Note that the EPDCCH, as other physical channels such as a PDSCH, is transmitted/received using Resource Elements (REs). Each of elements (each element corresponding to one subcarrier and one OFDM symbol) of a resource grid (representing a signal to be transmitted in a grid constituted of subcarriers and OFDM symbols for each slot) for an antenna port P is referred to as an RE and is uniquely identified using k (an index starting from 0 and being numbered in ascending order in the frequency axis direction) and 1 (an index starting from 0 and being numbered in ascending order in the time axis direction) representing a pair of indexes in one slot.

The EPDCCH may be different in terms of configuration and/or processing among the normal subframe in the normal cell, the partial subframe in the LAA cell, and/or the full subframe in the LAA cell. For example, in the partial subframe, an EPDCCH constituted of OFDM symbols, the number of which is smaller than that of an EPDCCH used in the normal subframe and/or the full subframe, is used. In the present embodiment, the EPDCCH used in the normal subframe is also referred to as a first EPDCCH, and the EPDCCH used in the partial subframe is also referred to as a second EPDCCH. Note that, in the full subframe, the first EPDCCH and/or the second EPDCCH may be used.

Figure 8:
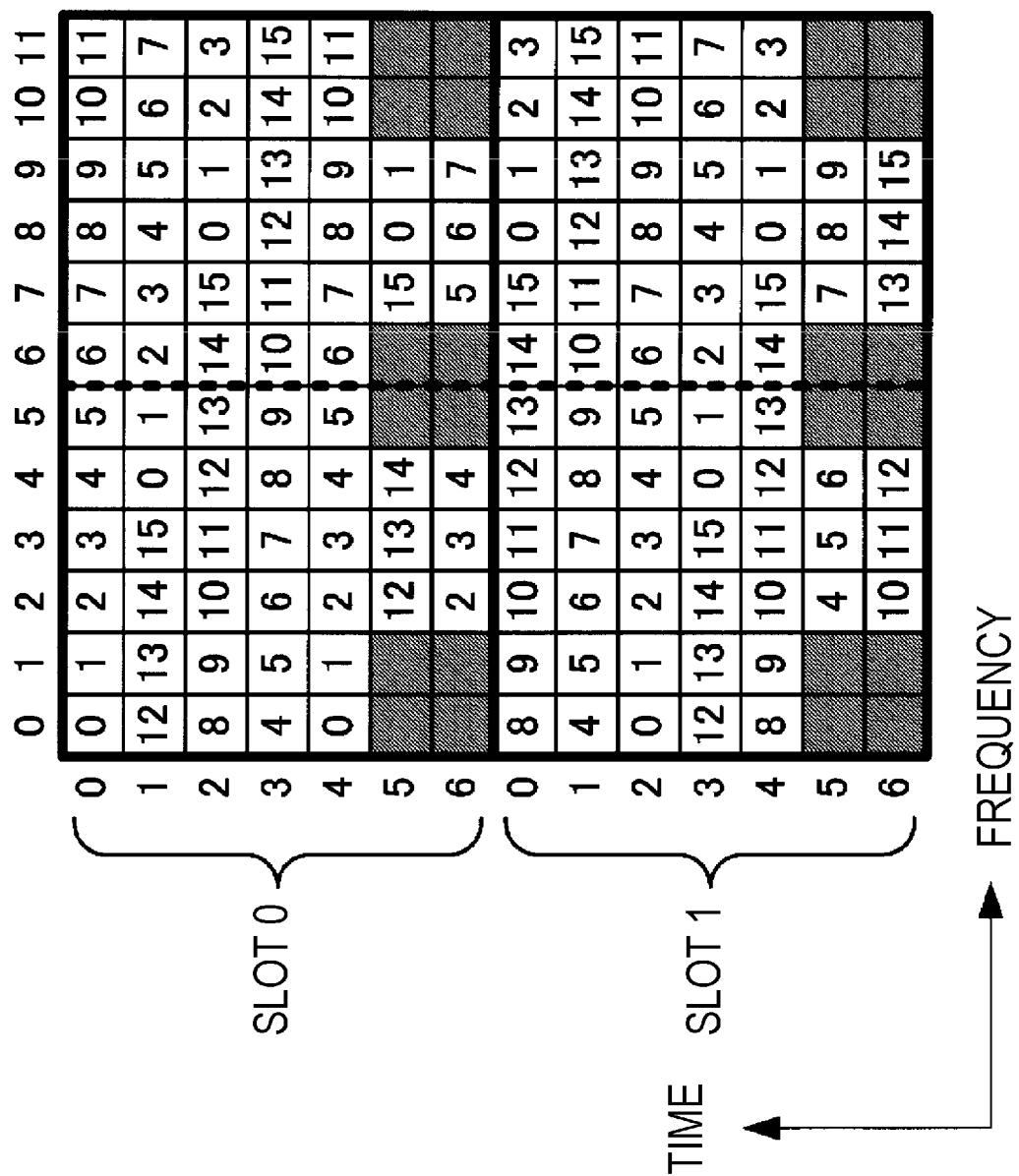
FIG. 8 illustrates an example of an EREG configuration in one RB pair.

FIG. 8 illustrates an example of an EREG configuration in one RB pair. The Enhanced RE Groups (EREGs) are used to specify mapping of an EPDCCH to REs. Each of resource block pairs includes 16 EREGs numbered from 0 to 15. In one PRB pair, all REs excluding REs at which DMRSs for antenna ports 107, 108, 109, and 110 for a normal Cyclic Prefix (CP) and for the antenna ports 107 and 108 for an extended CP are carried, are cyclically numbered from 0 to 15 in ascending order of, first, frequency, then time. In FIG. 8, Resource Elements shaded with oblique lines are used to carry DMRSs. All the REs numbered i in the PRB pair constitute the EREGs numbered i. Here, the CP is a signal attached in front of an effective symbol section of OFDM symbols in the downlink (or SC-FDMA symbols in the case of the uplink), and is a signal including a copy of part (normally the last part) of the effective symbol section. There are two kinds of CP lengths, one is for a normal CP of a normal length (e.g., 160 samples or 144 samples in a case that the effective symbol length is 2048 samples) and the other is for an extended CP, which is longer than the normal CP (e.g., 512 samples or 1024 samples in a case that the effective symbol length is 2048 samples).

Here, the same EREG configuration can be used for the first EPDCCH or the second EPDCCH. Specifically, for each resource block pair, the EREGs in the first EPDCCH or the second EPDCCH are specified for all REs excluding REs at which a DMRS for antenna ports 107, 108, 109, and 110 for a normal Cyclic Prefix (CP) and for the antenna ports 107 and 108 for an extended CP are carried. With this configuration, even in a case where different DMRS configurations are used, the definitions for configuring EREGs are the same although REs for configuring the EREGs are different from each other.

As illustrated in FIG. 8, one RB pair is constituted of two RBs. Each RB is constituted of Resource Elements represented by 7 OFDM symbols in the time direction and 12 subcarriers in the frequency direction. In FIG. 8, DMRSs are mapped to the Resource Elements shaded with oblique lines. Moreover, each DMRS is constituted of two-chip orthogonal code, and up to two DMRSs can be code-division multiplexed. The DMRSs for the antenna ports 107 and 108 are mapped to REs having the OFDM symbol numbers 5 and 6 and the subcarrier numbers 0, 5, and 10 in each slot. The DMRSs for the antenna ports 109 and 110 are mapped to REs having the OFDM symbol numbers 5 and 6 and the subcarrier numbers 1, 6, and 11 in each slot. Here, as a DMRS associated with the first EPDCCH, the DMRSs described in FIG. 8 can be used.

As an example of a DMRS associated with the second EPDCCH, the DMRSs described in FIG. 8 can be used. Specifically, in the DMRS associated with the second EPDCCH, a similar configuration as that of the DMRS associated with the first EPDCCH can be used, but, in a case that the DMRS is included in the OFDM symbols at which the second EPDCCH cannot be transmitted, the DMRS is not transmitted. For example, in the partial subframes with OFDM symbols #0 to #6 in slot 1, the DMRS associated with the second EPDCCH is mapped only to OFDM symbols #5 and #6 in slot 1 and is not mapped only to #5 and #6 in slot 0. In a case that the DMRS cannot be transmitted at any OFDM symbol of the two OFDM symbols to which two-chip orthogonal code is mapped, the DMRS is assumed not to be transmitted.

Another example of the DMRS associated with the second EPDCCH is determined based on OFDM symbols to be used for transmission of the second EPDCCH. Specifically, each of the REs to which the DMRS associated with the second EPDCCH is mapped is specified depending on the configuration of the OFDM symbols to be used for transmission of the second EPDCCH. A predetermined number of patterns of the configuration of the OFDM symbols to be used for transmission of the second EPDCCH can be predefined. Hence, a predetermined number of patterns of the configuration of the DMRS associated with the second EPDCCH can be predefined similarly.

FIGS. 9A to 9E are diagrams illustrating examples of a configuration of DMRSs associated with the second EPDCCH used for the first partial subframe. In FIGS. 9A to 9E, the REs shaded with oblique lines represent REs to which the DMRSs associated with the second EPDCCH are mapped. The REs shaded with dots represent REs (OFDM symbols) not used for transmission of the second EPDCCH. Specifically, in FIG. 9A, OFDM symbol #0 in slot 0 is the starting symbol for the second EPDCCH; in FIG. 9B, OFDM symbol #3 in slot 0 is the starting symbol for the second EPDCCH; in FIG. 9C, OFDM symbol #0 in slot 1 is the starting symbol for the second EPDCCH; in FIG. 9D, OFDM symbol #0 in slot 1 is the starting symbol for the second EPDCCH; in FIG. 9E, OFDM symbol #3 in slot 1 is the starting symbol for the second EPDCCH. As illustrated in FIGS. 9A to 9E, the configuration of the DMRSs associated with the second EPDCCH can be defined depending on the starting symbol for the second EPDCCH.

FIGS. 10A to 10E are diagrams illustrating examples of a configuration of the DMRSs associated with the second EPDCCH used for the second partial subframe. In FIGS. 10A to 10E, the REs shaded with oblique lines represent REs to which the DMRSs associated with the second EPDCCH are mapped. The REs shaded with dots represent REs (OFDM symbols) not used for transmission of the second EPDCCH. Specifically, in FIG. 10A, OFDM symbol #6 in slot 1 is the end symbol of the second EPDCCH; in FIG. 10B, OFDM symbol #3 in slot 1 is the end symbol of the second EPDCCH; in FIG. 10C, OFDM symbol #1 in slot 1 is the end symbol of the second EPDCCH; in FIG. 10D, OFDM symbol #6 in slot 0 is the end symbol of the second EPDCCH; in FIG. 10E, OFDM symbol #4 in slot 0 is the end symbol of the second EPDCCH. As illustrated in FIGS. 10A to 10E, the configuration of the DMRSs associated with the second EPDCCH can be defined depending on the end symbol of the second EPDCCH. Additionally, the configuration of the DMRSs associated with the second EPDCCH used for the second partial subframe can be the same as the configuration of the DMRSs used for the DwPTS.

The EPDCCH carries scheduling assignment. One EPDCCH is transmitted by using an aggregation of one or some contiguous Enhanced Control Channel Elements (ECCEs). Here, each ECCE is constituted of multiple EREGs. The number of ECCEs used for one EPDCCH depends on the format of the EPDCCH and the number of EREGs of each ECCE. Both localized transmission and distributed transmission are supported. One EPDCCH can use any of localized transmission and distributed transmission using different modes of mapping to the EREGs of the ECCEs and the PRB pair.

In the first EPDCCH, either localized transmission or distributed transmission can be configured via RRC signalling for each EPDCCH set. In the second EPDCCH, either localized transmission or distributed transmission can be predefined for each of all the EPDCCH sets. For example, in the second EPDCCH, distributed transmission can be predefined for all the EPDCCH sets.

As described later, the terminal device monitors multiple EPDCCHs. Installation of one or two PRB pairs for which the terminal device monitors EPDCCH transmission can be configured. As configured by a higher layer, only localized transmission or only distributed transmission uses all EPD-CCH candidates in an EPDCCH set $X_m$. In EPDCCH set $X_m$ in subframe i, ECCEs available for EPDCCH transmission are numbered from 0 to $N_{ECCE,m,i}-1$. Here, $N_{ECCE,m,i}$ represents the number of ECCEs available for EPDCCH transmission in EPDCCH set $X_m$ in subframe i. The ECCE numbered n corresponds to the EREG numbered (n mod $N^{RB}_{ECCE}$)+$jN^{RB}_{ECCE}$ in the PRB having floor (n/$N^{RB}_{ECCE}$) as an index in the case of localized mapping and corresponds to the EREG numbered floor (n/$N^{Xm}_{RB}$)+$jN^{RB}_{ECCE}$ in the PRB having (n+j max(1, $N^{Xm}_{RB}/N^{ECCE}_{EREG}$)) mod $N^{Xm}_{RB}$ as an index in the case of distributed mapping, Here, j=0, 1, . . . , $N^{ECCE}_{i\ -1}$, and $N^{ECCE}_{EREG}$ represents the number of EREGs per ECCE. Moreover, $N^{RB}_{ECCE}$ is equal to $16/N^{ECCE}_{EREG}$ and represents the number of ECCEs per PRB pair. Moreover, floor, mod, and max respectively represent floor function, modulo function (mod function), and maximum value function (max function). Note that the PRB pairs constituting EPDCCH set $X_m$ are assumed to be numbered from 0 to $N^{Xm}_{RB}-1$ in ascending order here.

In the first EPDCCH, $N^{ECCE}_{EREG}$ is determined based on the CP and the subframe type. More specifically, in the case of a normal CP and a normal subframe (normal downlink subframe) or the case of a normal CP and a special subframe with special subframe configuration 3, 4, or 8, $N^{ECCE}_{EREG}$ is 4. In the case of a normal CP and a special subframe with special subframe configuration 1, 2, 6, 7, or 9 (in other words, a special subframe in which the DwPTS is constituted of 6 or greater and 10 or less OFDM symbols), the case of an extended CP and a normal subframe, or the case of an extended CP and a special subframe with special subframe configuration 1, 2, 3, 5, or 6 (in other words, a special subframe in which the DwPTS is constituted of 6 or greater and 10 or less OFDM symbols), $N^{ECCE}_{EREG}$ is 8. Note that details of the special subframe configuration will be described later.

In an example of $N^{ECCE}_{EREG}$ in the second EPDCCH, $N^{ECCE}_{EREG}$ is a predefined value. For example, $N^{ECCE}_{EREG}$ in the second EPDCCH is 8 as in the case of a normal CP and a special subframe with special subframe configuration 1, 2, 6, 7, or 9 in the first EPDCCH. Moreover, for example, $N^{ECCE}_{EREG}$ in the second EPDCCH is 16, which is the same number of EREGs constituted of one resource block pair.

In another example of $N^{ECCE}_{EREG}$ in the second EPD-CCH, $N^{ECCE}_{EREG}$ is determined depending on $n_{EPDCCH}$ (to be described later) in the detected (assumed or monitored) second EPDCCH. Specifically, in a case that $n_{EPDCCH}$ in the second EPDCCH is a predetermined number or greater, $N^{ECCE}_{EREG}$ is 4 (or 8); and in a case that $n_{EPDCCH}$ in the second EPDCCH is less than the predetermined number $N^{ECCE}_{EREG}$ is 8 (or 16). The predetermined number may be predefined or may be configured in a cell-specific or UE-specific manner via RRC signalling. For example, the predetermined number is 104, which is the same as the predetermined number used in the first EPDCCH. Alternatively, for example, the predetermined number may be different from the predetermined number used in the first EPDCCH.

Moreover, multiple predetermined numbers may be defined or configured for $n_{EPDCCH}$. Specifically, in a case that $n_{EPDCCH}$ in the second EPDCCH is a first predetermined number or greater, $N^{ECCE}_{EREG}$ is 4; in a case that $n_{EPDCCH}$ in the second EPDCCH is a second predetermined number or greater and less than the first predetermined number, $N^{ECCE}_{EREG}$ is 8; and in a case that nEPDCCH in the second EPDCCH is less than the second predetermined number, $N^{ECCE}_{EREG}$ is 16. For example, the first predetermined number is 104, which is the same as the predetermined number used in the first EPDCCH. The second predetermined number is a value less than the first predetermined number.

In another example of $N^{ECCE}_{EREG}$ in the second EPD-CCH, $N^{ECCE}_{EREG}$ is determined depending on the number of OFDM symbols in the detected (assumed or monitored) second EPDCCH. Specifically, in a case that the number of OFDM symbols in the second EPDCCH is a predetermined number or greater, $N^{ECCE}_{EREG}$ is 4 (or 8); in a case that the number of OFDM symbols in the second EPDCCH is less than the predetermined number, $N^{ECCE}_{EREG}$ is 8 (or 16). The predetermined number may be predefined or may be configured in a cell-specific or UE-specific manner via RRC signalling.

Moreover, multiple predetermined numbers may be defined or configured for the number of OFDM symbols. Specifically, in a case that the number of OFDM symbols in the second EPDCCH is a first predetermined number or greater, $N^{ECCE}_{EREG}$ is 4; in a case that the number of OFDM symbols in the second EPDCCH is a second predetermined number or greater and less than the first predetermined number, $N^{ECCE}_{EREG}$ is 8; and in a case that the number of OFDM symbols in the second EPDCCH is less than the second predetermined number, $N^{ECCE}_{EREG}$ is 16. For example, the second predetermined number is a value less than the first predetermined number.

In another example, $N^{ECCE}_{EREG}$ in the second EPDCCH is determined based on the CP and the subframe type similar to that in the first EPDCCH, but $N^{ECCE}_{EREG}$ is a value twice as large as that of the first EPDCCH. More specifically, in the case of a normal CP and a normal subframe (normal downlink subframe), or the case of a normal CP and a special subframe with special subframe configuration 3, 4, or 8, $N^{ECCE}_{EREG}$ is 8. In the case of a normal CP and a special subframe with special subframe configuration of 1, 2, 6, 7, or 9 (in other words, a special subframe in which the DwPTS is constituted of 6 or greater and 10 or less OFDM symbols), the case of an extended CP and a normal subframe, or the case of an extended CP and a special subframe with special subframe configuration 1, 2, 3, 5, or 6 (in other words, a special subframe in which the DwPTS is constituted of 6 or greater and 10 or less OFDM symbols), $N^{ECCE}_{EREG}$ is 16.

The correspondence between the EPDCCH format and the number of ECCEs per EPDCCH (aggregation level) can be defined. The correspondence may be defined differently for the first EPDCCH and the second EPDCCH.

The correspondence between the EPDCCH format and the number of ECCEs per EPDCCH (aggregation level) can be defined for multiple cases, case A and case B, in the first EPDCCH. Case A is used in a case that a condition for case 1 to be described later is satisfied, and case B is used otherwise. The aggregation levels in case A is 2, 4, 8, and 16 in the case of localized transmission and 2, 4, 8, 16, and 32 in the case of distributed transmission. The aggregation levels in case B is 1, 2, 4, and 8 in the case of localized transmission and 1, 2, 4, 8, and 16 in the case of distributed transmission. Hence, the aggregation levels in case A are higher than the aggregation levels in case B. With this configuration, predetermined reception performance for the EPDCCH can be achieved by using a higher aggregation level even in a case that the number of REs used for each EREG in the EPDCCH is small.

$n_{EPDCCH}$, which represents a quantity for a certain terminal device, is defined as the number of downlink REs satisfying all of or some of criteria (a1) to (a4) below in one PRB pair configured for EPDCCH transmission in EPDCCH set $X_0$ (the first EPDCCH set of up to two EPDCCH sets).

(a1) The RE is part of any one of 16 EREGs in the PRB pair.

(a2) The RE is assumed not to be used for a CRS by the terminal device. Here, as long as no other values are provided for the parameters for the number of CRS antenna ports and frequency shift, the CRS position is given based on these parameters at the Serving cell (the number of antenna ports based on the same antenna port configuration as that of the PBCH and the frequency shift obtained based on a Physical Cell Identifier). In contrast, in a case that the set of these parameters is configured in the terminal device based on re-MappingQCL-ConfigID-r11, which is a higher layer parameter, the CRS position is determined by using the parameters.

(a3) The RE is assumed not to be used for a CSI-RS by the terminal device. Here, the CSI-RS position is given based on the configuration of zero-power CSI-RS in the serving cell (in a case that no other value is provided for the configuration for zero-power CSI-RS) and the configuration of non-zero-power CSIRS. In contrast, in a case that the zero-power CSIRS is configured in the terminal device based on re-MappingQCL-ConfigID-r11, which is a higher layer parameter, the CSI-RS position is determined by using the parameter.

(a4) Index 1 in the first slot in the subframe satisfies $1_{EPDCCHStart}$ or greater. Specifically, mapping is performed to REs on OFDM symbols having indexes of $1_{EPDCCHStart}$ and subsequent to $1_{EPDCCHStart}$ in one subframe. Here, 1 is an index given to an OFDM symbol in a slot, and numbered from 0 in ascending order in the time direction from the first OFDM symbol in the slot. Description of $1_{EPDCCHStart}$ will be given later.

In an example, the correspondence between the EPDCCH format and the number of ECCEs per EPDCCH (aggregation level) in the second EPDCCH is the same as that of the first EPDCCH.

In another example of the correspondence between the EPDCCH format and the number of ECCEs per EPDCCH (aggregation level) in the second EPDCCH, one case is predefined. For example, case A is predefined for the correspondence between the EPDCCH format and the number of ECCEs per EPDCCH (aggregation level) in the second EPDCCH. Case B may be defined for the correspondence between the EPDCCH format and the number of ECCEs per EPDCCH (aggregation level) in a case that the second EPDCCH is mapped to the initial partial subframe.

In another example of the correspondence between the EPDCCH format and the number of ECCEs per EPDCCH (aggregation level) in the second EPDCCH, multiple cases, case A, case B, and case C, can be defined. The aggregation levels in case A and the aggregation levels in case B are the same as those of the first EPDCCH. The aggregation levels in case C can be higher than the aggregation levels in case A. For example, the aggregation levels in case C are 4, 8, 16, and 32 in the case of localized transmission and 4, 8, 16, 32 and 64 in the case of distributed transmission.

In an example of $n_{EPDCCH}$, which is a quantity for a specific terminal device, $n_{EPDCCH}$ for the first EPDCCH and $n_{EPDCCH}$ for the second EPDCCH are independent from each other. In the first EPDCCH, $n_{EPDCCH}$ is defined as the number of downlink REs satisfying all criteria (a1) to (a4) above in one PRB pair configured for EPDCCH transmission in EPDCCH set $X_0$ (the first EPDCCH set of up to two EPDCCH sets) in the first EPDCCH. In addition, in the second EPDCCH, $n_{EPDCCH}$ is defined as the number of downlink REs satisfying all or some of criteria (a1) to (a4) above in one PRB pair configured for EPDCCH transmission in EPDCCH set $X_0$ (the first EPDCCH set of one or more EPDCCH sets) in the second EPDCCH.

In an example of $n_{EPDCCH}$, which is a quantity for a specific terminal device, $n_{EPDCCH}$ is common to the first EPDCCH and the second EPDCCH. Specifically, nEPDCCH in the second EPDCCH is the same as $n_{EPDCCH}$ in the first EPDCCH. This means that, in the second EPDCCH, $n_{EPDCCH}$ is defined as the number of downlink REs satisfying all criteria (a1) to (a4) above in one PRB pair configured for EPDCCH transmission in EPDCCH set $X_0$ (the first EPDCCH set of up to two EPDCCH sets) in the first EPDCCH.

b)(0), . . . , b($M_{bit}$−1) representing blocks of bits transmitted on one EPDCCH at one subframe are scrambled based on h(i)=(b(i)+c(i)) mod 2, which results in h(0), . . . , h($M_{bit}$−1), which are blocks of scrambled bits. Here, $M_{bit}$ represents the number of bits to be transmitted on one EPDCCH, and c(i) represents a UE-specific scrambling sequence initialized with parameter $c_{init}$. This scrambling sequence generator is $c_{init}=floor(n_s/2) \ 2^9 + n^{EPDCCH}_{ID,m}$. m represents an EPDCCH set number. ns represents a slot number in a radio frame. $n^{EPDCCH}_{ID,m}$ represents a DMRS scrambling initialization parameter that can be configured for each EPDCCH set via higher layer signalling and that can take any value of 0 to 503.

h(0), . . . , h($M_{bit}$−1), which are blocks of scrambled bits, are modulated to be d(0), . . . , d($M_{symb}$−1), which are blocks of complex-valued modulation symbols. Here, $M_{symb}$ represents the number of modulation symbols transmitted on one EPDCCH. An EPDCCH modulation scheme is Quadrature Phase Shift Keying (QPSK). A block of complex-valued modulation symbols is mapped to a single layer for precoding based on a relational equation, y(i)=d(i). Here, i=0, . . . . $M_{symb}$−1, and y represents a precoded modulation symbol.

y(0), . . . , y($M_{symb}$−1), which are blocks of complex-valued symbols, are sequentially mapped to REs that satisfy all criteria (m1) to (m4) below and that are on associated antenna ports (REs at positions defined by k and 1), starting from y(0).

(m1) The RE is part of an EREG allocated for EPDCCH transmission.

(m2) The RE is assumed not to be used for a CRS by the terminal device. Here, as long as no other values are provided for the parameters for the number of CRS antenna ports and frequency shift, the CRS position is given based on these parameters at the Serving cell (the number of antenna ports based on the same antenna port configuration as that of the PBCH and the frequency shift obtained based on a Physical Cell identifier). In contrast, in a case that the set of these parameters is configured in the terminal device based on re-MappingQCL-ConfigID-r11, which is a higher layer parameter, the CRS position is determined by using the parameters.

(m3) The RE is assumed not to be used for a CSIRS by the terminal device. Here, the CSIRS position is given based on the configuration of zero-power CSIRS in the Serving cell (in a case that no other value is provided for the configuration for zero-power CSIRS) and the configuration of non-zero-power CSIRS. In contrast, in a case that the zero-power CSIRS is configured in the terminal device based on re-MappingQCL-ConfigID-r11, which is a higher layer parameter, the CSIRS position is determined by using the parameter.

(m4) Index 1 in the first slot in the subframe being $1_{EPDCCHStart}$ or greater is satisfied. Specifically, mapping is performed to REs on OFDM symbols having indexes of $1_{EPDCCHStart}$ and subsequent to $1_{EPDCCHStart}$ in one subframe. Here, 1 is an index given to an OFDM symbol in a slot, and numbered from 0 in ascending order in the time direction from the first OFDM symbol in the slot, Description of $1_{EPDCCHStart}$ will be given later.

Mapping to REs (REs at positions defined by k and 1) satisfying the above criteria at antenna port P is performed in ascending order with respect to index K first and then index 1 (in the direction that k and 1 increase), which means that the mapping starts from the first slot and ends at the second slot in the subframe.

Here, antenna port P is a logical antenna port, One antenna port may correspond to one physical antenna, or a signal of one antenna port may actually be transmitted via multiple physical antennas. Alternatively, signals of multiple antenna ports may actually be transmitted via the same physical antenna. In a case that the same antenna port is used, the same channel performance can be achieved. Here, antenna ports 0 to 3 are antenna ports associated with (used for) CRS transmission, antenna port 4 is an antenna port associated with (used for) transmission of Multimedia Broadcast multicast service Single Frequency Network (MBSFN) Reference Signal, antenna ports 5 and 7 to 14 are antenna ports associated with (used for) transmission of a UE-specific Reference Signal associated with a PDSCH, antenna ports 107 to 110 are antenna ports associated with (used for) transmission of a Demodulation Reference Signal associated with an EPDCCH, antenna port 6 is an antenna port associated with (used for) transmission of a positioning Reference Signal, and antenna ports 15 to 22 are antenna ports associated with (used for) transmission of CSIRS.

In localized transmission, single antenna port P to be used is given by n', which is calculated based on $n'=n_{ECCE,low}$ mod $N^{RB}_{ECCE}+n_{RNTI}$ mod min $(N^{EPDCCH}_{ECCE}, N^{RB}_{ECCE})$ and (n1) to (n4) below. Here, $n_{ECCE,low}$ represents the smallest ECCE index used for this EPDCCH transmission in the EPDCCH set, and $n_{RNTI}$ is equal to a Cell-RNTI (C-RNTI), which is one of Radio Network Temporary Identifiers (RNTIs), Moreover, $N^{EPDCCH}_{ECCE}$ represents the number of ECCEs used for this EPDCCH. Moreover, min represents the minimum value function (min function).

(n1) In the case of a normal CP, and a normal subframe or a special subframe with special subframe configuration 3, 4, or 8, n'=0 corresponds to P=107. In the case of a normal CP and a special subframe with special subframe configuration 1, 2, 6, 7, or 9, n'=0 corresponds to P=107. In the case of a normal CP and that the start position of the OFDM symbol in the initial partial subframe is configured at 0, n'=0 corresponds to P=107. In the case of a normal CP and that the start position of the OFDM symbol in the initial partial subframe is configured at 0 and 7, n'=0 corresponds to P=107. In other words, in a case that the start position of the OFDM symbol in the initial partial subframe is 0 or 7, n'=0 corresponds to P=107. In the case of a normal CP and that the number of the OFDM symbols used in the end partial subframe is 7 or smaller, n'=0 corresponds to P=107. In the case of a normal CP and that the number of the OFDM symbols used in the end partial subframe is greater than 7, n'=0 corresponds to P=107. In the case of an extended CP, n'=0 corresponds to P=107 for any subframe type.

(n2) In the case of a normal CP, and a normal subframe or a special subframe with special subframe configuration 3, 4, or 8, n'=1 corresponds to P=108. In the case of a normal CP and a special subframe with special subframe configuration 1, 2, 6, 7, or 9, n'=1 corresponds to P=109. In the case of a normal CP and that the start position of the OFDM symbol in the initial partial subframe is configured at 0, n'=1 corresponds to P=108. In the case of a normal CP and that the start position of the OFDM symbol in the initial partial subframe is configured at 0 and 7, a corresponding antenna port is determined based on the OFDM symbol or the OFDM symbol number (or slot, slot number) from which the initial partial subframe starts. For example, in a case that the OFDM symbol from which the initial partial subframe starts is OFDM symbol #0 (slot #0), n'=1 corresponds to P=108, and in a case that the OFDM symbol from which the initial partial subframe starts is OFDM symbol #7 (slot #1), n'=1 corresponds to P=109. In the case of a normal CP and that the number of the OFDM symbols used in the end partial subframe is 7 or smaller, n'=1 corresponds to P=109. In other words, in a case that the start position in the initial partial subframe is 0, n'=1 corresponds to P=108, and in a case that the start position in the initial partial subframe is 7, n'=1 corresponds to P=109. In the case of a normal CP and that the number of the OFDM symbols used in the end partial subframe is greater than 7, n'=1 corresponds to P=108. In the case of an extended CP, n'=1 corresponds to P=108 for any subframe type.

(n3) In the case of a normal CP, and a normal subframe or a special subframe with special subframe configuration 3, 4, or 8, n'=2 corresponds to P=109. In the case of a normal CP and that the start position of the OFDM symbol in the initial partial subframe is 0, n'=2 corresponds to P=109. In the case of a normal CP and that the number of the OFDM symbols used in the end partial subframe is greater than 7, n'=2 corresponds to P=109.

(n4) In the case of a normal CP, and a normal subframe or a special subframe with special subframe configuration 3, 4, or 8, n'=3 corresponds to P=110. In the case of a normal CP and that the start position of the OFDM symbol in the initial partial subframe is 0, n'=3 corresponds to P=110. In the case of a normal CP and that the number of the OFDM symbols used in the end partial subframe is greater than 7, n'=3 corresponds to P=110.

Note that the start position of the OFDM symbol in the initial partial subframe being configured at a prescribed value (or a prescribed index) may include the prescribed value being configured by higher layer signaling, and the prescribed value being configured by higher layer signaling and a CRS being detected in the OFDM symbol of the prescribed value. In other words, in a case that the start position of the OFDM symbol in the initial partial subframe is configured based on higher layer signaling and a CRS is successfully detected at the start position, the terminal device may perform processing based on the above condition.

The antenna port used for localized EPDCCH transmission (localized transmission of the EPDCCH) in the LAA cell may be determined based on the type of the subframe (whether the subframe is partial subframe or not) and the number of OFDM symbols being used or the start position of the OFDM symbol.

In distributed transmission, each of the REs in one EREG starts from antenna port 107 and is associated with one of two antenna ports according to a rule indicating alternate use. Here, in a normal CP, the two antenna ports are antenna port 107 and an antenna port 109; in an extended CP, the two antenna ports are antenna port 107 and an antenna port 108.

For each Serving cell, a base station device can configure, for each UE, one or two EPDCCH-PRB sets (also referred to as groups of PRB pairs to which an EPDCCH may be mapped or EPDCCH sets) for monitoring the EPDCCH via higher layer signalling. Here, multiple PRB pairs corresponding to one EPDCCH-PRB set (the number of PRB pairs corresponding to one EPDCCH-PRB set and the correspondence between the EPDCCH-PRB set and any of PRB pairs) are also indicated via higher layer signalling. Each EPDCCH-PRB set is configured of a set of ECCEs numbered from 0 to $N_{ECCE,p,k}-1$. Here, $N_{ECCE,p,k}-1$ represents the number of ECCEs in EPDCCH-PRB set p (p+1-th EPDCCH-PRB set, p=0 or 1) in subframe k. Any of localized EPDCCH transmission and distributed EPDCCH transmission can be configured for each EPDCCH-PRB set. Specifically, one EPDCCH is mapped in the frequency direction relatively locally to the EPDCCH-PRB set for which localized. EPDCCH transmission is configured, and one EPDCCH is mapped in the frequency direction in a relatively distributed manner to the EPDCCH-PRB set for which distributed EPDCCH transmission is configured.

EPDCCH sets may be configured independently for the first EPDCCH and the second EPDCCH. For example, the EPDCCH set for the first EPDCCH and the EPDCCH set for the second EPDCCH may be configured by using different parameters.

Moreover, the terminal may be configured so that the EPDCCH set for the first EPDCCH and the EPDCCH set for the second EPDCCH are not configured at the same time in a Serving cell. For example, the EPDCCH set for the first EPDCCH is configured for a Serving cell using the LTE of the related art, while the EPDCCH set for the second EPDCCH is configured for a LAA cell. Moreover, for example, in a case that a method (mode) using one subframe as a time direction unit as the LTE of the related art is configured for the terminal in the Serving cell, the EPDCCH set for the first EPDCCH is configured; and in a case that a method (mode) using one slot as a time direction unit is configured, the EPDCCH set for the second EPDCCH is configured.

Moreover, the terminal may be configured so that the EPDCCH set for the first EPDCCH and the EPDCCH set for the second EPDCCH are configured at the same time in a Serving cell. For example, in a LAA cell, the first EPDCCH is monitored based on the EPDCCH set for the first EPDCCH at a full subframe, and the second EPDCCH is monitored based on the EPDCCH set for the second EPDCCH at a partial subframe.

An example of different parameters with which the EPDCCH set for the first EPDCCH and the EPDCCH set for the second EPDCCH are configured is the number of PRB pairs that can be configured for one EPDCCH set. For example, the number of PRB pairs that can be configured for corresponding one EPDCCH set is 2, 4, or 8 in the EPDCCH set for the first EPDCCH. The number of PRB pairs that can be configured for corresponding one EPDCCH set is 4, 8, or 16 in the EPDCCH set for the second EPDCCH, which is twice as large as that for the EPDCCH set for the first EPDCCH. Alternatively, with respect to the EPDCCH set for the second EPDCCH, it may be defined so that the number of PRB pairs corresponding to one EPDCCH set may be defined according to the assumed starting symbol or end symbol of the second EPDCCH. For example, it is defined so that the number of PRB pairs corresponding to one EPDCCH set increases as the number of OFDM symbols used for transmission of the second EPDCCH decreases.

An example of different parameters with which the EPDCCH set for the first EPDCCH and the EPDCCH set for the second EPDCCH are configured is a parameter relating to a partial subframe. For example, the parameter includes a parameter indicating the starting symbol and/or the end symbol of the second EPDCCH or a candidate therefor.

Moreover, as an example, the starting symbol for the second EPDCCH is configured independently or commonly for the individual EPDCCH sets via RRC signalling. For example, as the starting symbol for the second EPDCCH, one of OFDM symbols #0 to #6 in slot 0 and OFDM symbols #0 to #6 in slot 1 is configured. Alternatively, for example, as the starting symbol for the second EPDCCH, a predetermined number of candidates are predefined from among OFDM symbols #0 to #6 in slot 0 and OFDM symbols #0 to #6 in slot 1, and any one of the candidates is configured. Alternatively, for example, as the starting symbol for the second EPDCCH, any of OFDM symbol #0 in slot 0 and OFDM symbol #0 in slot 1 is configured. Alternatively, for example, the starting symbol for the second EPDCCH is determined based on an OFDM symbol at which an initial signal has been detected. Specifically, the starting symbol for the second EPDCCH is the OFDM symbol at which an initial signal has been detected or that is the OFDM symbol predetermined number of OFDM symbols after the OFDM symbol at which the initial signal has been detected. Alternatively, for example, the starting symbol for the second EPDCCH is the OFDM symbol for which multiple candidates are defined or configured and is the OFDM symbol at which the initial signal has been detected and the OFDM symbols subsequent to the OFDM symbol at which the initial signal has been detected and closest thereto.

Moreover, as an example, the end symbol of the second EPDCCH is configured independently or commonly for the individual EPDCCH sets via RRC signalling. For example, as the end symbol of the second EPDCCH, one of OFDM symbols #0 to #6 in slot 0 and OFDM symbols #0 to #6 in slot 1 is configured. Moreover, for example, as the end symbol of the second EPDCCH, a predetermined number of candidates are predefined from among OFDM symbols #0 to #6 in slot 0 and OFDM symbols #0 to #6 in slot 1, and any one of the candidates is configured. Alternatively, for example, as the end symbol of the second EPDCCH, any of OFDM symbol #6 in slot 0 and OFDM symbol #6 in slot 1 is configured. Alternatively, for example, the end symbol of the second EPDCCH is determined based on the starting symbol for the second EPDCCH in the burst. Alternatively, for example, the end symbol of the second EPDCCH is determined based on the starting symbol for the second EPDCCH in the burst and the maximum length of the burst. Alternatively, for example, the end symbol of the second EPDCCH is determined based on control information included in the initial signal in the burst. Specifically, the control information includes information indicating the end symbol of the second EPDCCH. Alternatively, for example, the end symbol of the second EPDCCH is determined based on control information included in a predetermined channel and/or signal transmitted at the partial subframe.

The terminal device monitors a set of EPDCCH candidates in one or more effective Serving cells for configuration of the control information via higher layer signalling. Here, monitoring (to monitor) implicitly indicates that decode of each of the EPDCCHs in each of the sets of EPDCCH candidates is attempted according to DCI format for monitoring. Sets of EPDCCH candidates to be monitored are defined in UE-specific Search Space (USS) of the EPDCCH. Here, the USS is a logical area configured in a UE-specific manner and is an area that can be used for transmitting downlink control information. Monitoring is also referred to as blind detection.

Moreover, the starting symbol for the second EPDCCH and/or the end symbol of the second EPDCCH may be blind-detected (monitored) among multiple OFDM symbol candidates by a terminal. For example, multiple candidates are defined or configured for the starting symbol for the second EPDCCH and/or the end symbol of the second EPDCCH, and the terminal monitors the second EPDCCH assumed to be transmitted based on the OFDM symbols defined or configured as the candidates. In other words, the assumed starting symbols and/or end symbols may be independent (different) from each other among the individual second EPDCCHs in the set of the second EPDCCH candidates.

A subframe at which the UE, monitors the EPDCCH USS is configured for each Serving cell by a higher layer. More specifically, in a subframe that is not a subframe at which uplink transmission for an FDD half duplex terminal device is requested and that is not part of a measurement gap in an active time (a period that is not a non-active timer operating period in discontinuous reception, a period that is not a non-reception period, and the total period in which the terminal device is operating), the higher layer configures monitoring of the EPDCCH. Here, discontinuous reception is an operation in which the terminal device need not be activated (active state) (may be non-active) for optimization of buttery consumption of the terminal device except for part of the period. The Frequency Division Duplex (FDD) half duplex terminal device is a terminal device that does not have the function of performing uplink transmission and downlink reception simultaneously (in the same subframe) in an FDD band. Moreover, the measurement gap is a period in which transmission/reception is stopped in the Serving cell to perform measurement for mobility (handover) (received power measurement for a cell other than the Serving cell), and a measurement gap pattern is configured by the RRC.

The terminal device does not monitor the EPDCCH in (e1) to (e4) below.

(e1) In the case of a special subframe with special subframe configuration 0 and 5 in the TDD and a normal downlink CP (a special subframe having fewer than six OFDM symbols in the DwPTS).

(e2) In the case of a special subframe with special subframe configuration 0, 4, and 7 in the TDD and an extended downlink CP (a special subframe having fewer than six OFDM symbols in the DwPTS).

(e3) In the case of a subframe at which decode of a Physical Multicast Channel (PMCH) is indicated by a higher layer.

(e4) In the case where different UL/DL configurations are configured for the TDD and a Primary cell and for a Secondary cell, the case of a downlink subframe in the Secondary cell, where the same subframe in the Primary cell is a special subframe, and the case where the terminal device does not have the capability of performing simultaneous transmission and reception in the Primary cell and the Secondary cell.

Here, the special subframe is a subframe including three sections, a section in which downlink transmission is performed (DwPTS), a guard period (GP), and a section in which uplink transmission is performed (UpPTS) in this order in one subframe, and the lengths of the DwPTS, the GP, and the UpPTS are uniquely determined based on the special subframe configuration and the CP length. The PMCH is a channel for providing Multimedia Broadcast/ Multicast Service (MBMS) service and is mapped only to MBSFN subframes.

Note that any of the following 10 configurations is configured for the special subframe configuration.

In special subframe configuration 0, the DwPTS is 6592 samples in a normal downlink CP, and the UpPTS is 2192 samples in a normal uplink CP and 2560 samples in an extended uplink CP. In contrast, the DwPTS is 7680 samples in an extended downlink CP, and the UpPTS is 2192 samples in a normal uplink CP and 2560 samples in an extended uplink CP. The DwPTS is constituted of three OFDM symbols, and the UpPTS is constituted of one SC-FDMA symbol.

In special subframe configuration 1, the DwPTS is 19760 samples in a normal downlink CP, and the UpPTS is 2192 samples in a normal uplink CP and 2560 samples in an extended uplink CP. In contrast, the DwPTS is 20480 samples in an extended downlink CP, and the UpPTS is 2192 samples in a normal uplink CP and 2560 samples in an extended uplink CR The DwPTS is constituted of nine OFDM symbols in the case of a normal downlink CP and eight OFDM symbols in the case of an extended downlink CP, and the UpPTS is constituted of one SC-FDMA symbol.

In special subframe configuration 2, the DwPTS is 21952 samples in a normal downlink CP, and the UpPTS is 2192 samples in a normal uplink CP and 2560 samples in an extended uplink CP. In contrast, the DwPTS is 23040 samples in an extended downlink CP, and the UpPTS is 2192 samples in a normal uplink CP and 2560 samples in an extended uplink CR The DwPTS is constituted of 10 OFDM symbols in the case of a normal downlink CP and nine OFDM symbols in the case of an extended downlink CP, and the UpPTS is constituted of one SC-FDMA symbol.

In special subframe configuration 3, the DwPTS is 24144 samples in a normal downlink CP, and the UpPTS is 2192 samples in a normal uplink CP and 2560 samples in an extended uplink CP. In contrast, the DwPTS is 25600 samples in an extended downlink CP, and the UpPTS is 2192 samples in a normal uplink CP and 2560 samples in an extended uplink CR The DwPTS is constituted of 11 OFDM symbols in the case of a normal downlink CP and 10 OFDM symbols in the case of an extended downlink CP, and the UpPTS is constituted of one SC-FDMA symbol.

In special subframe configuration 4, the DwPTS is 26336 samples in a normal downlink CP, and the UpPTS is 2192 samples in a normal uplink CP and 2560 samples in an extended uplink CP. In contrast, the DwPTS is 7680 samples in an extended downlink CP, and the UpPTS is 4384 samples in a normal uplink CP and 5120 samples in an extended uplink CP. The DwPTS is constituted of 12 OFDM symbols in the case of a normal downlink CP and three OFDM symbols in the case of an extended downlink CP, and the UpPTS is constituted of one SC-FDMA symbol in the case of a normal downlink CP and two SC-FDMA symbols in an extended downlink CP.

In special subframe configuration 5, the DwPTS is 6592 samples in a normal downlink CP, and the UpPTS is 4384 samples in a normal uplink CP and 5120 samples in an extended uplink CR In contrast, the DwPTS is 20480 samples in an extended downlink CP, and the UpPTS is 4384 samples in a normal uplink CP and 5120 samples in an extended uplink CP. The DwPTS is constituted of three OFDM symbols in the case of a normal downlink CP and eight OFDM symbols in the case of an extended downlink CP, and the UpPTS is constituted of two SC-TDMA symbols.

In special subframe configuration 6, the DwPTS is 19760 samples in a normal downlink CP, and the UpPTS is 4384 samples in a normal uplink CP and 5120 samples in an extended uplink CP. In contrast, the DwPTS is 23040 samples in an extended downlink CP, and the UpPTS is 4384 samples in a normal uplink CP and 5120 samples in an extended uplink CP. The DwPTS is constituted of nine OFDM symbols, and the UpPTS is constituted of two SC-FDMA symbols.

In special subframe configuration 7, the DwPTS is 21952 samples in a normal downlink CP, and the UpPTS is 4384 samples in a normal uplink CP and 5120 samples in an extended uplink CP. In contrast, the DwPTS is 12800 samples in an extended downlink CP, and the UpPTS is 4384 samples in a normal uplink CP and 5120 samples in an extended uplink CP. The DwPTS is constituted of 10 OFDM symbols in the case of a normal downlink CP and five OFDM symbols in the case of an extended downlink CP, and the UpPTS is constituted of two SC-FDMA symbols.

In special subframe configuration 8, the DwPTS is 24144 samples in a normal downlink CP, and the UpPTS is 4384 samples in a normal uplink CP and 5120 samples in an extended uplink CR The DwPTS is constituted of 11 OFDM symbols in the case of a normal downlink CP, and the UpPTS is constituted of two SC-FDMA symbols.

In special subframe configuration 9, the DwPTS is 13168 samples in a normal downlink CP, and the UpPTS is 4384 samples in a normal uplink CP and 5120 samples in an extended uplink CR The DwPTS is constituted of six OFDM symbols in the case of a normal downlink CP, and the UpPTS is constituted of two SC-FDMA symbols.

Here, in a case that the UpPTS is constituted of one SC-FDMA symbol, the terminal device can transmit a Sounding Reference Signal (SRS), which is a Reference Signal for uplink sounding, by using the one SC-FDMA symbol in response to a request from a base station device. In a case that the UpPTS is constituted of two SC-FDM symbols, the terminal device can transmit an SRS by using at least one of the two SC-FDMA symbols in response to a request from a base station device.

Here, in a normal CP, a normal downlink subframe is constituted of 14 OFDM symbols, and a normal uplink subframe is constituted of 14 SC-FDMA symbols. Moreover, in an extended CP, a normal downlink subframe is constituted of 12 OFDM symbols, and a normal uplink subframe is constituted of 12 SC-FDMA symbols.

Note that any of the following seven configurations is configured for the UL/DL configuration.

In UL/DL configuration 0, subframe 0 to subframe 9 in one radio frame (10 subframes) are a downlink subframe, a special subframe, an uplink subframe, an uplink subframe, an uplink subframe, a downlink subframe, a special subframe, an uplink subframe, an uplink subframe, and an uplink subframe in this order. The cycle of the point of transition from downlink to uplink corresponds to five subframes (5 ms).

In UL/DL configuration 1, subframe 0 to subframe 9 in one radio frame are a downlink subframe, a special subframe, an uplink subframe, an uplink subframe, a downlink subframe, a downlink subframe, a special subframe, an uplink subframe, an uplink subframe, and a downlink subframe in this order. The cycle of the point of transition from downlink to uplink corresponds to five subframes.

In UL/DL configuration 2, subframe 0 to subframe 9 in one radio frame are a downlink subframe, a special subframe, an uplink subframe, a downlink subframe, a downlink subframe, a downlink subframe, a special subframe, an uplink subframe, a downlink subframe, and a downlink subframe in this order. The cycle of the point of transition from downlink to uplink corresponds to five subframes.

In UL/DL, configuration 3, subframe 0 to subframe 9 in one radio frame are a downlink subframe, a special subframe, an uplink subframe, an uplink subframe, an uplink subframe, a downlink subframe, a downlink subframe, a downlink subframe, a downlink subframe, and a downlink subframe in this order. The cycle of the point of transition from downlink to uplink corresponds to 10 subframes (10 ms).

In configuration 4, subframe 0 to subframe 9 in one radio frame are a downlink subframe, a special subframe, an uplink subframe, an uplink subframe, a downlink subframe, a downlink subframe, a downlink subframe, a downlink subframe, a downlink subframe, and a downlink subframe in this order. The cycle of the point of transition from downlink to uplink corresponds to 10 subframes.

In UL/DL configuration 5, subframe 0 to subframe 9 in one radio frame are a downlink subframe, a special subframe, an uplink subframe, a downlink subframe, a downlink subframe, a downlink subframe, a downlink subframe, a downlink subframe, a downlink subframe, and a downlink subframe in this order. The cycle of the point of transition from downlink to uplink corresponds to 10 subframes.

In UL/DL configuration 6, subframe 0 to subframe 9 in one radio frame are a downlink subframe, a special subframe, an uplink subframe, an uplink subframe, an uplink subframe, a downlink subframe, a special subframe, an uplink subframe, an uplink subframe, and a downlink subframe in this order. The cycle of the point of transition from downlink to uplink corresponds to five subframes.

Here, in a case that the UL-DL configuration for at least one Serving cell is UL/DL configuration 5, not more than two Serving cells are configured.

$ES^{(L)}_k$, which is the USS in an EPDCCH in aggregation level L, is defined by a set of EPDCCH candidates. Here, L takes any of 1, 2, 4, 8, 16, and 32. For one EPDCCH-PRB set p, the ECCE corresponding to EPDCCH candidate m in search space $ES(L)_k$ is given based on $L((Y_{p,k}+\text{floor}(mN_{ECCE,p,k}/(LM^{(L)}_p))+b) \mod (\text{floor}(N_{ECCE,p,k}/L)))+i$. Here, i=0, ..., L−1. Moreover, in a case that a Carrier Indicator Field (CIF) is configured for the Serving cell for which EPDCCHs are monitored, b indicates a CIF value, and otherwise, b=0. Additionally, m=0, 1, ..., $M^{(L)}_p$−1. In a case that no CIF is configured for the Serving cell for which EPDCCHs are monitored, $M^{(L)}_p$ represents the number of EPDCCHs to be monitored in aggregation level L in the EPDCCH-PRB set p in the Serving cell for which EPDCCHs are monitored. In other cases, $M^{(L)}_p$ represents the number of EPDCCHs to be monitored in aggregation level L in the EPDCCH-PRB set p in the Serving cell indicated by the CIF value. Here, the CIF is a field in a DCI format, and the CIF value is used to determine the Serving cell to which the DCI format corresponds in PDSCH transmission, PUSCH transmission, or a random access procedure of the Serving cell and takes the same value as the Serving cell index corresponding to the Primary cell or the Secondary cell.

In a case that the ECCE corresponding to a certain EPDCCH candidate is mapped to a PRB pair overlapping with transmission of any of the PBCH, a primary synchronization signal, and a secondary synchronization signal on the frequency, in the same subframe, the terminal device does not monitor the EPDCCH candidate.

In a case that $n^{EPDCCE}_{ID,i}$ of the same value is configured for two EPDCCH-PRB sets for a terminal device, and it is configured for the terminal device to receive the EPDCCH candidate that is an EPDCCH candidate of a certain DCI payload size corresponding to one of the EPDCCH-PRB sets and that is mapped to a certain set of REs and for the terminal device to monitor the EPDCCH candidate that is an EPDCCH candidate of the same DCI payload size corresponding to the other EPDCCH-PRB set and that is mapped to the same set of REs, and further in a case that the first ECCE number in the received EPDCCH is used to determine PUCCH resources for HARQ-ACK transmission, the first ECCE number is determined based on the EPDCCH-PRB set corresponding to p=0. Here, $n^{EPDCCH}_{ID,i}$ is a parameter used for initialization of pseudo-random sequence generation of a Demodulation Reference Signal (DMRS) associated with the EPDCCH and is configured by a higher layer. Note that i takes a value 0 or 1 to indicate the EPDCCH set to which the EPDCCH associated with the DMRS belongs. In other words, i is substantially synonymous with p.

$Y_{p,k}$ is defined by $Y_{p,k}=(A_p Y_{p,k-1})$ mod D. Here, $Y_{p,-1}$ represents the value of an RNTI, which is an identifier configured for the terminal device in the physical layer, $A_0$ indicates 39827, $A_1$ indicates 39829, D indicates 65537, and k=floor($n_s$/2). In other words, since each subframe is constituted of two slots, k represents a subframe number in the radio subframe.

Moreover, the correspondence of the number of PRBs included in an EPDCCH-PRB set, an aggregation level, and the number of EPDCCH candidates to be monitored can be defined. The aggregation level defining a search space and the number of EPDCCH candidates to be monitored are given as follows. Here, $N^{Xp}_{RB}$ represents the number of PRB pairs constituting the EPDCCH-PRB set p.

Here, the aggregation level that defines a search space and the number of EPDCCH candidates to be monitored can be independently defined for (1) the case where only one EPDCCH-PRB for distributed transmission is configured for the terminal device, (2) the case where only one EPDCCH-PRB for localized transmission is configured for the terminal device, (3) the case where two EPDCCH-PRBs are configured for distributed transmission for the terminal device, (4) the case where two EPDCCH-PRBs for localized transmission are configured for the terminal device, and (5) the case where one EPDCCH-PRB for distributed transmission and one EPDCCH-PRB for localized transmission are configured for the terminal device.

Note that, in the present embodiment, p1 is a reference sign identifying a localized EPDCCH-PRB set, p1 is a reference sign identifying a localized EPDCCH-PRB set, and p2 is a reference sign identifying a distributed EPDCCH-PRB set. In other words, $N^{Xp1}_{RB}$ represents the number of PRB pairs constituting a localized EPDCCH-PRB set, and $N^{Xp2}_{RB}$ represents the number of PRB pairs constituting a distributed EPDCCH-PRB set. Moreover, $M^{(L)}_{p1}$ represents the number of EPDCCHs in a localized EPDCCH-PRB set to be monitored in aggregation level L, and $M^{(L)}_{p2}$ represents the number of EPDCCHs in a distributed EPDCCH-PRB set to be monitored in aggregation level L.

To the correspondence of the number of PRBs included in an EPDCCH-PRB set, an aggregation level, and the number of EPDCCH candidates to be monitored, case 1 is applied in cases of (c1) to (c4) below, case 2 is applied in cases of (c5) to (c7) below, and case 3 is applied in a case of (c8) below.

(c1) In the case of a normal subframe and a normal downlink CP, where any of DCI formats 2, 2A, 2B, 2C, and 2D is monitored, and where $M^{DL}_{RB}$ is 25 or greater. In other words, this is the case where the number of REs that can be used for EPDCCH transmission in one PRB pair is relatively large and the payload size of the DCI format is significantly large.

(c2) In the case of a special subframe with special subframe configuration 3, 4, or 8 and a normal downlink CP (which means a special subframe in which a DwPTS is constituted of 11 or greater OFDM symbols), where any of DCI formats 2, 2A, 2B, 2C, and 2D is monitored, and where $M^{DL}_{RB}$ is 25 or greater. In other words, this is the case where the number of REs that can be used for EPDCCH transmission in one PRB pair is relatively large and the payload size of the DCI format is significantly large.

(c3) In the case of a normal subframe and a normal downlink CP, where any of DCI formats 1A, 1B, 1D, 1, 2, 2A, 2B, 2C, 2D, 0 and 4 is monitored, and where $n_{EPDCCH}$ is less than 104. In other words, this is the case where the number of REs that can be used for EPDCCH transmission in one PRB pair is significantly small.

(c4) In the case of a special subframe with special subframe configuration 3, 4, or 8 and a normal downlink CP (which means a special subframe in which a DwPTS is constituted of 11 or greater OFDM symbols), where any of DCI formats 1A, 1B, 1D, 1, 2, 2A, 2B, 2C, 2D, 0, and 4 is monitored, and where nEPDCCH is less than 104. In other words, this is the case where the number of REs that can be used for EPDCCH transmission in one PRB pair is significantly small.

(c5) In the case of a normal subframe and an extended downlink CP, and where any of DCI formats 1A, 1B, 1D, 1, 2, 2A, 2B, 2C, 2D, 0, and 4 is monitored. In other words, this is the case where the number of REs that can be used for EPDCCH transmission in one PRB pair is relatively small.

(c6) In the case of a special subframe with special subframe configuration 1, 2, 6, 7, and 9 and a normal downlink CP (which means a special subframe in which a DwPTS is constituted of 6 or greater and 10 or fewer OFDM symbols) and where any of DCI formats 1A, 1B, 1D, 1, 2, 2A, 2B, 2C, 2D, 0, and 4 is monitored. In other words, this is the case where the number of REs that can be used for EPDCCH transmission in one PRB pair is relatively small.

(c7) In the case of a special subframe with special subframe configuration 1, 2, 3, 5, or 6 and an enhanced downlink CP (which means a special subframe in which a DwPTS is constituted of 6 or greater and 10 or fewer OFDM symbols) and where any of DCI formats 1A, 1B, 1D, 1, 2, 2A, 2B, 2C, 2D, 0, and 4 is monitored. In other words, this is the case where the number of REs that can be used for EPDCCH transmission in one PRB pair is relatively small.

(c8) In the case other than any of (c1) to (c7) above. In other words, this is the case where the number of REs that can be used for EPDCCH transmission in one PRB pair is relatively large and the payload size of the DCI format is not so large.

Here, in a case that no CIF is configured for the terminal device for the Serving cell for which EPDCCHs are monitored, $M^{DL}_{RB}$ corresponds to $N^{DL}_{RB}$ of the Serving cell for which EPDCCHs are monitored. In a case that a CIF is configured for the terminal device for the Serving cell for which EPDCCHs are monitored, $M^{DL}_{RB}$ corresponds to $N^{DL}_{RB}$ of the Serving cell indicated by a CIF value. Here, $N^{DL}_{RB}$ represents a downlink bandwidth configuration and is expressed in a unit of a multiple of frequency direction resource block size. In other words, $N^{DL}_{RB}$ represents the total number of resource blocks in the frequency direction in a downlink component carrier in the Serving cell. Moreover, DCI formats 1A, 1B, 2D, and 1 are DCI formats used in a transmission mode in which one transport block can be transmitted using one PDSCH and are used in respective PDSCH transmission methods that are transmission diversity, closed loop spatial multiplexing using a single port, multi-user Multiple input Multiple Output (MIMO), and single antenna port transmission. Moreover, DCI formats 2, 2A, 2B, 2C, and 2D are DCI formats used in a transmission mode in which up to two transport blocks can be transmitted using one PDSCH and are used in respective PDSCH transmission methods that are closed loop spatial multiplexing, large delay Cyclic Delay Diversity (CDD), 2-layer transmission, 8 or fewer layer transmission, and 8 or fewer layer transmission. In addition, DCI formats 2 and 2A are also used in a PDSCH transmission method based on transmission diversity, and DCI formats 2B, 2C, and 2D are also used in a PDSCH transmission method using a single antenna port. Moreover, DCI formats 0 and 4 are DCI formats used in respective transmission modes in which one and up to two transport blocks can be transmitted using one PUSCH and are used in respective PDSCH transmission methods that are single antenna port transmission and closed loop spatial multiplexing.

The transmission mode is a mode semi-statically configured for the terminal device to receive PDSCH data transmission signaled using a PDCCH or an EPDCCH via higher layer signalling. Any of transmission mode 1 to transmission mode 10 below is configured for the transmission mode.

In transmission mode 1, a PDSCH transmission method based on single antenna port transmission (transmission using antenna port 0) is used, and DCI format 1 or 1A is used.

In transmission mode 2, a PDSCH transmission method based on transmission diversity is used, and DCI format 1 or 1A is used.

In transmission mode 3, a PDSCH transmission method based on large delay CDD or transmission diversity is used, and DCI format 1 or 2A is used.

In transmission mode 4, a PDSCH transmission method based on closed loop spatial multiplexing or transmission diversity is used, and DCI format 1 or 2 is used.

In transmission mode 5, a PDSCH transmission method based on multi-user MIMO or transmission diversity is used, and DCI format 1 or 1D is used.

In transmission mode 6, a PDSCH transmission method based on closed loop spatial multiplexing using a single port or transmission diversity is used, and DCI format 1 or 1B is used.

In transmission mode 7, a PDSCH transmission method based on any of single antenna port transmission (transmission using antenna port 5), transmission diversity, and single antenna port transmission (transmission using antenna port 0) is used, and DCI format 1 or 1 is used.

In transmission mode 8, a PDSCH transmission method based on any of two-layer transmission (transmission using antenna port 7 and antenna port 8), transmission diversity, and single antenna port transmission (transmission using antenna port 0) is used, and DCI format 1 or 2B is used.

In transmission mode 9, a PDSCH transmission method based on any of 8 or fewer layer transmission (transmission using antenna port 7 to antenna port 14), transmission diversity, and single antenna port transmission (transmission using antenna port 0) (here, single antenna port transmission using antenna port 7 in the case of an MBSFN subframe) is used, and DCI format 1 or 2C is used.

In transmission mode 10, a PDSCH transmission method based on any of 8 or fewer layer transmission (transmission using antenna port 7 to antenna port 14), transmission diversity, and single antenna port transmission (transmission using antenna port 0) (here, single antenna port transmission using antenna port 7 in the case of an MBSFN subframe) is used, and DCI format 1 or 2C is used.

Note that transmission modes other than the above (e.g., transmission mode 11 defined similarly to transmission modes 9 and 10, or the like) may be used. For example, in transmission mode 11, a DCI format used in a LAA cell is used. In transmission mode 11, a processing method, a coding method, a transmission method, and/or a reception method in a LAA cell described in the present embodiment is used.

In a case that no CIF is configured for the terminal device, the terminal device monitors the USS of one EPDCCH in each of aggregation levels given based on prescribed correspondence tables, in each of activated serving cells for which monitoring of EPDCCHs is configured. In a case that EPDCCH monitoring is configured in the terminal device, and a CIF is configured for the terminal device, the terminal device monitors the USS of one or more EPDCCHs in each of aggregation levels given based on the prescribed correspondence tables, in each of one or more activated serving cells as configured via higher layer signaling. The terminal device for which a CIF associated with EPDCCH monitoring in Serving cell c is configured, monitors EPDCCHs for which a CIF is configured and to which a CRC scrambled with a C-RNTI is attached, in the USSs in the EPDCCHs in Serving cell c. The terminal device for which a CIF associated with EPDCCH monitoring in the Primary cell is configured, monitors EPDCCHs for which a CIF is configured and to which a CRC scrambled with a Semi Persistent Scheduling-INTI (SPS-RNTI) is attached, in the USS in the EPDCCH in the Primary cell. Here, the C-RNTI is an RNTI used for dynamic PDSCH transmission or EPDCCH transmission associated with PDSCH transmission, and the SPS-RNTI is an RNTI used for semi-stationary PDSCH transmission or EPDCCH transmission associated with PDSCH transmission.

In the Serving cell for which EPDCCHs are monitored, in a case that no CIF is configured for the terminal device, the terminal device monitors the USSs in the EPDCCHs for the EPDCCHs including no CIF, and in a case that a CIF is configured for the terminal device, the terminal device monitors the USSs in the EPDCCHs for the EPDCCHs including the CIF. In other words, whether to decode an EPDCCH as an EPDCCH including a CIF or decode the EPDCCH as an EPDCCH including no CIF, is determined depending on whether a CIF is configured. In a case that the terminal device is configured to monitor EPDCCHs including the CIF corresponding to the Secondary cell, in a different Serving cell, the terminal device does not monitor EPDCCHs in the Secondary cell. In the Serving cell for which EPDCCHs are monitored, the terminal device monitors EPDCCH candidates at least for the same Serving cell.

The terminal device configured to monitor EPDCCH candidates to which a CRC scrambled with a C-RNTI in a DCI format size including a CIF, on a certain Serving cell, is attached, assumes that the EPDCCH candidates in the DCI format size may be transmitted in USSs in various EPDCCHs corresponding to various values that the CIF can take in the DCI format size, in the Serving cell.

In a case that an opportunity for transmission of a positioning Reference Signal is configured only at an MBSFN subframe for the Serving cell for which EPDCCHs are monitored, and the CP length used in subframe 0 is of a normal CP, the terminal device is not requested to monitor EPDCCHs at a subframe configured by a higher layer as being part of the opportunity for the transmission of the positioning Reference Signal.

The terminal device assumes that the same $C_{init}$ value is used for antenna ports 107 and 108 during the monitoring of EPDCCH candidates associated with any of antenna ports 107 and 108. The terminal device assumes that the same $C_{init}$ value is used for antenna ports 109 and 110 during the monitoring of EPDCCH candidates associated with any of antenna ports 109 and 110.

In a case that the terminal device is configured to receive PDSCH data transmission according to transmission modes 1 to 9 via higher layer signalling for a certain Serving cell, the terminal device follows (s1) and (s2) below.

(s1) in a case that epdcch-StartSymbol-r11, which is a higher layer parameter, is configured for the terminal device, the start OFDM symbol for an EPDCCH given by $1_{EPDCCHStart}$, which is an index in the first slot in one subframe (the first OFDM symbol to which an EPDCCH is mapped in one subframe, also referred to as an EPDCCH start position), is determined based on the higher layer parameter. Here, the higher layer parameter epdcch-StartSymbol-r11 is a parameter that can be individually configured for each of the EPDCCH sets and a parameter for specifying the start OFDM symbol in the EPDCCH (information indicating the start OFDM symbol). The higher layer parameter epdcch-StartSymbol-r11 is configured by using an RRC message.

(s2) In other cases, the start OFDM symbol for an EPDCCH given by $1_{EPDCCHStart}$, which is an index in the first slot in one subframe, is given by a Control Format Indicator (CFI) value in the subframe in the Serving cell in a case that $N^{DL}_{RB}$ is greater than 10, and is given by adding one to the CFI value of the subframe in the Serving cell in a case that $N^{DL}_{RB}$ is 10 or less. Here, the CFI is a parameter taking any of 1, 2, and 3 as a value and is control information transmitted/received via a Physical CFI Channel (PCFICH). The CFI is information on the number of OFDM symbols to be used for PDCCH transmission in one subframe.

In a case that the terminal device is configured to receive data transmission on a PDSCH in transmission mode 10 via higher layer signalling for a Serving cell, the start OFDM symbol for EPDCCH monitoring in subframe k follows the higher layer parameter pdsch-Start-r11 for each EPDCCH^PRB set as in (s3) to (s6) below. Here, the higher layer parameter pdsch-Start-r11 is a parameter that can be configured for each of four kinds of parameter sets for a PDSCH and is a parameter for specifying the start OFDM symbol of a PDSCH (information indicating the start OFDM symbol). The higher layer parameter epdcch-Start-r11 is configured by using an RRC message.

(s3) In a case that the pdsch-Start-r11 value belongs to the set of 1, 2, 3, and 4 (the value is any of 1, 2, 3, and 4), $1'_{EPDCCHStart}$ is given by pdsch-Start-r11.

(s4) In other cases (in a case that the pdsch-Start-r11 value does not belong to the set of 1, 2, 3, and 4), $1'_{EPDCCHStart}$ is given by the CFI value in subframe k in the Serving cell in a case that $N^{DL}_{RB}$ is greater than 10, and is given by adding one to the CFI value in subframe k in the Serving cell in a case that $N^{DL}_{RB}$ is 10 or less.

(s5) In a case that subframe k is the subframe specified by the higher layer parameter mbsfn-SubframeConfigList-r11, or in a case that subframe k is subframe 1 or 6 in the TDD subframe configuration, $1_{EPDCCHStart}$ is given by $1_{EPDCCHStart} = \min(2, 1'_{EPDCCHStart})$.

(s6) in other cases (in a case that subframe k is not the subframe specified by the higher layer parameter mbsfn-SubframeConfigList-r11, and in a case that subframe k is not subframe 1 or 6 in the TDD subframe configuration), $1_{EPDCCHStart}$ is given by $1_{EPDCCHStart} = 1'_{EPDCCHStart}$.

In a case that the terminal device is configured to receive PDSCH data transmission according to transmission modes 1 to 9 via higher layer signalling and to monitor EPDCCHs, for a certain Serving cell, the terminal device assumes that antenna ports 0 to 3 and 107 to 110 in the Serving cell are quasi co-located for Doppler shift, Doppler spread, average delay, and delay spread (receives transmissions as being transmitted from the same transmission point, or receives transmissions as being transmitted from different transmission points).

In a case that the terminal device is configured to receive PDSCH data transmission according to transmission mode 10 via higher layer signaling, for a certain serving cell and to monitor EPDCCHs, (q1) and (q2) below are applied to each EPDCCH-PRB set.

(q1) In a case that the terminal device is configured by a higher layer to decode PDSCHs based on quasi co-location type A, the terminal device assumes that antenna ports 0 to 3 and 107 to 110 in the Serving cell are quasi co-located for Doppler shift, Doppler spread, average delay, and delay spread.

(q2) In a case that the terminal device is configured by a higher layer to decode PDSCHs based on quasi co-location type B, the terminal device assumes that antenna ports 15 to 22 and 107 to 110 corresponding to the higher layer parameter qcl-CSI-RS-ConfigNZPId-r11 are quasi co-located for Doppler shift, Doppler spread, average delay, and delay spread. Here, the higher layer parameter qcl-CSI-RS-ConfigNZPId-r11 is a parameter that can be configured for each of four kinds of PDSCH parameter sets and is a parameter for specifying quasi co-location of a PDSCH (information indicating the CSIRS with which a UE-specific Reference Signal associated with a PDSCH is quasi co-located). The higher layer parameter qcl-CSI-RS-ConfigNZPId-r11 is configured by using an RRC message. Here, quasi co-location type A and quasi co-location type B are parameters, one of which is configured for each Serving cell for the terminal device configured in transmission mode 10. Type A indicates that antenna ports 7 to 14 are quasi co-located with CRS antenna ports 0 to 3 of the Serving cell, and type B indicates that antenna ports 7 to 14 are quasi co-located with any of CSIRS antenna ports 15 to 22. In other words, in a case that type B is configured, a CSIRS is not necessarily transmitted from the base station device corresponding to the Serving cell and may be transmitted from another base station device. In this case, an EPDCCH and a PDSCH quasi co-located with the CSIRS are normally transmitted from the same transmission point as the CSIRS (for example, an overhang antenna device in a remote site connected to a base station device via backhaul, or another base station device).

In a case that the terminal device is configured to receive PDSCH data transmission according to transmission mode 10 via higher layer signalling and to monitor EPDCCHs for a certain Serving cell, the terminal device uses, for each EPDCCH-PRB set, a parameter specified by the higher layer parameter MappingQCL-ConfigId-r11, for RE mapping of the EPDCCH and determination of antenna port quasi co-location. The parameter set includes parameters (Q1) to (Q6) below for RE mapping of an EPDCCH and determination for antenna port quasi co-location.

(Q1) crs-PortsCount-r11. crs-PortsCount-r11 is a parameter indicating the number of CRS ports to be used for mapping a PDSCH and an EPDCCH to REs.

(Q2) crs-FreqShift-r11. crs-FreqShift-r11 is a parameter indicating CRS frequency shift to be used for mapping a PDSCH and an EPDCCH to REs.

(Q3) mbsdn-SubframeConfigList-r11. mbsdn-SubframeConfigList-r11 is a parameter indicating the position of an MBSFN subframe to be used for mapping a PDSCH and an EPDCCH to REs. In a subframe configured as an MBSFN subframe based on the parameter, a PDSCH and an EPDCCH are mapped as a CRS existing only in OFDM symbols to which a PDCCH can be mapped (as no CRS existing in OFDM symbols to which a PDCCH is not to be mapped).

(Q4) csi-RS-ConfigZPId-r11. csi-RS-ConfigZPId-r11 is a parameter indicating the position of zero-power CSIRS to be used for mapping a PDSCH and an EPDCCH to REs.

(Q5) pdsch-Start-r11. pdsch-Start-r11 is a parameter indicating a start OFDM symbol to be used for mapping a PDSCH and an EPDCCH to REs.

(Q6) qcl-CSI-RS-ConfigNZPId-r11. qcl-CSI-RS-ConfigNZPId-r11 is a parameter indicating the CSIRS with which a Reference Signal for demodulation of a PDSCH and an EPDCCH is co-located. This parameter can specify the ID of any of one or more configured CSIRSs. The Reference Signal for demodulation of a PDSCH and an EPDCCH is assumed to be quasi co-located with the CSIRS which ID is specified.

Next, a PDSCH to be scheduled by a second EPDCCH will be described. An example of the PDSCH to be scheduled by the second EPDCCH includes only a PDSCH mapped to a subframe at which the second EPDCCH has been detected (mapped).

Another example of the PDSCH to be scheduled by the second EPDCCH includes a PDSCH mapped to any of the subframes in the burst including the subframe at which the second EPDCCH has been detected (mapped). Information (configuration) on the subframe to which the PDSCH is mapped may be configured using RRC or may be notified using DCI transmitted on the second EPDCCH. Moreover, the PDSCH scheduled by the second EPDCCH may be mapped to one subframe or multiple subframes.

Next, description will be given of the starting symbol and/or an end symbol of a PDSCH in a case that the PDSCH scheduled by the second EPDCCH is mapped to a partial subframe. For example, the starting symbol and/or the end symbol of the PDSCH is determined based on the control information included in the DCI in the second EPDCCH for scheduling. Alternatively, for example, the starting symbol and/or the end symbol of the PDSCH is determined based on the starting symbol and/or the end symbol of the second EPDCCH for scheduling. Alternatively, for example, the starting symbol and/or the end symbol of the PDSCH is the same as the starting symbol and/or the end symbol of the second EPDCCH for scheduling. Alternatively, for example, the starting symbol and/or the end symbol of the PDSCH is an OFDM symbol calculated based on the starting symbol and/or the end symbol of the second EPDCCH for scheduling. Alternatively, for example, the starting symbol and/or the end symbol of the PDSCH is configured independently of the starting symbol and/or the end symbol of the second EPDCCH for scheduling via RRC signalling. Alternatively, for example, the starting symbol and/or the end symbol of the PDSCH is determined based on the control information included in a physical channel or a physical signal mapped to the subframe. Moreover, different determination methods or different notification methods may be used for the starting symbol and the end symbol of the PDSCH.

Moreover, the configuration for a subframe at which the first EPDCCH in the first EPDCCH set is monitored and the configuration for a subframe at which the second EPDCCH in the second EPDCCH set is monitored may be different from each other. For example, the subframe at which the first EPDCCH is monitored is configured commonly for the entire first EPDCCH set, and whether to perform monitoring is configured for each subframe by using bitmap-format information. As an example, the configuration for the subframe at which the second EPDCCH is monitored is the same as but is configured independently of the configuration for the subframe at which the first EPDCCH is monitored. Another example of the configuration for the subframe at which the second EPDCCH is monitored is to monitor the second EPDCCH at a subframe at which the terminal has detected burst in a LAA cell (downlink burst transmission).

Part of the above-described embodiments can be stated differently as follows.

The terminal device according to the present embodiment includes: a higher layer processing unit configured to configure a first EPDCCH set for monitoring a first EPDCCH in a first Serving cell and a second EPDCCH set for monitoring a second EPDCCH in a second Serving cell; and a reception unit configured to monitor the first EPDCCH and the second EPDCCH. In a certain subframe, a starting symbol for the first EPDCCH and a starting symbol for the second EPDCCH are determined independently.

The base station device according to the present embodiment includes: a higher layer processing unit configured to configure, for a terminal device, a first EPDCCH set for monitoring a first EPDCCH in a first Serving cell and a second EPDCCH set for monitoring a second EPDCCH in a second Serving cell; and a transmission unit configured to transmit the first EPDCCH and the second EPDCCH. In a certain subframe, a starting symbol for the first EPDCCH and a starting symbol for the second EPDCCH are determined independently.

The maximum value that can be configured for the starting symbol for the second EPDCCH is greater than the maximum value that can be configured for the starting symbol for the first EPDCCH. For example, a value that can be configured for the first EPDCCH starting symbol is 1, 2, 3, or 4. The values that can be configured for the starting symbol for the second EPDCCH include a different value from the values that can be configured for the starting symbol for the first EPDCCH.

The starting symbol for the first EPDCCH is configured based on a higher layer parameter. The starting symbol for the second EPDCCH is determined based on a symbol at which an initial signal has been detected. For example, the starting symbol for the second EPDCCH is the same as the symbol at which the initial signal has been detected.

An end symbol of the first EPDCCH is the last symbol in a certain subframe. An end symbol of the second EPDCCH is configured based on a higher layer parameter.

The starting symbol and/or the end symbol of the PDSCH to be scheduled by the second EPDCCH is determined based on the starting symbol and/or the end symbol of the second EPDCCH.

The starting symbol and/or the end symbol of the PDSCH to be scheduled by the second EPDCCH is determined based on the DCI in the second EPDCCH.

The terminal device according to the present embodiment includes: a higher layer processing unit configured to configure a first EPDCCH set for monitoring a first EPDCCH in a first Serving cell and a second. EPDCCH set for monitoring a second EPDCCH in a second Serving cell; and a reception unit configured to monitor the first EPDCCH and the second EPDCCH. In each physical resource block pair, the EREGs used to define mapping of the first EPDCCH and the second EPDCCH to Resource Elements are common to the first EPDCCH and the second EPDCCH. The number of EREGs constituting each of the ECCEs used for transmission of the first EPDCCH and the number of EREGs constituting each of the ECCEs for transmission of the first EPDCCH are determined independently.

The base station device according to the present embodiment includes: a higher layer processing unit configured to configure, for a terminal device, a first EPDCCH set for monitoring a first EPDCCH in a first Serving cell and a second EPDCCH set for monitoring a second EPDCCH in a second Serving cell; and a transmission unit configured to transmit the first EPDCCH and the second EPDCCH. In each physical resource block pair, the EREGs used to define mapping of the first EPDCCH and the second EPDCCH to Resource Elements are common to the first EPDCCH and the second EPDCCH. The number of EREGs constituting each of the ECCEs used for transmission of the first EPDCCH and the number of EREGs constituting each of the ECCEs for transmission of the first EPDCCH are determined independently.

The maximum value of the numbers of EREGs constituting each of the ECCEs used for transmission of the second EPDCCH is greater than the maximum value of the numbers of EREGs constituting each of the ECCEs for transmission of the first EPDCCH. For example, the numbers of EREGs constituting each of the ECCEs used for transmission of the first EPDCCH include 4 or 8. The numbers of EREGs constituting each of the ECCEs used for transmission of the second EPDCCH include a different number from the number of EREGs constituting each of the ECCEs for transmission of the first EPDCCH. The numbers of EREGs constituting each of the ECCEs used for transmission of the second EPDCCH include 4, 8 or 16.

Resource Elements to which a Demodulation Reference Signal associated with the second EPDCCH is to be mapped are determined based on the starting symbol and/or the end symbol of the second EPDCCH.

The maximum value of the numbers of the physical resource block pairs used for the second EPDCCH set is greater than the maximum value of the numbers of the physical resource block pairs used for the first EPDCCH set. For example, the numbers of physical resource block pairs used for the first EPDCCH set include 2, 4, or 8. The numbers of the physical resource block pairs used for the second EPDCCH set include a different number from the numbers of the physical resource block pairs used for the first EPDCCH set. The numbers include 2, 4, 8, or 16.

A terminal device of the present embodiment is a terminal device for communicating with a base station device. The terminal device includes: a higher layer processing unit configured to configure a set for monitoring an Enhanced Physical Downlink Channel (EPDCCH) for a Licensed Assisted Access (LAA) cell, based on higher layer signaling; and a reception unit configured to monitor the EPDCCH based on the set. The reception unit determines an antenna port number of an antenna port to be used for localized EPDCCH transmission in a subframe, based on a start position of an Orthogonal Frequency Division Multiplex (OFDM) symbol in the subframe.

The terminal device of the present embodiment is the above-described terminal device, and the reception unit detects a Cell specific Reference Signal (CRS) at the start position, based on the higher layer signaling.

The terminal device of the present embodiment is the above-described terminal device, and the reception unit determines the antenna port number of the antenna port to be used for localized EPDCCH transmission in a subframe with an end partial subframe being indicated, based on the number of OFDM symbols used in the end partial subframe.

The terminal device of the present embodiment is the above-described terminal device, and the information indicating the end partial subframe and the information indicating the number of OFDM symbols used in the end partial subframe are included in a Downlink Control Information (DCI) format of the Physical Downlink Control Channel (PDCCH) mapped to a Common Search Space (CSS).

The base station device of the present embodiment is a base station device for communicating with a terminal device. The base station device includes: a transmission unit configured to transmit a set for monitoring an Enhanced Physical Downlink Channel (EPDCCH) for a Licensed Assisted Access (LAA) cell, by using higher layer signaling. The transmission unit determines an antenna port number of an antenna port to be used for localized EPDCCH transmission in a subframe, based on a start position of an Orthogonal Frequency Division Multiplex (OFDM) symbol in the subframe.

A communication method of the present embodiment is a communication method for a terminal device for communicating with a base station device. The communication method includes the steps of: configuring a set for monitoring an Enhanced Physical Downlink Channel (EPDCCH) for a Licensed Assisted Access (LAA) cell, based on higher layer signaling; receiving monitoring the EPDCCH based on the set; and determining an antenna port number of an antenna port to be used for localized EPDCCH transmission in a subframe, based on a start position of an Orthogonal Frequency Division Multiplex (OFDM) symbol in the subframe.

A communication method of the present embodiment is a communication method for a base station device for communicating with a terminal device. The communication method includes the steps of: transmitting a set for monitoring an Enhanced Physical Downlink Channel (EPDCCH) for a Licensed Assisted Access (LAA) cell, by using higher layer signaling; and determining an antenna port number of an antenna port to be used for localized EPDCCH transmission in a subframe, based on a start position of an Orthogonal Frequency Division Multiplex (OFDM) symbol in the subframe.

Moreover, although the description has been given in each of the above-described embodiments by using the terms "primary cell" and "PS cell", these terms may not be necessarily used. For example, "primary cell" in each of the above-described embodiments may be referred to as "master cell", and "PS cell" in each of the above-described embodiments may be referred to as "primary cell".

A program running on each of the base station device 2 and the terminal device 1 according to the present invention may be a program (a program for causing a computer to operate) that controls a Central Processing Unit (CPU) and the like in such a manner as to realize the functions according to the above-described embodiments of the present invention. The information handled in these devices is temporarily stored in a Random Access Memory (RAM) while being processed. Thereafter, the information is stored in various types of Read Only Memory (ROM) such as a flash ROM and a Hard Disk Drive (HDD), and when necessary, is read by the CPU to be modified or rewritten.

Moreover, the terminal device 1 and the base station device 2-1 or the base station device 2-2 according to the above-described embodiments may be partially realized by the computer. In this case, this configuration may be realized by recording a program for realizing such control functions on a computer-readable recording medium and causing a computer system to read the program recorded on the recording medium for execution.

Moreover, the "computer system" here is defined as a computer system built into the terminal device 1 or the base station device 2-1 or the base station device 2-2, and the computer system includes an OS and hardware components such as peripheral devices. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication line such as a telephone line, and a medium that retains, in that case, the program for a fixed period of time, such as a volatile memory within the computer system which functions as a server or a client. Furthermore, the program may be configured to realize some of the functions described above, and also may be configured to be capable of realizing the functions described above in combination with a program already recorded in the computer system.

Furthermore, the base station device 2-1 or base station device 2-2 according to the above-described embodiments can be realized as an aggregation (a device group) constituted of multiple devices. Devices constituting the device group may be each equipped with some or all portions of each function or each functional block of the base station device 2-1 or base station device 2-2 according to the above-described embodiments. It is only required that the device group itself include general functions or general functional blocks of the base station device 2-1 or base station device 2-2. Furthermore, the terminal device 1 according to the above-described embodiments can also communicate with the base station device as the aggregation.

Furthermore, the base station device 2-1 or base station device 2-2 according to the above-described embodiments may be an Evolved Universal Terrestrial Radio Access Network (E-UTRAN). Furthermore, the base station device 2-1 or base station device 2-2 according to the above-described embodiments may have some or all portions of a function of a higher node for an eNodeB.

Furthermore, some or all portions of each of the terminal device 1 and the base station device 2-1 or base station device 2-2 according to the above-described embodiments may be typically achieved as a Large-Scale Integration (LSI) that is an integrated circuit or may be realized as a chip set. The functional blocks of each of the terminal device 1 and the base station device 2-1 or base station device 2-2 may be individually realized as a chip, or some or all of the functional blocks may be integrated into a chip. Furthermore, a circuit integration technique is not limited to the LSI, and may realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiments, the cellular mobile station device is described as one example of a terminal device or a communication device, but the present invention is not limited to this, and can be applied to a fixed-type electronic apparatus installed indoors or outdoors, or a stationary-type electronic apparatus, for example, a terminal device or a communication device, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described according to the embodiments is also included in the technical scope of the present invention.

REFERENCE SIGNS LIST

501 Higher layer
502 Control unit
503 Codeword generation unit
504 Downlink subframe generation unit
505 Downlink Reference Signal generation unit
506 OFDM signal transmission unit
507 Transmit antenna
508 Receive antenna
509 SC-TDMA signal reception unit
510 Uplink subframe processing unit
511 Uplink control information extraction unit
601 Receive antenna
602 OFDM signal reception unit
603 Downlink subframe processing unit
604 Downlink reference signal extraction unit
605 Transport block extraction unit
606, 1006 Control unit
607, 1007 Higher layer
608 Channel state measurement unit
609, 1009 Uplink subframe generation unit
610 Uplink control information generation unit
611, 612, 1011 SC-FDMA signal transmission unit
613, 614, 1013 Transmit antenna

The invention claimed is:

1. A terminal device for communicating with a base station device, the terminal device comprising:
   a processor;
   a memory in electronic communication with the processor; and
   instructions stored in the memory, the instructions being executable to:
   monitor an Enhanced Physical Downlink Control Channel (EPDCCH), wherein
   in a case that the EPDCCH is an EPDCCH in a subframe for a Licensed Assisted Access (LAA) cell and is localized EPDCCH, an antenna port number of an antenna port to be used for the localized EPDCCH transmission in the subframe is determined based on number of an Orthogonal Frequency Division Multiplex (OFDM) symbols used for the subframe,
   the number of the OFDM symbols is provided by information included in Downlink Control Information (DCI) format transmitted in a Physical Downlink Control Channel (PDCCH).

2. A base station device for communicating with a terminal device, the base station device comprising:
   a processor;
   a memory in electronic communication with the processor; and instructions stored in the memory, the instructions being executable to:

transmit an Enhanced Physical Downlink Control Channel (EPDCCH), and transmit Downlink Control Information (DCI) format in a Physical Downlink Control Channel (PDCCH), wherein in a case that that the EPDCCH is an EPDCCH in a subframe for a Licensed Assisted Access (LAA) cell and is localized EPDCCH, the transmission unit determines an antenna port number of an antenna port to be used for the localized EPDCCH transmission in the subframe is determined based on number of an Orthogonal Frequency Division Multiplex (OFDM) symbols used for the subframe, the DCI format includes information for providing the number of the OFDM symbols.

3. A communication method for a terminal device for communicating with a base station device, the communication method comprising the step of:

monitoring an Enhanced Physical Downlink Control Channel (EPDCCH), wherein in a case that the EPDCCH is an EPDCCH in a subframe for a Licensed Assisted Access (LAA) cell and is localized EPDCCH, an antenna port number of an antenna port to be used for the localized EPDCCH transmission in the subframe is determined based on number of an Orthogonal Frequency Division Multiplex (OFDM) symbols used for the subframe, the number of the OFDM symbols is provided by information included in Downlink Control Information (DCI) format transmitted in a Physical Downlink Control Channel (PDCCH).

* * * * *